US012810641B2

(12) United States Patent
Ogawa

(10) Patent No.: US 12,810,641 B2
(45) Date of Patent: Nov. 24, 2026

(54) IMAGE PROCESSING SYSTEM AND IMAGE PROCESSING METHOD

(71) Applicant: CANON KABUSHIKI KAISHA, Tokyo (JP)

(72) Inventor: Takuya Ogawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 769 days.

(21) Appl. No.: 17/863,845

(22) Filed: Jul. 13, 2022

(65) Prior Publication Data

US 2023/0029990 A1 Feb. 2, 2023

(30) Foreign Application Priority Data

Jul. 19, 2021 (JP) ................................ 2021-119005
Dec. 7, 2021 (JP) ................................ 2021-198704

(51) Int. Cl.

| | |
|---|---|
| ***G06V 30/148*** | (2022.01) |
| ***G06V 30/18*** | (2022.01) |
| ***G06V 30/186*** | (2022.01) |
| ***G06V 30/19*** | (2022.01) |
| ***G06V 30/22*** | (2022.01) |

(52) U.S. Cl.
CPC .......... *G06V 30/158* (2022.01); *G06V 30/155* (2022.01); *G06V 30/1801* (2022.01); *G06V 30/186* (2022.01); *G06V 30/19147* (2022.01); *G06V 30/22* (2022.01)

(58) Field of Classification Search
CPC ............... G06V 30/158; G06V 30/155; G06V 30/1801; G06V 30/186; G06V 30/19147; G06V 30/22; G06V 30/147; G06V 30/148
See application file for complete search history.

(56) References Cited

U.S. PATENT DOCUMENTS 6,064,769 A * 5/2000 Nakao .................. G06V 30/414 382/209
2019/0332860 A1* 10/2019 Salameh .................. G06T 5/30
2020/0242389 A1* 7/2020 Ren ........................ G06V 20/62
2021/0056336 A1* 2/2021 Ikeda ...................... G06N 3/084
2022/0291828 A1* 9/2022 Minagawa .......... G06F 3/04883
2023/0306184 A1* 9/2023 Yoshida ............... G06V 30/287

FOREIGN PATENT DOCUMENTS

JP 2010218106 A 9/2010
WO 2017094156 A1 6/2017

* cited by examiner

*Primary Examiner* — Andrew M Moyer
*Assistant Examiner* — Dylan John Mendez Muniz
(74) *Attorney, Agent, or Firm* — ROSSI, KIMMS & McDOWELL LLP

(57) ABSTRACT

An image processing system according to the present embodiment acquires a processing target image read from an original that is handwritten and specifies one or more handwritten areas included in the acquired processing target image. In addition, for each specified handwritten area, the present image processing system extracts from the processing target image a handwritten character image and a handwritten area image indicating an approximate shape of a handwritten character. Furthermore, for a handwritten area including a plurality of lines of handwriting among the specified one or more handwritten areas, a line boundary of handwritten characters is determined from a frequency of pixels indicating a handwritten area in a line direction of the handwritten area image, and a corresponding handwritten area is separated into each line.

11 Claims, 37 Drawing Sheets

FIG. 6C1
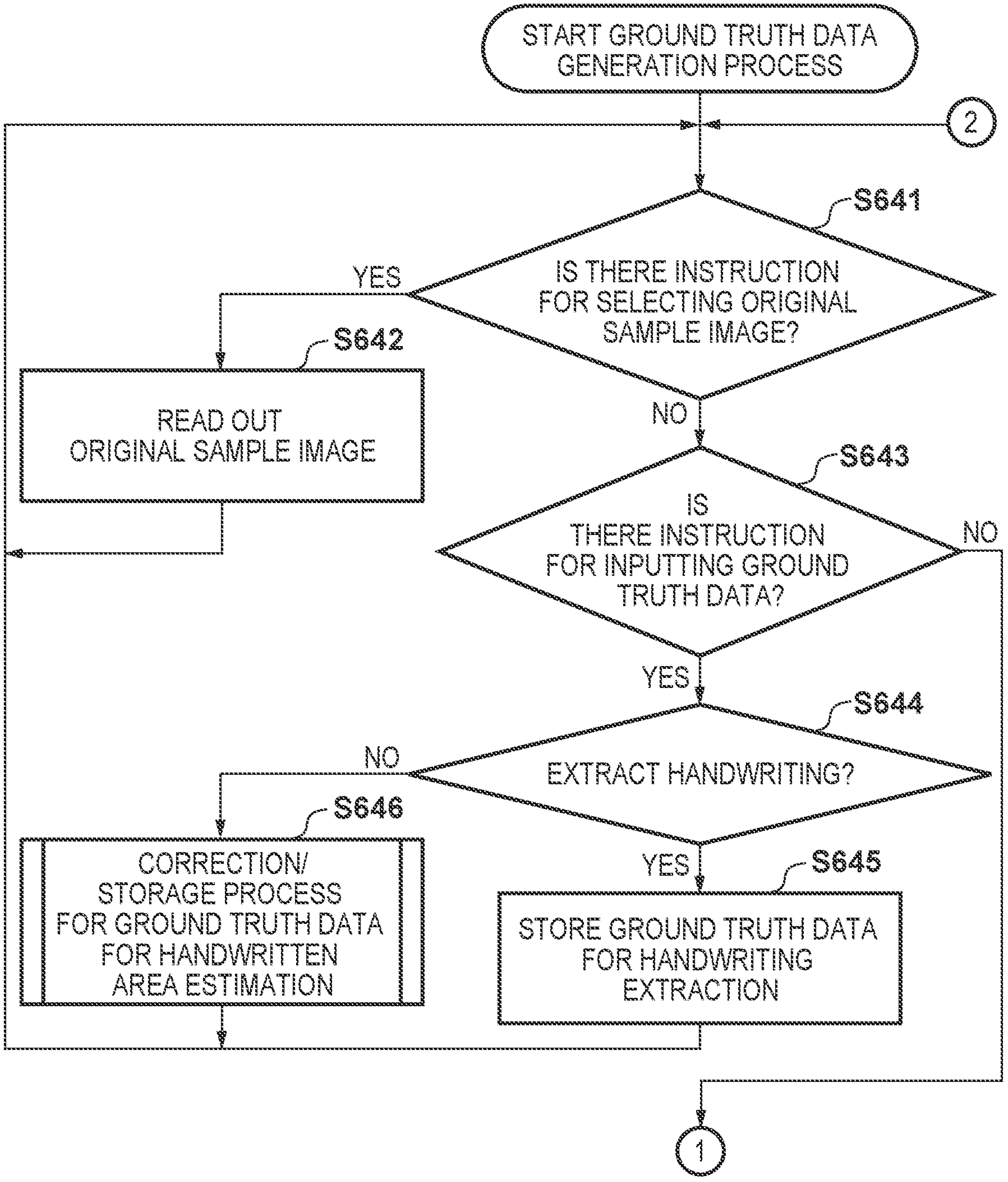

FIG. 6C2
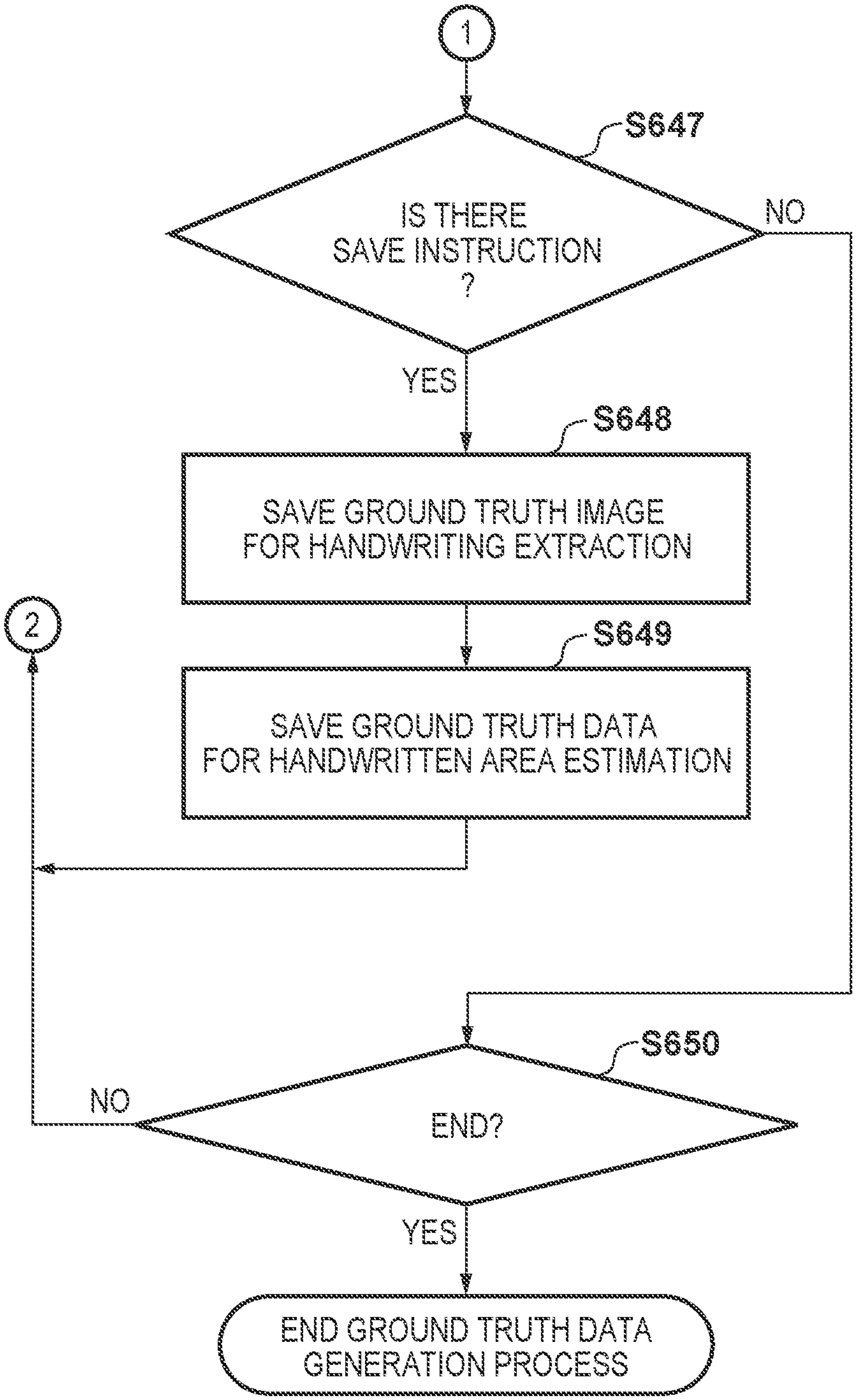

FIG. 9B1
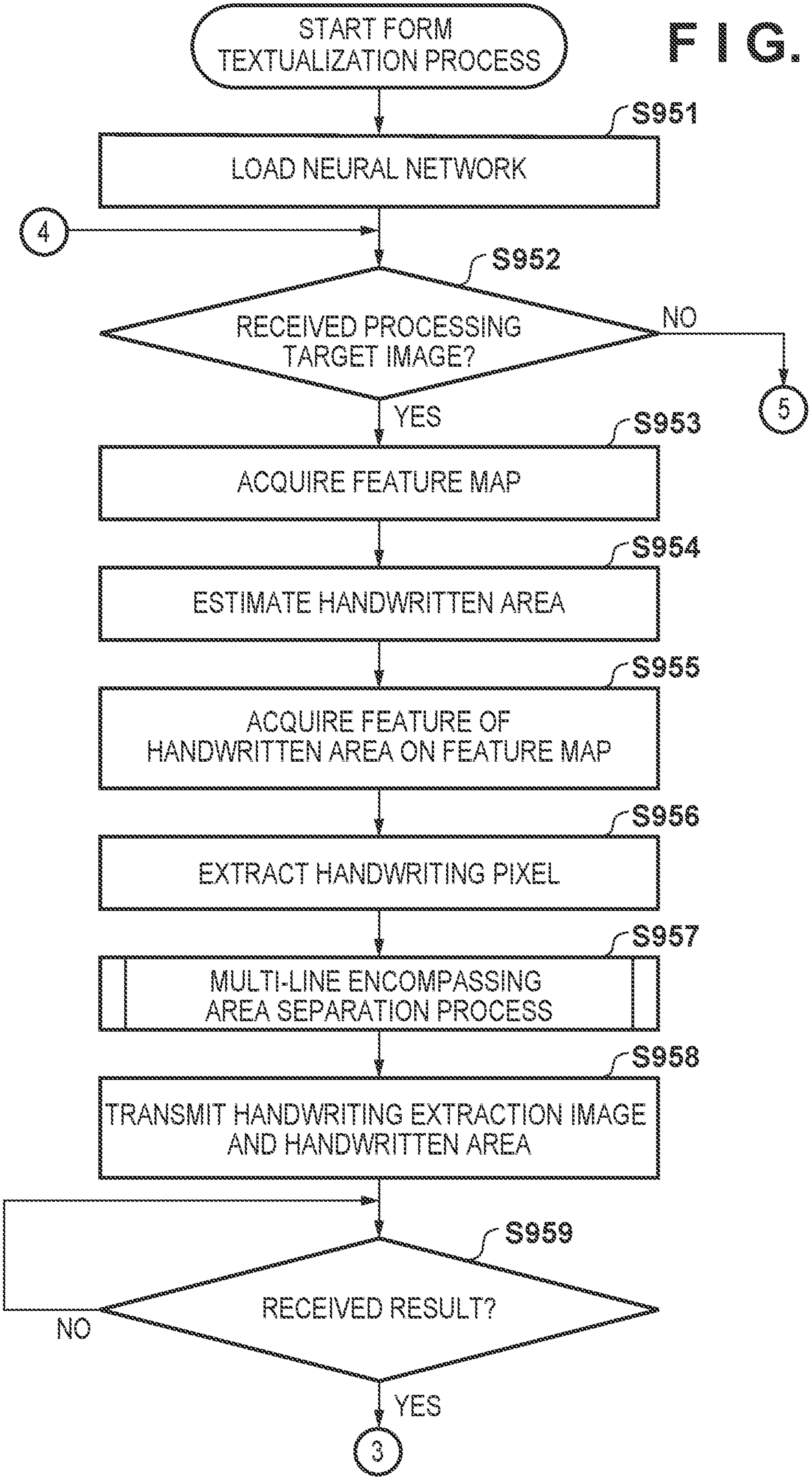

F I G. 9B2
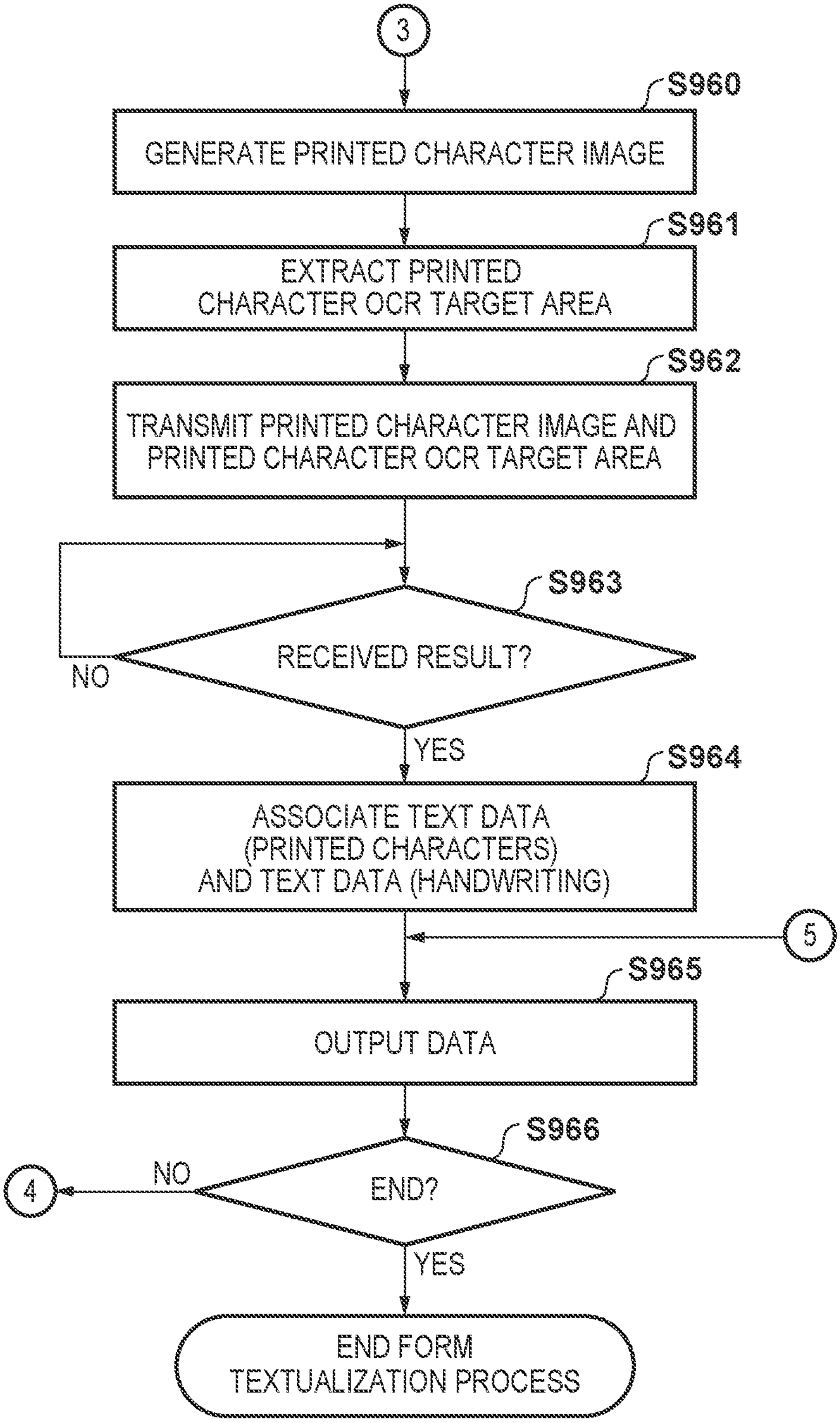

IMAGE PROCESSING SYSTEM AND IMAGE PROCESSING METHOD

BACKGROUND OF THE INVENTION

Field of the Invention

The present invention relates to an image processing system and an image processing method.

Description of the Related Art

Recently, digitization of documents handled at work has been advancing due to the changes in work environments that accompany the popularization of computers. Targets of such computerization have extended to include handwritten forms. Handwriting OCR is used when digitizing handwritten characters. Handwriting OCR is a system that outputs electronic text data when an image of characters handwritten by a user is inputted to a handwriting OCR engine.

It is desired that a portion that is an image of handwritten characters be separated from a scanned image obtained by scanning a handwritten form and then inputted into a handwriting OCR engine that executes handwriting OCR. This is because the handwriting OCR engine is configured to recognize handwritten characters, and if printed graphics, such as character images printed with specific character fonts such as printed characters or icons, are included, the recognition accuracy will become reduced.

In addition, it is desirable that an image of handwritten characters to be inputted to a handwriting OCR engine be an image in which an area is divided between each line of characters written on the form. Japanese Patent Application No. 2017-553564 proposes a method for dividing an area by generating a histogram indicating a frequency of black pixels in a line direction in an area of a character string in a character image and determining a boundary between different lines in that area of a character string based on a line determination threshold calculated from the generated histogram.

However, there is the following problem in the above prior art. For example, character shapes and line widths of handwritten characters are not necessarily constant. Therefore, when a location at which a frequency of black pixels in a line direction is low in an image of handwritten characters is made to be a boundary as in the above prior art, an unintended line is made to be a boundary, and a portion of character pixels may be missed. As a result, character recognition becomes erroneous, leading to a decrease in a character recognition rate.

SUMMARY OF THE INVENTION

The present invention enables realization of a mechanism for suppressing a decrease in a character recognition rate in handwriting OCR by appropriately specifying a space between lines of handwritten characters.

One aspect of the present invention provides an image processing system comprising: an acquisition unit configured to acquire a processing target image read from an original that is handwritten; an extraction unit configured to specify one or more handwritten areas included in the acquired processing target image and, for each specified handwritten area, extract from the processing target image a handwritten character image and a handwritten area image indicating an approximate shape of a handwritten character; a determination unit configured to determine, for a handwritten area including a plurality of lines of handwriting among the specified one or more handwritten areas, a line boundary of handwritten characters from a frequency of pixels indicating a handwritten area in a line direction of the handwritten area image; and a separation unit configured to separate into each line a corresponding handwritten area based on the line boundary that has been determined.

Another aspect of the present invention provides an image processing method comprising: acquiring a processing target image read from an original that is handwritten; specifying one or more handwritten areas included in the acquired processing target image and, for each specified handwritten area, extracting from the processing target image a handwritten character image and a handwritten area image indicating an approximate shape of a handwritten character; determining, for a handwritten area including a plurality of lines of handwriting among the specified one or more handwritten areas, a line boundary of handwritten characters from a frequency of pixels indicating a handwritten area in a line direction of the handwritten area image; and separating into each line a corresponding handwritten area based on the line boundary that has been determined.

Further features of the present invention will become apparent from the following description of exemplary embodiments (with reference to the attached drawings).

BRIEF DESCRIPTION OF THE DRAWINGS

FIGS. 6C1-6C2 is a flowchart of a ground truth data generation process according to an embodiment.

FIGS. 9B1 and 9B2 are a flowchart of a form textualization process according to an embodiment.

DESCRIPTION OF THE EMBODIMENTS

Figure 1:
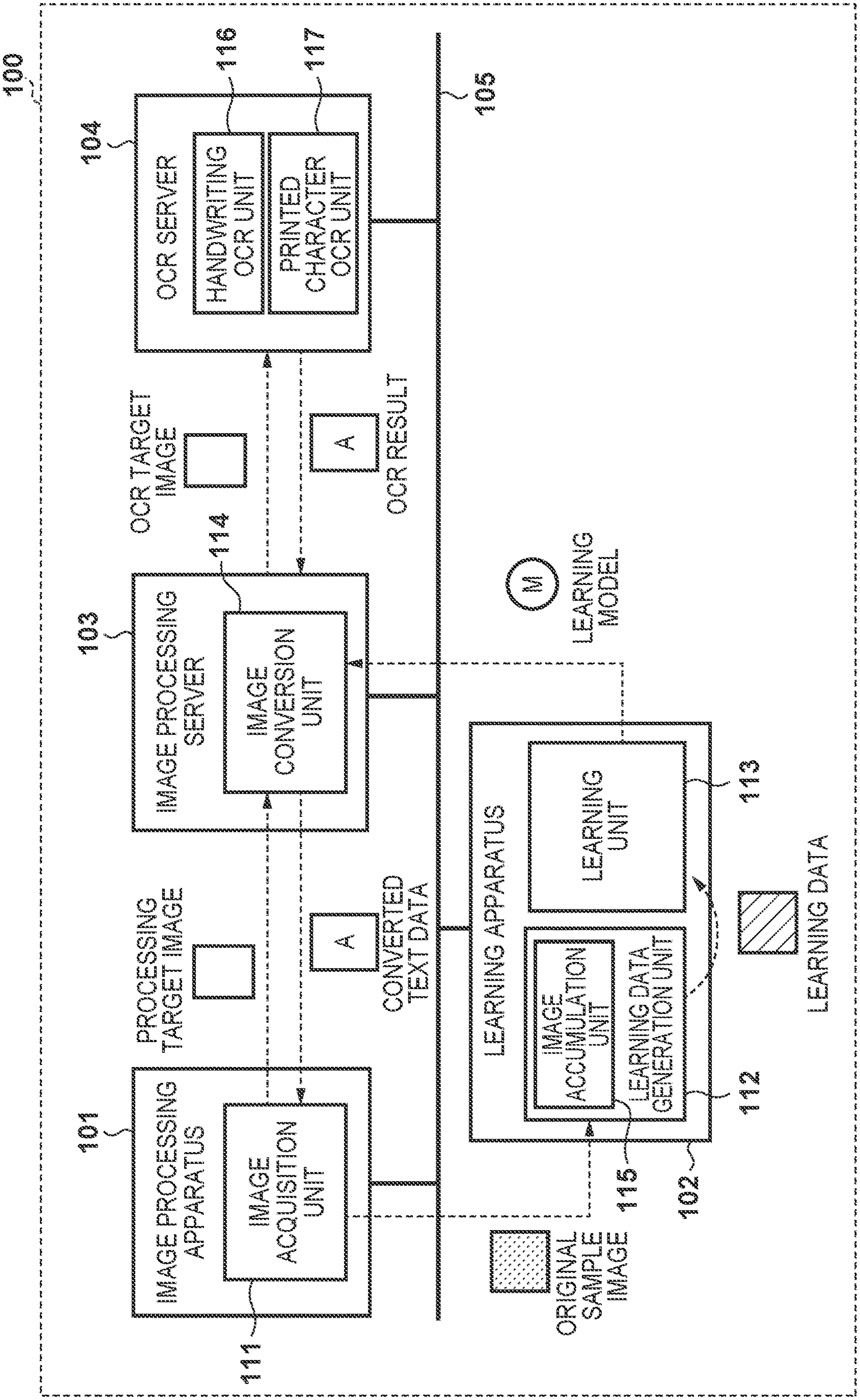
FIG. 1 illustrates a diagram of a configuration of an image processing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, an execution of optical character recognition (OCR) on a handwriting extraction image will be referred to as "handwriting OCR". It is possible to textualize (digitize) handwritten characters by handwriting OCR.

First Embodiment

Hereinafter, a first embodiment of the present invention will be described. In the present embodiment, an example in which handwritten area estimation and handwriting extraction are configured using a neural network will be described.

<Image Processing System>

First, an example of a configuration of an image processing system according to the present embodiment will be described with reference to FIG. 1. An image processing system 100 includes an image processing apparatus 101, a learning apparatus 102, an image processing server 103, and an OCR server 104. The image processing apparatus 101, the learning apparatus 102, the image processing server 103, and the OCR server 104 are connected to each other so as to be able to communicate in both directions via a network 105. Although an example in which the image processing system according to the present embodiment is realized by a plurality of apparatuses will be described here, it is not intended to limit the present invention, and the present invention may be realized by, for example, only an image processing apparatus or an image processing apparatus and at least one apparatus.

The image processing apparatus 101 is, for example, a digital multifunction peripheral called a Multi Function Peripheral (MFP) and has a printing function and a scanning function (a function as an image acquisition unit 111). The image processing apparatus 101 includes the image acquisition unit 111 generates image data by scanning an original such as a form. Hereinafter, image data acquired from an original is referred to as an "original sample image". When a plurality of originals are scanned, respective original sample images corresponding to respective sheets are acquired. These originals include those in which an entry has been made by handwriting. The image processing apparatus 101 transmits an original sample image to the learning apparatus 102 via the network 105. When textualizing a form, the image processing apparatus 101 acquires image data to be processed by scanning an original that includes handwritten characters (handwritten symbols, handwritten shapes). Hereinafter, such image data is referred to as a "processing target image." The image processing apparatus 101 transmits the obtained processing target image to the image processing server 103 via the network 105.

The learning apparatus 102 includes an image accumulation unit 115 that accumulates original sample images generated by the image processing apparatus 101. Further, the learning apparatus 102 includes a learning data generation unit 112 that generates learning data from the accumulated images. Learning data is data used for learning a neural network for performing handwritten area estimation for estimating an area of a handwritten portion of a form or the like and handwriting extraction for extracting a handwritten character string. The learning apparatus 102 has a learning unit 113 that performs learning of a neural network using the generated learning data. A process for learning the learning unit 113 generates a learning model (such as parameters of a neural network) as a learning result. The learning apparatus 102 transmits the learning model to the image processing server 103 via the network 105. The neural network in the present invention will be described later with reference to FIG. 11.

The image processing server 103 includes an image conversion unit 114 that converts a processing target image. The image conversion unit 114 generates from the processing target image an image to be subject to handwriting OCR. That is, the image conversion unit 114 performs handwritten area estimation on a processing target image generated by the image processing apparatus 101. Specifically, the image conversion unit 114 estimates (specifies) a handwritten area in a processing target image by inference by a neural network by using a learning model generated by the learning apparatus 102. Here, the actual form of a handwritten area is information indicating a partial area in a processing target image and is expressed as information comprising, for example, a specific pixel position (coordinates) on a processing target image and a width and a height from that pixel position. In addition, a plurality of handwritten areas may be obtained depending on the number of items written on a form.

Furthermore, the image conversion unit 114 performs handwriting extraction in accordance with a handwritten area obtained by handwritten area estimation. At this time, by using a learning model generated by the learning apparatus 102, the image conversion unit 114 extracts (specifies) a handwritten pixel (pixel position) in the handwritten area by inference by a neural network. Thus, it is possible to obtain a handwriting extraction image. Here, the handwritten area indicates an area divided into respective individual entries in a processing target image. Meanwhile, the handwriting extraction image indicates an area in which only a handwritten portion in a handwritten area has been extracted.

Based on results of handwritten area estimation and handwriting extraction, it is possible to extract and handle for each individual entry only handwriting in a processing target image. However, there are cases where a handwritten area acquired by estimation includes an area that cannot be appropriately divided into individual entries. Specifically, it is an area in which upper and lower lines merge (hereinafter referred to as a "multi-line encompassing area").

Figure 4A:
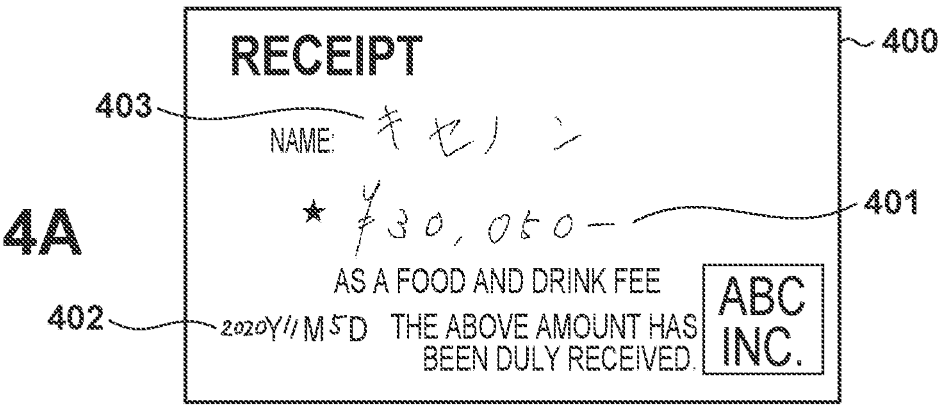
FIGS. 4A and 4B are diagrams illustrating examples of a form.
Figure 4B:
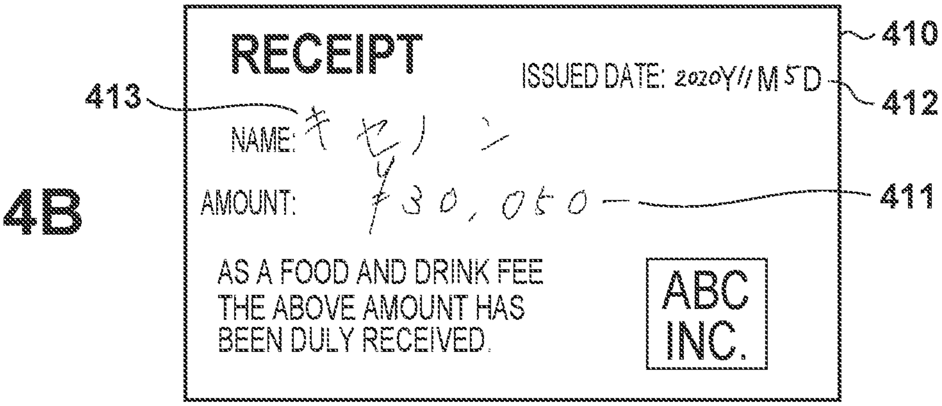
Figure 4C:
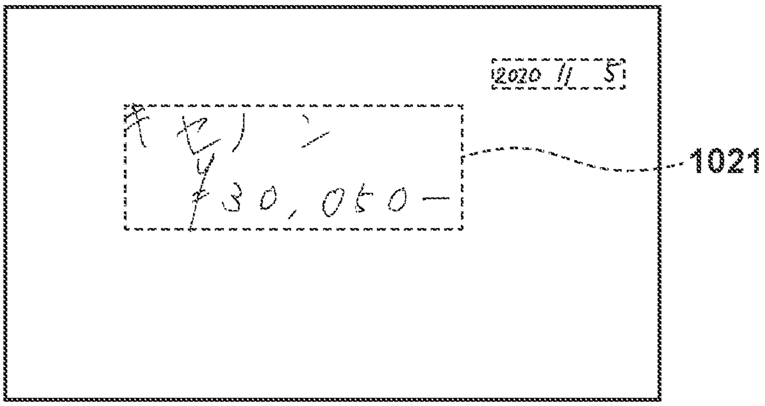
FIGS. 4C and 4D are diagrams illustrating handwritten areas that pertain to a comparative example.
Figure 4D:
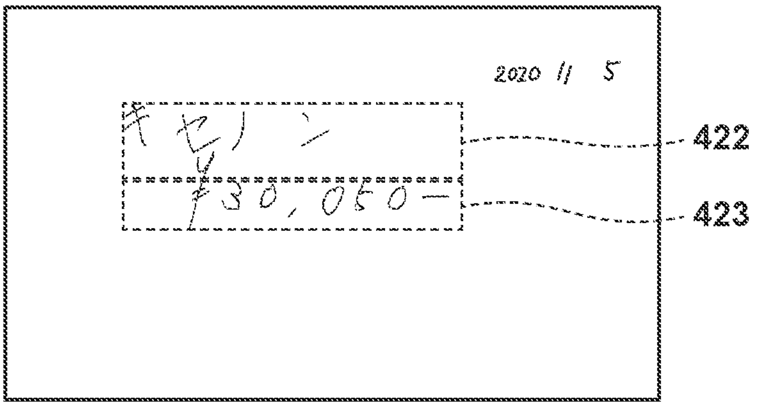

For example, FIG. 4C is a diagram illustrating a multi-line encompassing area. FIG. 4C illustrates a handwriting extraction image and handwritten areas (broken line) obtained from a form 410 of FIG. 4B to be described later. A handwritten area 1021 illustrated in FIG. 4C is a multi-line encompassing area in which the lines of upper and lower character strings are merged. In order to accurately estimate a character string by handwriting OCR, it is desirable that the handwritten area 1021 be originally acquired as separate partial areas with upper and lower lines separated. FIG. 4D illustrates a situation in which a boundary between lines is extracted for the handwritten area 1021 by a method that is a comparative example. That is, it illustrates a result of separation into individual partial areas by making a location at which a frequency of black pixels in a line direction is low in a handwriting extraction image a boundary between lines. Although the multi-line encompassing area 1021 illustrated in FIG. 4C is separated into individual handwritten areas 422 and 423, it can be seen that a handwritten character ("v"), which belongs to the handwritten area 423, is cut off at the boundary of the lines. If a space between lines cannot be accurately estimated as described above, it leads to false recognition of characters.

Therefore, the image processing server 103 according to the present embodiment executes a correction process for separating a multi-line encompassing area into individual separated areas for a handwritten area obtained by estimation. Details of the correction process will be described later. Then, the image conversion unit 114 transmits a handwriting extraction image to the OCR server 104. Thus, the OCR server 104 can be instructed to make each handwriting extraction image in which only a handwritten portion in an estimated handwritten area has been extracted a target area of handwriting OCR. Further, the image conversion unit 114 generates an image (hereinafter, referred to as a "printed character image") in which handwriting pixels have been removed from a specific pixel position (coordinates) on a processing target image by referring to the handwritten area and the handwriting extraction image.

Then, the image conversion unit 114 generates information on an area on the printed character image that includes printed characters to be subject to printed character OCR (hereinafter, this area is referred to as a "printed character area").

The generation of the printed character area will be described later. Then, the image conversion unit 114 transmits the generated printed character image and printed character area to the OCR server 104. Thus, the OCR server 104 can be instructed to make each printed character area on the printed character image a target of printed character OCR. The image conversion unit 114 receives a handwriting OCR recognition result and a printed character OCR recognition result from the OCR server 104. Then, the image conversion unit 114 combines them and transmits the result as text data to the image processing apparatus 101. Hereinafter, this text data is referred to as "form text data."

The OCR server 104 includes a handwriting OCR unit 116 and a printed character OCR unit 117. The handwriting OCR unit 116 acquires text data (OCR recognition result) by performing an OCR process on a handwriting extraction image when the handwriting extraction image is received and transmits the text data to the image processing server 103. The printed character OCR unit 117 acquires text data by performing an OCR process on a printed character area in a printed character image when the printed character image and the printed character area are received and transmits the text data to the image processing server 103.

<Configuration of Neural Network>

Figure 11:
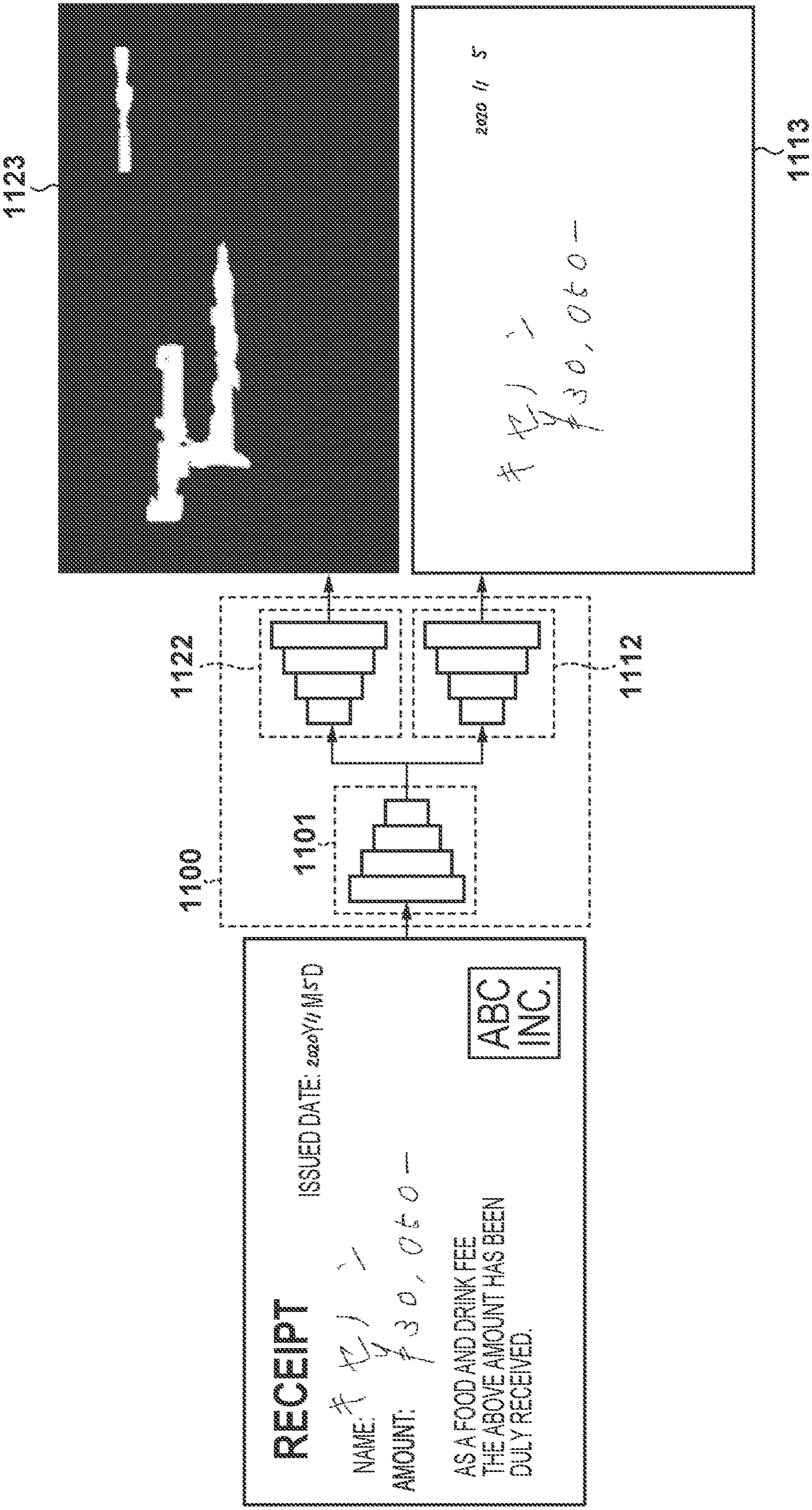
FIG. 11 is a diagram illustrating a configuration of a neural network according to an embodiment.

A description will be given for a configuration of a neural network of the system according to the present embodiment with reference to FIG. 11. A neural network 1100 according to the present embodiment performs a plurality of kinds of processes in response to input of an image. That is, the neural network 1100 performs handwritten area estimation and handwriting extraction on an inputted image. Therefore, the neural network 1100 of the present embodiment has a structure in which a plurality of neural networks, each of which processes a different task, are combined. The example of FIG. 11 is a structure in which a handwritten area estimation neural network and a handwriting extraction neural network are combined. The handwritten area estimation neural network and the handwriting extraction neural network share an encoder. In the present embodiment, an image be inputted to the neural network 1100 is a gray scale (1ch) image; however, it may be of another form such as a color (3ch) image, for example.

The neural network 1100 includes an encoder unit 1101, a pixel extraction decoder unit 1112, and an area estimation decoder unit 1122 as illustrated in FIG. 11. The neural network 1100 has a handwriting extraction neural network configured by the encoder unit 1101 and the pixel extraction decoder unit 1112. In addition, it has a handwritten area estimation neural network configured by the encoder unit 1101 and the area estimation decoder unit 1122. The two neural networks share the encoder unit 1101 which is a layer for performing the same calculation in both neural networks. Then, the structure branches to the pixel extraction decoder unit 1112 and the area estimation decoder unit 1122 depending on the task. When an image is inputted to the neural network 1100, calculation is performed in the encoder unit 1101. Then, the calculation result (a feature map) is inputted to the pixel extraction decoder unit 1112 and the area estimation decoder unit 1122, a handwriting extraction result is outputted after the calculation of the pixel extraction decoder unit 1112, and a handwritten area estimation result is outputted after the calculation of the area estimation decoder unit 1122. A reference numeral 1113 indicates a handwriting extraction image extracted by the pixel extraction decoder unit 1112. A reference numeral 1123 indicates a handwritten area estimated by the area estimation decoder unit 1122.

<Learning Sequence>

Figure 3A:
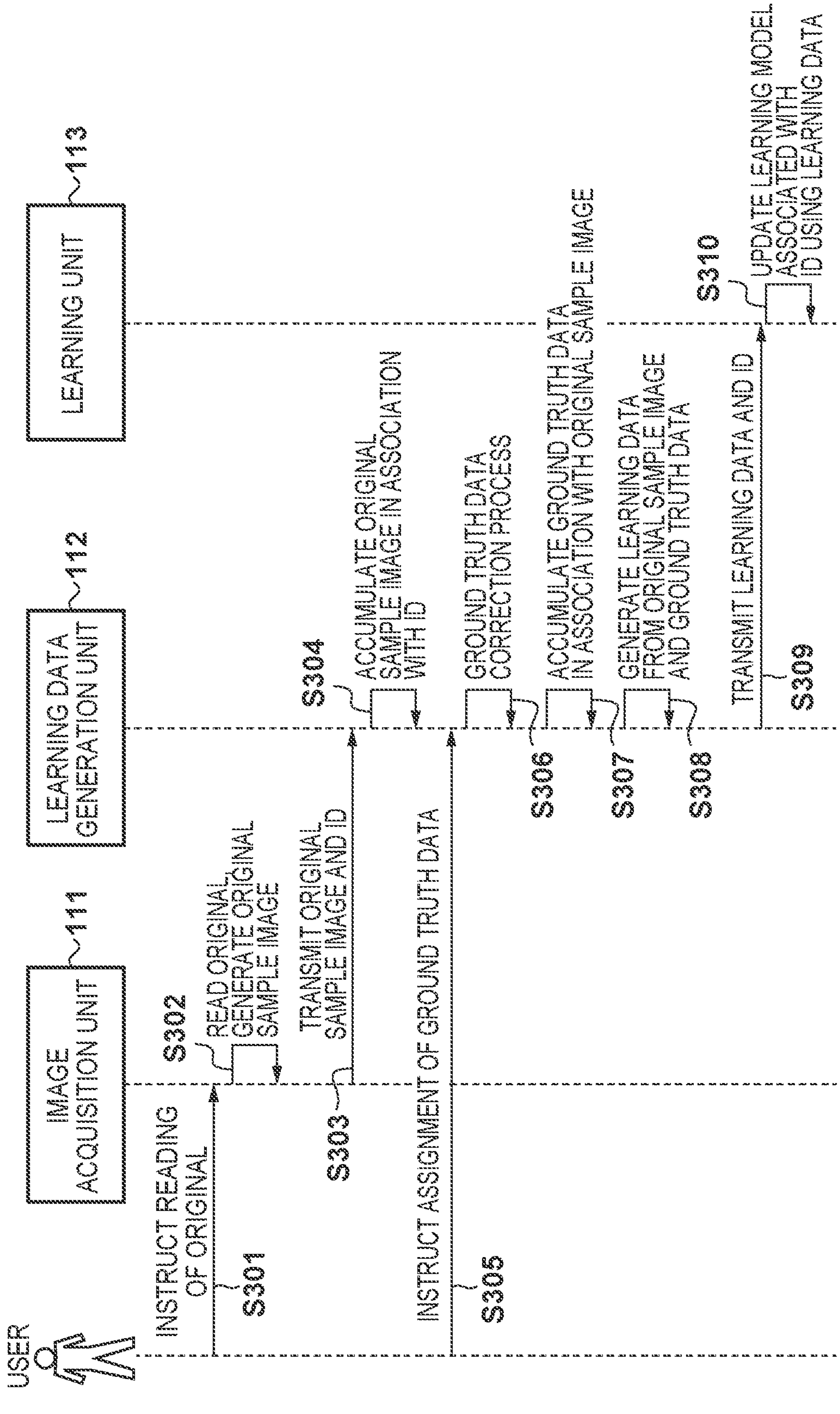
FIG. 3A is a diagram illustrating a sequence for learning the image processing system according to an embodiment.

Next, a learning sequence in the present system will be described with reference to FIG. 3A. The sequence to be described here is a process of a learning phase for generating and updating a learning model. Hereinafter, a numeral following S indicates a numeral of a processing step of the learning sequence.

In step S301, the image acquisition unit 111 of the image processing apparatus 101 receives from the user an instruction for reading an original. In step S302, the image acquisition unit 111 reads the original and generates an original sample image. Next, in step S303, the image acquisition unit 111 transmits the generated original sample image to the learning data generation unit 112. At this time, it is desirable to attach ID information to the original sample image. The ID information is, for example, information for identifying the image processing apparatus 101 functioning as the image acquisition unit 111. The ID information may be user identification information for identifying the user operating the image processing apparatus 101 or group identification information for identifying the group to which the user belongs.

Next, when the image is transmitted, in step S304, the learning data generation unit 112 of the learning apparatus 102 accumulates the original sample image in the image accumulation unit 115. Then, in step S305, the learning data generation unit 112 receives an instruction for assigning ground truth data to the original sample image, which is performed by the user to the learning apparatus 102, and acquires the ground truth data. Next, the learning data generation unit 112 executes a ground truth data correction process in step S306 and stores corrected ground truth data in the image accumulation unit 115 in association with the original sample image in step S307. The ground truth data is data used for learning a neural network. The method for providing the ground truth data and the correction process will be described later. Then, in step S308, the learning data generation unit 112 generates learning data based on the data accumulated as described above. At this time, the learning data may be generated using only an original sample image based on specific ID information. As the learning data, teacher data to which a correct label has been given may be used.

Then, in step S309, the learning data generation unit 112 transmits the learning data to the learning unit 113. When learning data is generated only by an image based on specific ID information, the ID information is also transmitted. In step S310, the learning unit 113 executes a learning process based on the received learning data and updates a learning model. The learning unit 113 may hold a learning model for each ID information and perform learning only with corresponding learning data. By associating ID information with a learning model in this way, it is possible to construct a learning model specialized for a specific use environment.

<Use (Estimation) Sequence>

Figure 3B:
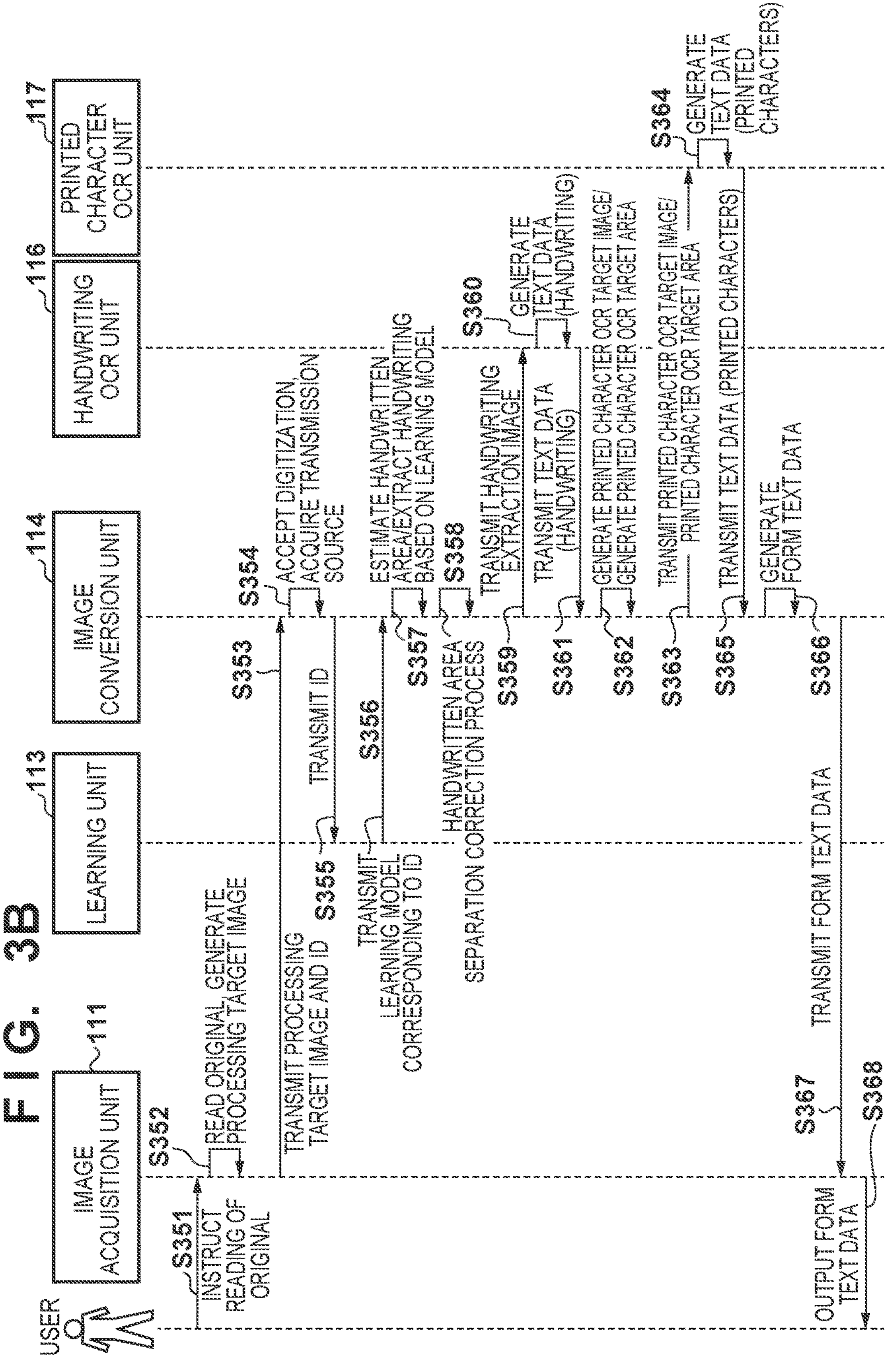
FIG. 3B is a diagram illustrating and a sequence for utilizing the image processing system according to an embodiment.

Next, a use sequence in the present system will be described with reference to FIG. 3B. The sequence to be described here is a process of an estimation phase in which a handwritten character string of a handwritten original is estimated using a generated learning model.

In step S351, the image acquisition unit 111 of the image processing apparatus 101 receives from the user an instruction for reading an original (form). In step S352, the image acquisition unit 111 reads the original and generates a processing target image. An image read here is, for example, forms 400 and 410 as illustrated in FIGS. 4A and 4B. These forms include entry fields 401 and 411 for the amount received, entry fields 402 and 412 for the date of receipt, and entry fields 403 and 413 for the addressee, and each of the amount received, date of receipt, and addressee is handwritten. However, the arrangement of these entry fields (the layout of the form) differs for each form because it is determined by a form creation source. Such a form is referred to as a non-standard form.

The description will return to that of FIG. 3B. In step S353, the image acquisition unit 111 transmits the processing target image read as described above to the image conversion unit 114. At this time, it is desirable to attach ID information to transmission data.

When data is received, in step S354, the image conversion unit 114 accepts an instruction for textualizing a processing target image and stores the image acquisition unit 111 as a data reply destination. Next, in step S355, the image conversion unit 114 specifies ID information and requests the learning unit 113 for the newest learning model. In response to this, in step S356, the learning unit 113 transmits the newest learning model to the image conversion unit 114. When ID information is specified at the time of request from the image conversion unit 114, a learning model corresponding to that ID information is transmitted.

Next, in step S357, the image conversion unit 114 performs handwritten area estimation and handwriting extraction on the processing target image using the acquired learning model. Next, in step S358, the image conversion unit 114 executes a correction process for separating a multi-line encompassing area in an estimated handwritten area into individual separated areas. Then, in step S359, the image conversion unit 114 transmits a generated handwriting extraction image for each handwritten area to the handwriting OCR unit 116. In step S360, the handwriting OCR unit 116 acquires text data (handwriting) by performing a handwriting OCR process on the handwriting extraction image. Then, in step S361, the handwriting OCR unit 116 transmits the acquired text data (handwriting) to the image conversion unit 114.

Next, in step S362, the image conversion unit 114 generates a printed character image and a printed character area from the processing target image. Then, in step S363, the image conversion unit 114 transmits the printed character image and the printed character area to the printed character OCR unit 117. In step S364, the printed character OCR unit 117 acquires text data (printed characters) by performing a printed character OCR process on the printed character image. Then, in step S365, the printed character OCR unit 117 transmits the acquired text data (printed characters) to the image conversion unit 114.

Then, in step S366, the image conversion unit 114 generates form text data based on at least the text data (handwriting) and the text data (printed characters). Next, in step S367, the image conversion unit 114 transmits the generated form text data to the image acquisition unit 111. When the form text data is acquired, in step S368, the image acquisition unit 111 presents a screen for utilizing form text data to the user. Thereafter, the image acquisition unit 111 outputs the form text data in accordance with the purpose of use of the form text data. For example, it transmits it to an external business system (not illustrated) or outputs it by printing.

<Apparatus Configuration>

Figure 2A:
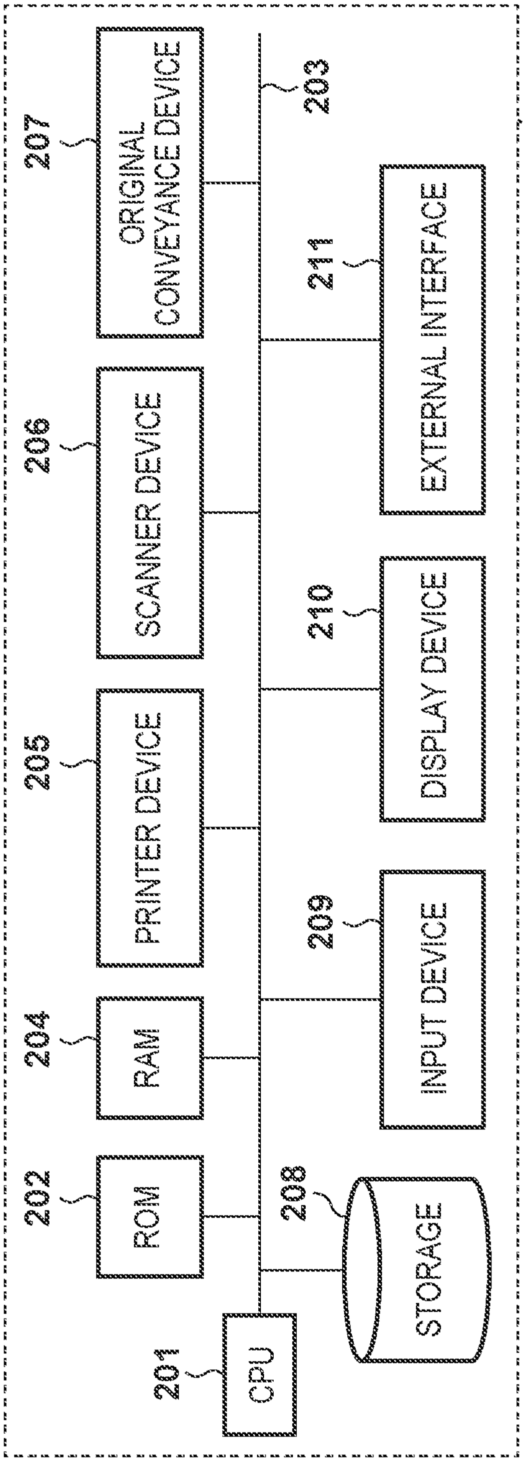
FIG. 2A is a diagram illustrating a configuration of an image processing apparatus according to an embodiment.
Figure 2B:
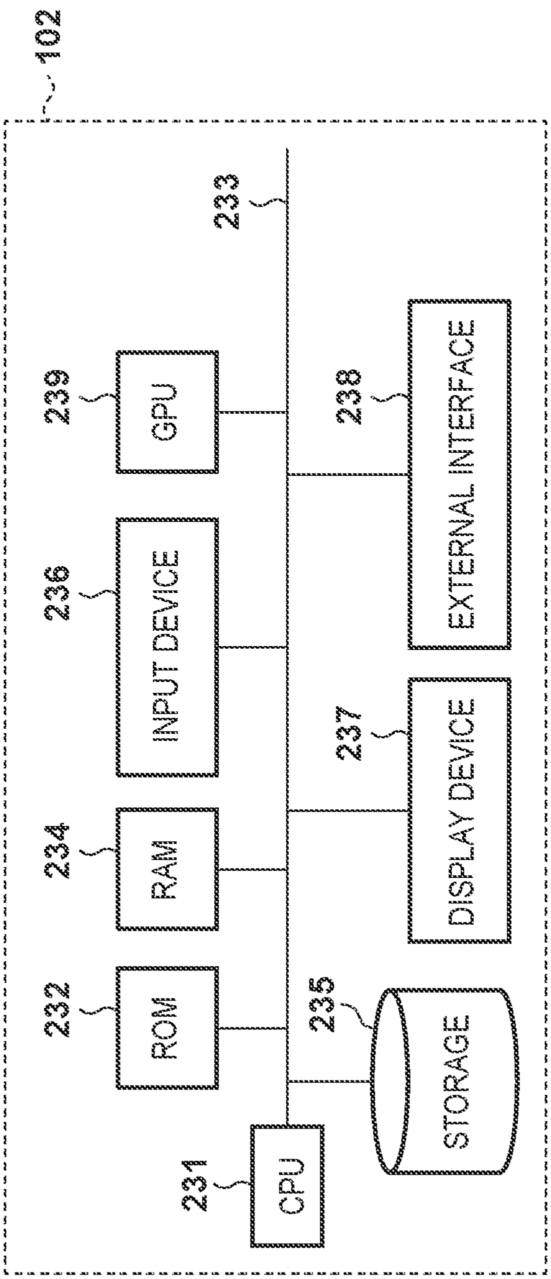
FIG. 2B is a diagram illustrating a configuration of a learning apparatus according to an embodiment.
Figure 2C:
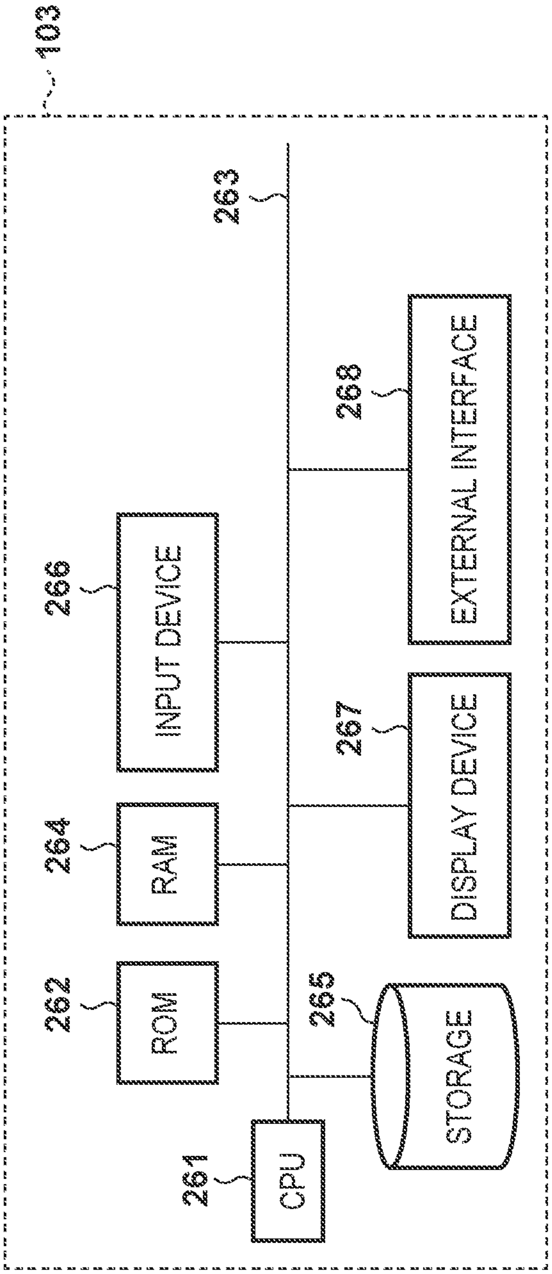
FIG. 2C is a diagram illustrating a configuration of an image processing server according to an embodiment.
Figure 2D:
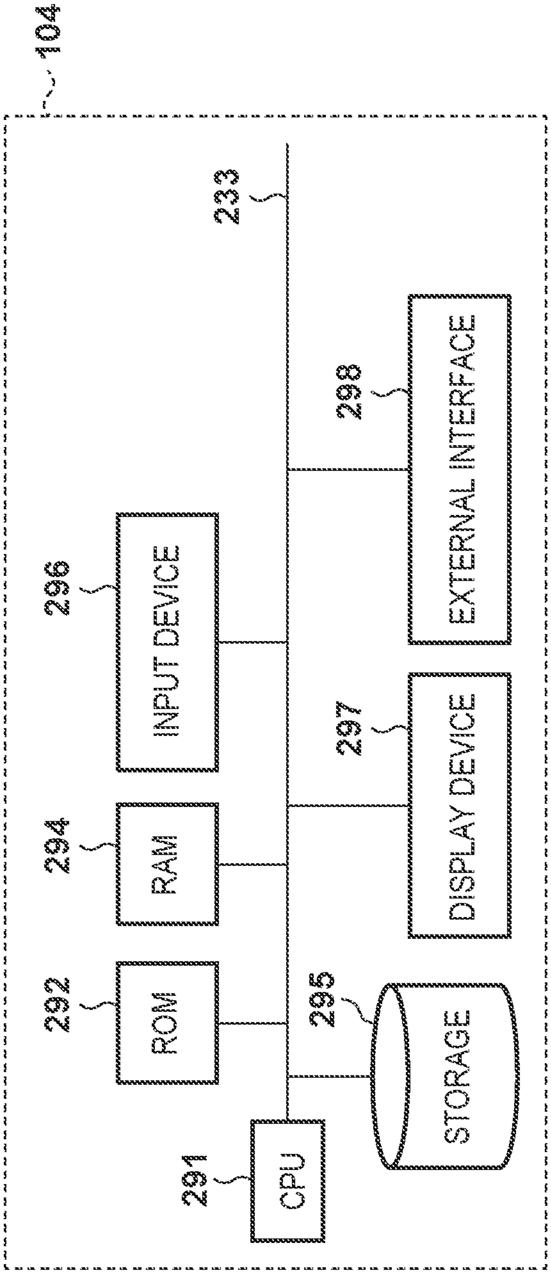
FIG. 2D is a diagram illustrating a configuration of an OCR server according to an embodiment.

Next, an example of a configuration of each apparatus in the system according to the present embodiment will be described with reference to FIG. 2. FIG. 2A illustrates an example of a configuration of the image processing apparatus, FIG. 2B illustrates an example of a configuration of the learning apparatus; FIG. 2C illustrates an example of a configuration of the image processing server; and FIG. 2D illustrates an example of a configuration of the OCR server.

The image processing apparatus 101 illustrated in FIG. 2A includes a CPU 201, a ROM 202, a RAM 204, a printer device 205, a scanner device 206, and an original conveyance device 207. The image processing apparatus 101 also includes a storage 208, an input device 209, a display device 210, and an external interface 211. Each device is connected by a data bus 203 so as to be able to communicate with each other.

The CPU 201 is a controller for comprehensively controlling the image processing apparatus 101. The CPU 201 starts an operating system (OS) by a boot program stored in the ROM 202. The CPU 201 executes on the started OS a control program stored in the storage 208. The control program is a program for controlling the image processing apparatus 101. The CPU 201 comprehensively controls the devices connected by the data bus 203. The RAM 204 operates as a temporary storage area such as a main memory and a work area of the CPU 201.

The printer device 205 prints image data onto paper (a print material or sheet). For this, there are an electrophotographic printing method in which a photosensitive drum, a photosensitive belt, and the like are used; an inkjet method in which an image is directly printed onto a sheet by ejecting ink from a tiny nozzle array; and the like; however, any method can be adopted. The scanner device 206 generates image data by converting electrical signal data obtained by scanning an original, such as paper, using an optical reading device, such as a CCD. Furthermore, the original conveyance device 207, such as an automatic document feeder (ADF), conveys an original placed on an original table on the original conveyance device 207 to the scanner device 206 one by one.

The storage 208 is a non-volatile memory that can be read and written, such as an HDD or SSD, in which various data such as the control program described above is stored. The input device 209 is an input device configured to include a touch panel, a hard key, and the like. The input device 209 receives the user's operation instruction and transmits instruction information including an instruction position to the CPU 201. The display device 210 is a display device such as an LCD or a CRT. The display device 210 displays display data generated by the CPU 201. The CPU 201 determines which operation has been performed based on instruction information received from the input device 209 and display data displayed on the display device 210. Then, in accordance with a determination result, it controls the image processing apparatus 101 and generates new display data and displays it on the display device 210.

The external interface 211 transmits and receives various types of data including image data to and from an external device via a network such as a LAN, telephone line, or near-field communication such as infrared. The external interface 211 receives PDL data from an external device such as the learning apparatus 102 or PC (not illustrated). The CPU 201 interprets the PDL data received by the external interface 211 and generates an image. The CPU 201 causes the generated image to be printed by the printer device 205 or stored in the storage 108. The external interface 211 receives image data from an external device such as the image processing server 103. The CPU 201 causes the received image data to be printed by the printer device 205, stored in the storage 108, or transmitted to another external device via the external interface 211.

The learning apparatus 102 illustrated in FIG. 2B includes a CPU 231, a ROM 232, a RAM 234, a storage 235, an input device 236, a display device 237, an external interface 238, and a GPU 239. Each unit can transmit and receive data to and from each other via a data bus 233.

The CPU 231 is a controller for controlling the entire learning apparatus 102. The CPU 231 starts an OS by a boot program stored in the ROM 232 which is a non-volatile memory. The CPU 231 executes on the started OS a learning data generation program and a learning program stored in the storage 235. The CPU 231 generates learning data by executing the learning data generation program. A neural network that performs handwriting extraction is learned by the CPU 231 executing the learning program. The CPU 231 controls each unit via a bus such as the data bus 233.

The RAM 234 operates as a temporary storage area such as a main memory and a work area of the CPU 231. The storage 235 is a non-volatile memory that can be read and written and stores the learning data generation program and the learning program described above.

The input device 236 is an input device configured to include a mouse, a keyboard and the like. The display device 237 is similar to the display device 210 described with reference to FIG. 2A. The external interface 238 is similar to the external interface 211 described with reference to FIG. 2A. The GPU 239 is an image processor and generates image data and learns a neural network in cooperation with the CPU 231.

The image processing server 103 illustrated in FIG. 2C includes a CPU 261, a ROM 262, a RAM 264, a storage 265, an input device 266, a display device 267, and an external interface 268. Each unit can transmit and receive data to and from each other via a data bus 263.

The CPU 261 is a controller for controlling the entire image processing server 103. The CPU 261 starts an OS by a boot program stored in the ROM 262 which is a non-volatile memory. The CPU 261 executes on the started OS an image processing server program stored in the storage 265. By the CPU 261 executing the image processing server program, handwritten area estimation and handwriting extraction are performed on a processing target image. The CPU 261 controls each unit via a bus such as the data bus 263.

The RAM 264 operates as a temporary storage area such as a main memory and a work area of the CPU 261. The storage 265 is a non-volatile memory that can be read and written and stores the image processing program described above.

The input device 266 is similar to the input device 236 described with reference to FIG. 2B. The display device 267 is similar to the display device 210 described with reference to FIG. 2A. The external interface 268 is similar to the external interface 211 described with reference to FIG. 2A.

The OCR server 104 illustrated in FIG. 2D includes a CPU 291, a ROM 292, a RAM 294, a storage 295, an input device 296, a display device 297, and an external interface 298. Each unit can transmit and receive data to and from each other via a data bus 293.

The CPU 291 is a controller for controlling the entire OCR server 104. The CPU 291 starts up an OS by a boot program stored in the ROM 292 which is a non-volatile memory. The CPU 291 executes on the started-up OS an OCR server program stored in the storage 295. By the CPU 291 executing the OCR server program, handwritten characters and printed characters of a handwriting extraction image and a printed character image are recognized and textualized. The CPU 291 controls each unit via a bus such as the data bus 293.

The RAM 294 operates as a temporary storage area such as a main memory and a work area of the CPU 291. The storage 295 is a non-volatile memory that can be read and written and stores the image processing program described above.

The input device 296 is similar to the input device 236 described with reference to FIG. 2B. The display device 297 is similar to the display device 210 described with reference to FIG. 2A. The external interface 298 is similar to the external interface 211 described with reference to FIG. 2A.

<Learning Phase>

A learning phase of the system according to the present embodiment will be described below.

<Operation Screen>

Figure 5A:
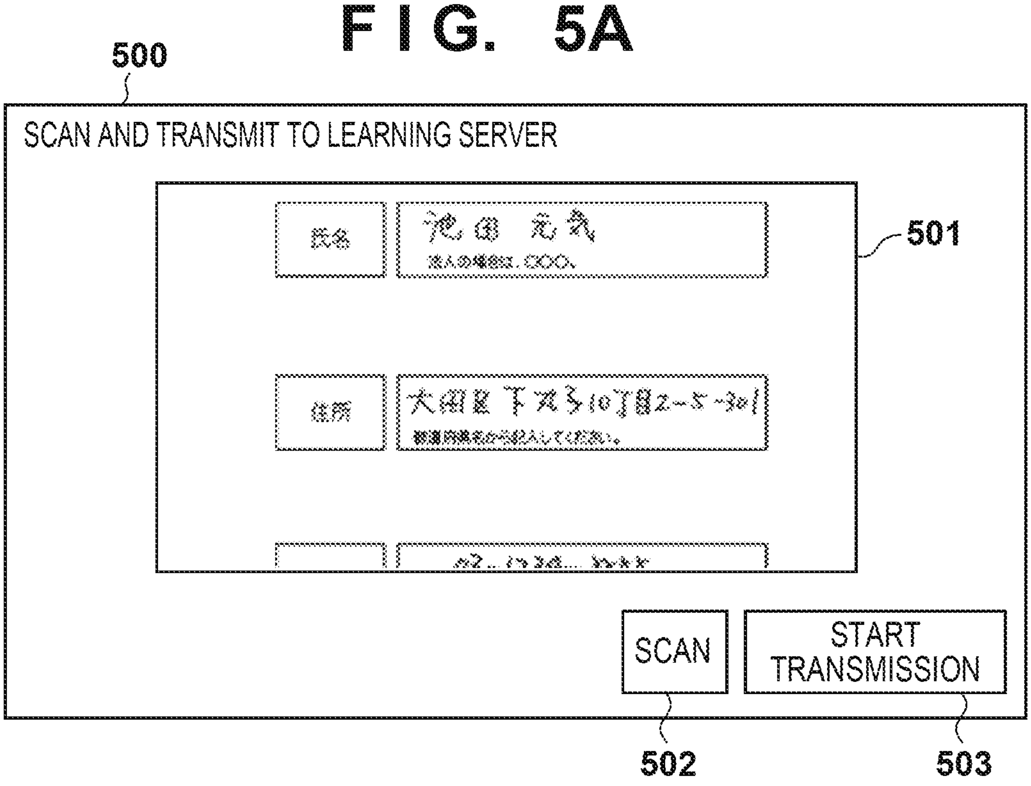
FIG. 5A is a diagram illustrating a learning original scan screen according to an embodiment.

Next, operation screens of the image processing apparatus 101 according to the present embodiment will be described with reference to FIGS. 5A to 5D. FIG. 5A illustrates a learning original scan screen for performing an instruction for reading an original in the above step S301.

A learning original scan screen 500 is an example of a screen displayed on the display device 210 of the image processing apparatus 101. The learning original scan screen 500 includes a preview area 501, a scan button 502, and a transmission start button 503. The scan button 502 is a button for starting the reading of an original set in the scanner device 206. When the scanning is completed, an original sample image is generated and the original sample image is displayed in the preview area 501. FIG. 5E illustrates an example of an original sample image. By setting another original on the scanner device 206 and pressing the scan button 502 again, it is also possible to hold a plurality of original sample images together.

When an original is read, the transmission start button 503 becomes operable. When the transmission start button 503 is operated, an original sample image is transmitted to the learning apparatus 102.

Figure 5B:
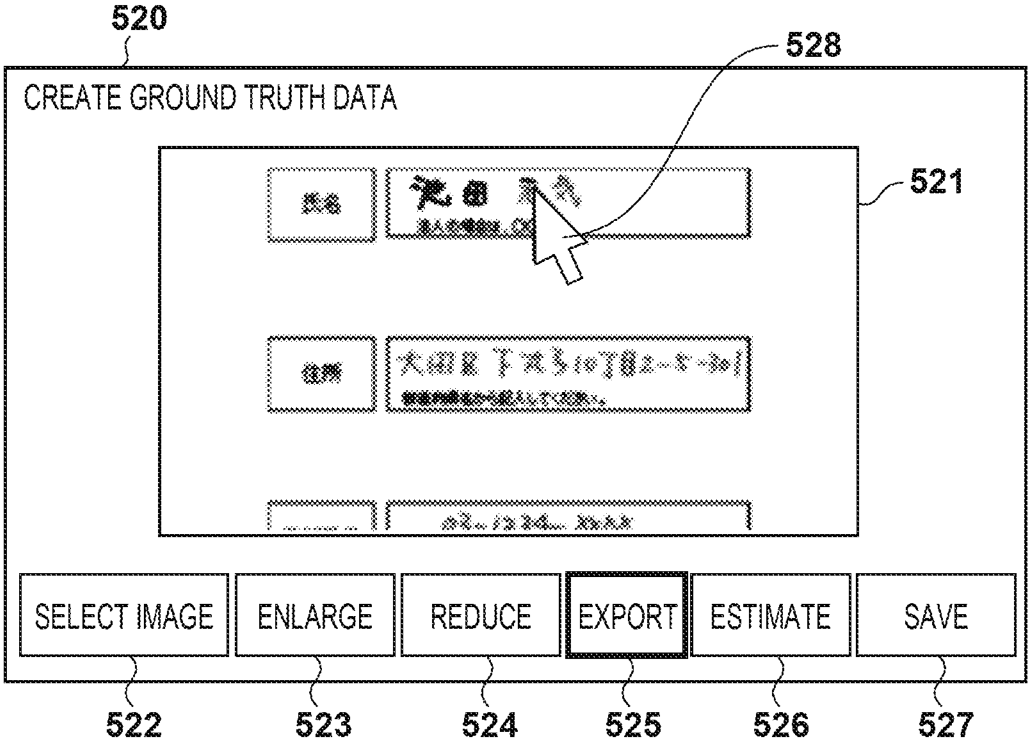
FIG. 5B is a diagram illustrating a handwriting extraction ground truth data creation screen according to an embodiment.
Figure 5C:
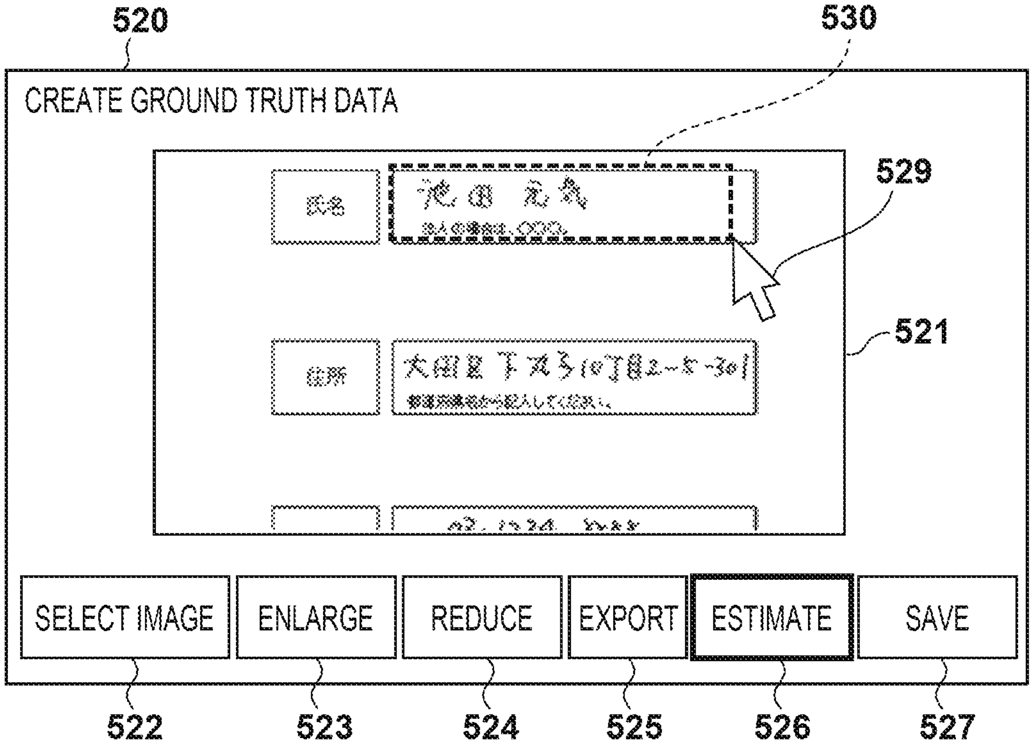
FIG. 5C is a diagram illustrating a handwritten area estimation ground truth data creation screen according to an embodiment.

FIG. 5B illustrates a handwriting extraction ground truth data creation screen and FIG. 5C illustrates a handwritten area estimation ground truth data creation screen. The user creates ground truth data by performing operations based on content displayed on the ground truth data creation screens for handwriting extraction and handwritten area estimation for performing an instruction for assigning ground truth data in the above step S305.

A ground truth data creation screen 520 functions as a setting unit and is an example of a screen displayed on the display device 237 of the learning apparatus 102. As illustrated in FIG. 5B, the ground truth data creation screen 520 includes an image display area 521, an image selection button 522, an enlargement button 523, a reduction button 524, an extraction button 525, an estimation button 526, and a save button 527.

The image selection button 522 is a button for selecting an original sample image received from the image processing apparatus 101 and stored in the image accumulation unit 115. When the image selection button 522 is operated, a selection screen (not illustrated) is displayed, and an original sample image can be selected. When an original sample image is selected, the selected original sample image is displayed in the image display area 521. The user creates ground truth data by performing operation on the original sample image displayed in the image display area 521.

The enlargement button 523 and the reduction button 524 are buttons for enlarging and reducing a display of the image display area 521. By operating the enlargement button 523 and the reduction button 524, an original sample image displayed on the image display area 521 can be displayed enlarged or reduced such that creation of ground truth data can be easily performed.

The extraction button 525 and the estimation button 526 are buttons for selecting whether to create ground truth data for handwriting extraction or handwritten area estimation. When you select either of them, the selected button is displayed highlighted. When the extraction button 525 is selected, a state in which ground truth data for handwriting extraction is created is entered. When this button is selected, the user creates ground truth data for handwriting extraction by the following operation. As illustrated in FIG. 5B, the user performs selection by operating a mouse cursor 528 via the input device 236 and tracing handwritten characters in the original sample image displayed in the image display area 521. When this operation is received, the learning data generation unit 112 stores pixel positions on the original sample image selected by the above-described operation. That is, ground truth data for handwriting extraction is the positions of pixels corresponding to handwriting on the original sample image.

Meanwhile, when the estimation button 526 is selected, a state in which ground truth data for handwritten area estimation is created is entered. FIG. 5C illustrates the ground truth data creation screen 520 in a state in which the estimation button 526 has been selected. When this button is selected, the user creates ground truth data for handwritten area estimation by the following operation. The user operates a mouse cursor 529 via the input device 236 as indicated by a dotted line frame 530 of FIG. 5C. An area enclosed in a ruled line in which handwritten characters in the original sample image displayed in the image display area 521 are written (here, inside an entry field and the ruled line is not included) is selected.

That is, this is an operation for selecting an area for each entry field of a form. When this operation is received, the learning data generation unit 112 stores the area selected by the above-described operation. That is, the ground truth data for handwritten area estimation is an area in an entry field on an original sample image (an area in which an entry is handwritten). Hereinafter, an area in which an entry is handwritten is referred to as a "handwritten area." A handwritten area created here is corrected in a ground truth data generation process to be described later.

The save button 527 is a button for saving created ground truth data. Ground truth data for handwriting extraction is accumulated in the image accumulation unit 115 as an image such as that in the following. The ground truth data for handwriting extraction has the same size (width and height) as the original sample image. The values of pixels of a handwritten character position selected by the user are values that indicate handwriting (e.g., 255; the same hereinafter). The values of other pixels are values indicating that they are not handwriting (e.g., 0; the same hereinafter). Hereinafter, such an image that is ground truth data for handwriting extraction is referred to as a "handwriting extraction ground truth image". An example of a handwriting extraction ground truth image is illustrated in FIG. 5F.

In addition, ground truth data for handwritten area estimation is accumulated in the image accumulation unit 115 as an image such as that in the following. The ground truth data for handwritten area estimation has the same size (width and height) as the original sample image. The values of pixels that correspond to a handwritten area selected by the user are values that indicate a handwritten area (e.g., 255; the same hereinafter). The values of other pixels are values indicating that they are not a handwritten area (e.g., 0; the same hereinafter). Hereinafter, such an image that is ground truth data for handwritten area estimation is referred to as a "handwritten area estimation ground truth image". An example of a handwritten area estimation ground truth image is illustrated in FIG. 5G. The handwritten area estimation ground truth image illustrated in FIG. 5G is corrected by a ground truth data generation process to be described later, and an image illustrated in FIG. 5H is a handwritten area estimation ground truth image.

Figure 5D:
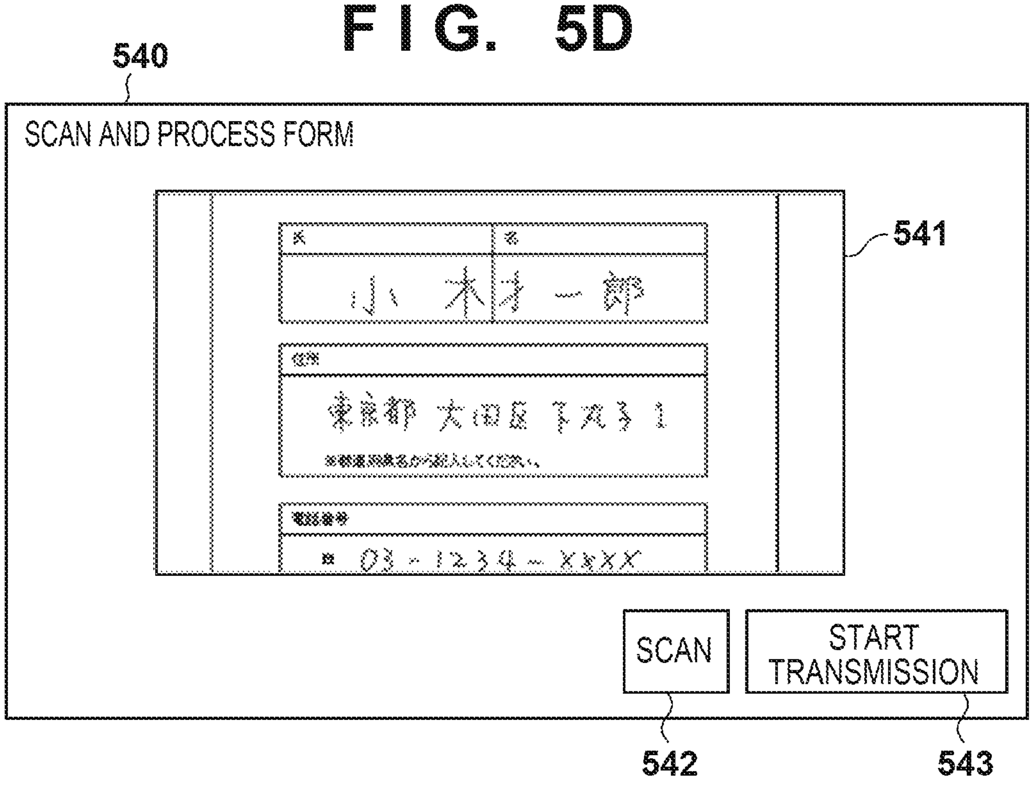
FIG. 5D is a diagram illustrating a form processing screen according to an embodiment.
Figure 5E:
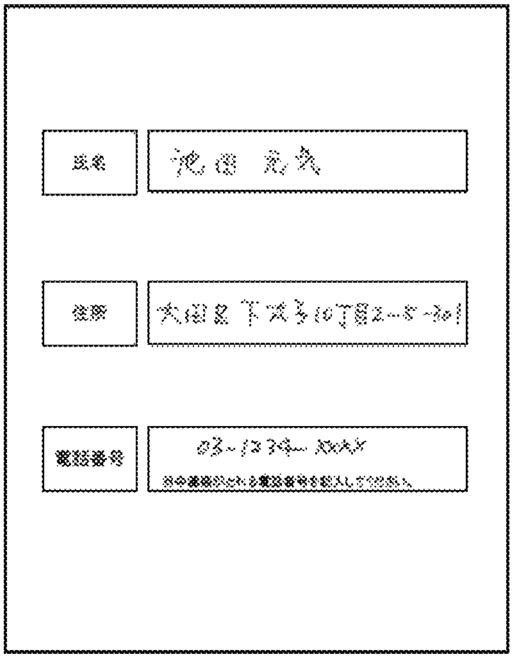
FIG. 5E is a diagram illustrating an example of a learning original sample image according to an embodiment.
Figure 5F:
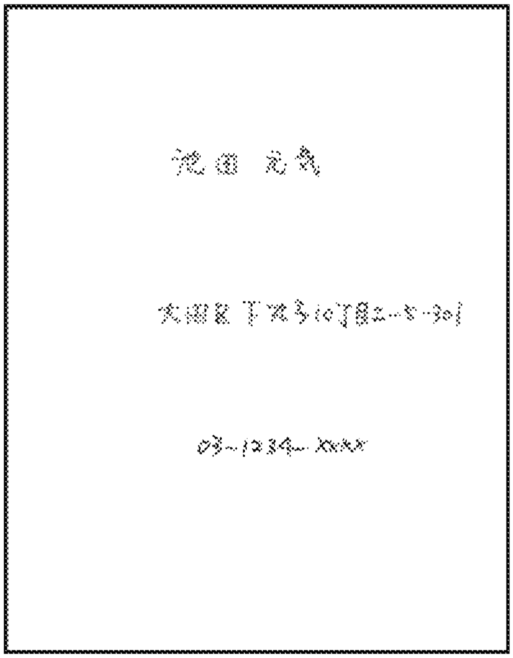
FIG. 5F is a diagram illustrating an example of handwriting extraction ground truth data according to an embodiment.
Figure 5G:
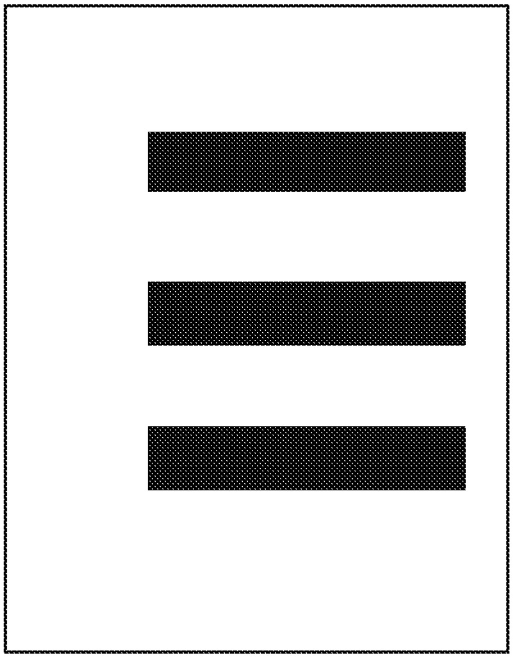
FIG. 5G is a diagram illustrating an example of handwritten area estimation ground truth data according to an embodiment.
Figure 5H:
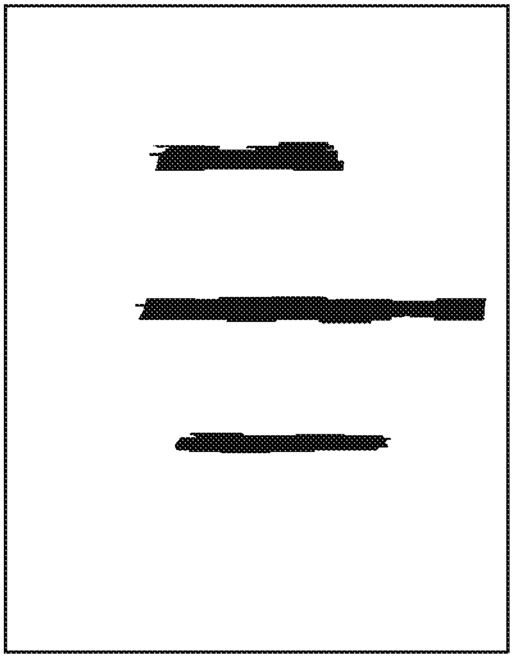
FIG. 5H is a diagram illustrating an example of corrected handwritten area estimation ground truth data according to an embodiment.

FIG. 5D illustrates a form processing screen. The user's instruction indicated in step S351 is performed in an operation screen such as that in the following. As illustrated in FIG. 5D, a form processing screen 540 includes a preview area 541, a scan button 542, and a transmission start button 543.

The scan button 542 is a button for starting the reading of an original set in the scanner device 206. When the scanning is completed, a processing target image is generated and is displayed in the preview area 541. In the form processing screen 540 illustrated in FIG. 5D, a state is that in which scanning has been executed and a read preview image is displayed in the preview area 541. When an original is read, the transmission start button 543 becomes instructable. When the transmission start button 543 is instructed, the processing target image is transmitted to the image processing server 103.

<Original Sample Image Generation Process>

Figure 6A:
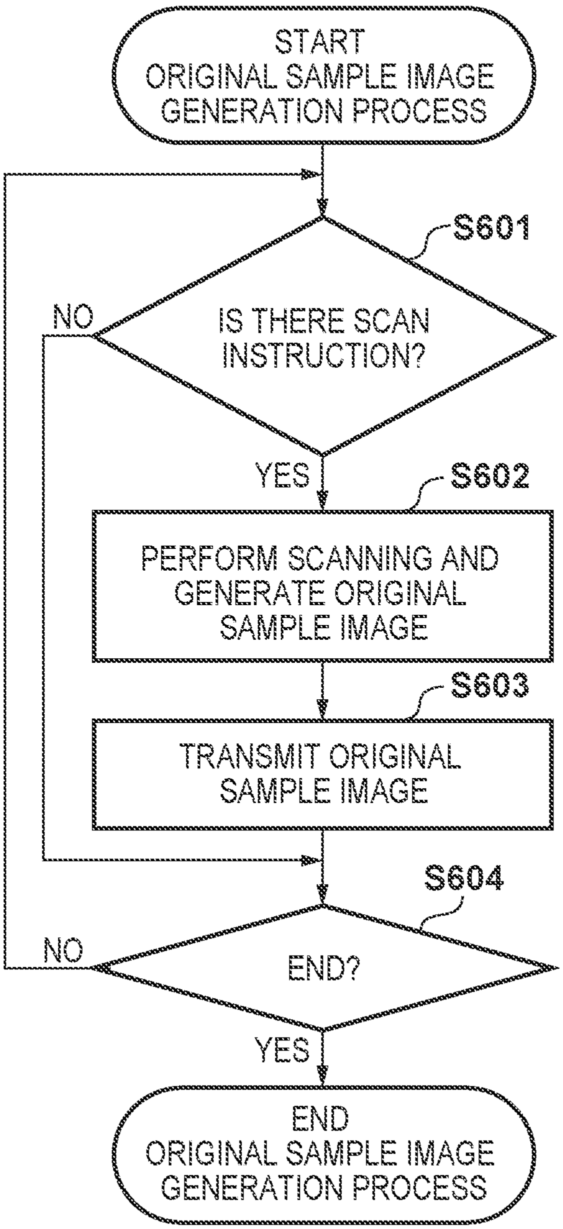
FIG. 6A is a flowchart of an original sample image generation process according to an embodiment.

Next, a processing procedure for an original sample image generation process by the image processing apparatus 101 according to the present embodiment will be described with reference to FIG. 6A. The process to be described below is realized, for example, by the CPU 201 reading the control program stored in the storage 208 and deploying and executing it in the RAM 204. This flowchart is started by the user operating the input device 209 of the image processing apparatus 101.

In step S601, the CPU 201 determines whether or not an instruction for scanning an original has been received. When the user performs a predetermined operation for scanning an original (operation of the scan button 502) via the input device 209, it is determined that a scan instruction has been received, and the process transitions to step S602. Otherwise, the process transitions to step S604.

Next, in step S602, the CPU 201 generates an original sample image by scanning the original by controlling the scanner device 206 and the original conveyance device 207. The original sample image is generated as gray scale image data. In step S603, the CPU 201 transmits the original sample image generated in step S602 to the learning apparatus 102 via the external interface 211.

Next, in step S604, the CPU 201 determines whether or not to end the process. When the user performs a predetermined operation of ending the original sample image generation process, it is determined to end the generation process, and the present process is ended. Otherwise, the process is returned to step S601.

By the above process, the image processing apparatus 101 generates an original sample image and transmits it to the learning apparatus 102. One or more original sample images are acquired depending on the user's operation and the number of originals placed on the original conveyance device 207.

<Original Sample Image Reception Process>

Figure 6B:
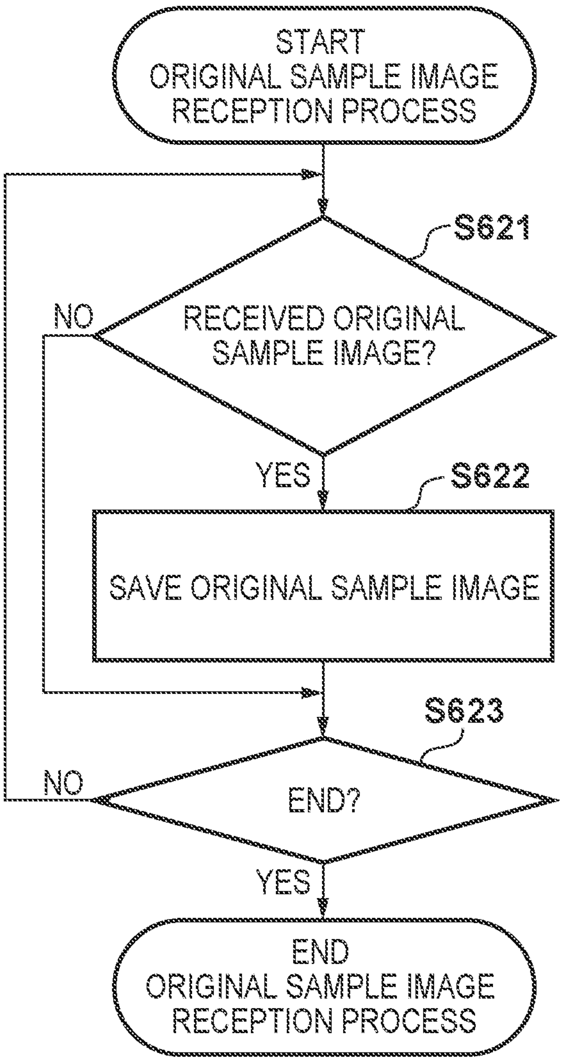
FIG. 6B is a flowchart of an original sample image reception process according to an embodiment.

Next, a processing procedure for an original sample image reception process by the learning apparatus 102 according to the present embodiment will be described with reference to FIG. 6B. The process to be described below is realized, for example, by the CPU 231 reading the learning data generation program stored in the storage 235 and deploying and executing it in the RAM 234. This flowchart starts when the user turns on the power of the learning apparatus 102.

In step S621, the CPU 231 determines whether or not an original sample image has been received. The CPU 231, if image data has been received via the external interface 238, transitions the process to step S622 and, otherwise, transitions the process to step S623. In step S622, the CPU 231 stores the received original sample image in a predetermined area of the storage 235 and transitions the process to step S623.

Next, in step S623, the CPU 231 determines whether or not to end the process. When the user performs a predetermined operation of ending the original sample image reception process such as turning off the power of the learning apparatus 102, it is determined to end the process, and the present process is ended. Otherwise, the process is returned to step S621.

<Ground Truth Data Generation Process>

Next, a processing procedure for a ground truth data generation process by the learning apparatus 102 according to the present embodiment will be described with reference to FIGS. 6C1-6C2. The processing to be described below is realized, for example, by the learning data generation unit 112 of the learning apparatus 102. This flowchart is started by the user performing a predetermined operation via the input device 236 of the learning apparatus 102. As the input device 236, a pointing device such as a mouse or a touch panel device can be employed.

In step S641, the CPU 231 determines whether or not an instruction for selecting an original sample image has been received. When the user performs a predetermined operation (an instruction of the image selection button 522) for selecting an original sample image via the input device 236, the process transitions to step S642. Otherwise, the process transitions to step S643. In step S642, the CPU 231 reads from the storage 235 the original sample image selected by the user in step S641, outputs it to the user, and returns the process to step S641. For example, the CPU 231 displays in the image display area 521 the original sample image selected by the user.

Meanwhile, in step S643, the CPU 231 determines whether or not the user has made an instruction for inputting ground truth data. If the user has performed via the input device 236 an operation of tracing handwritten characters on an original sample image or tracing a ruled line frame in which handwritten characters are written as described above, it is determined that an instruction for inputting ground truth data has been received, and the process transitions to step S644. Otherwise, the process transitions to step S647.

In step S644, the CPU 231 determines whether or not ground truth data inputted by the user is ground truth data for handwriting extraction. If the user has performed an operation for instructing creation of ground truth data for handwriting extraction (selected the extraction button 525), the CPU 231 determines that it is the ground truth data for handwriting extraction and transitions the process to step S645. Otherwise, that is, when the ground truth data inputted by the user is ground truth data for handwritten area estimation (the estimation button 526 is selected), the process transitions to step S646.

In step S645, the CPU 231 temporarily stores in the RAM 234 the ground truth data for handwriting extraction inputted by the user and returns the process to step S641. As described above, the ground truth data for handwriting extraction is position information of pixels corresponding to handwriting in an original sample image.

Figure 6D:
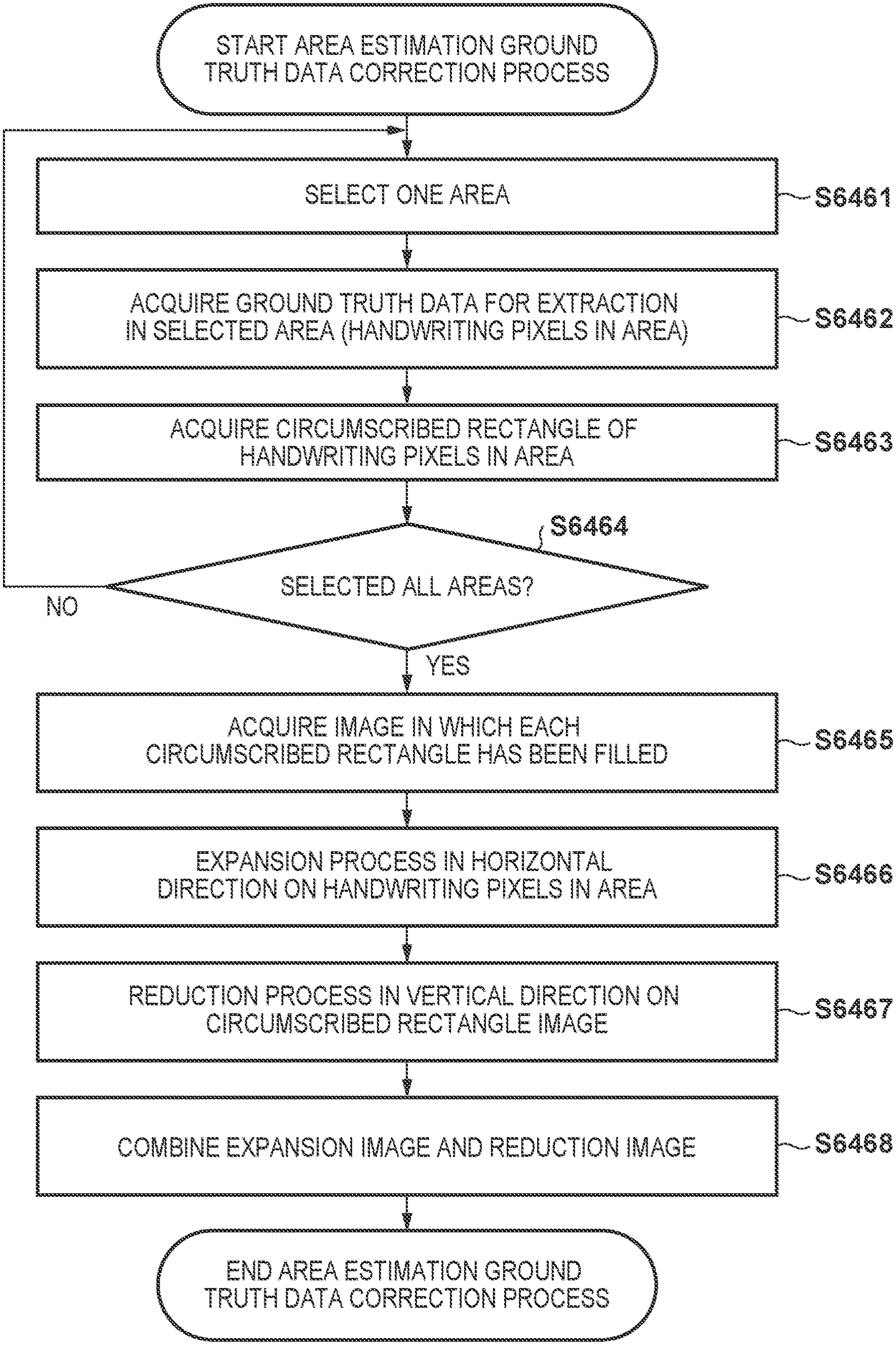
FIG. 6D is a flowchart of an area estimation ground truth data correction process according to an embodiment.

Meanwhile, in step S646, the CPU 231 corrects ground truth data for handwritten area estimation inputted by the user and temporarily stores the corrected ground truth data in the RAM 234. Here, a detailed procedure for a correction process of step S646 will be described with reference to FIG. 6D. There are two purposes of this correction process. One is to make ground truth data for handwritten area estimation into ground truth data that captures a rough shape (approximate shape) of a character so that it is robust to a character shape and a line width of a handwritten character (a handwritten character expansion process). The other is to make data that indicates that characters of the same item in ground truth data are in the same line into ground truth data (a handwritten area reduction process).

First, in step S6461, the CPU 231 selects one handwritten area by referring to the ground truth data for handwritten area estimation. Then, in step S6462, the CPU 231 acquires, in the ground truth data for handwriting extraction, ground truth data for handwriting extraction that belongs to the handwritten area selected in step S6461. In step S6463, the CPU 231 acquires a circumscribed rectangle containing handwriting pixels acquired in step S6462. Then, in step S6464, the CPU 231 determines whether or not the process from steps S6462 to S6463 has been performed for all the handwritten areas. If it is determined that it has been performed, the process transitions to step S6465; otherwise, the process returns to step S6461, and the process from steps S6461 to S6463 is repeated.

In step S6465, the CPU 231 generates a handwriting circumscribed rectangle image containing information indicating that each pixel in each circumscribed rectangle acquired in step S6463 is a handwritten area. Here, a handwriting circumscribed rectangle image is an image in which a rectangle is filled. Next, in step S6466, the CPU 231 generates a handwriting pixel expansion image in which a width of a handwriting pixel has been made wider by horizontally expanding ground truth data for handwriting extraction. In the present embodiment, an expansion process is performed a predetermined number of times (e.g., 25 times). Also, in step S6467, the CPU 231 generates a handwriting circumscribed rectangle reduction image in which a height of a circumscribed rectangle has been made narrower by vertically reducing the handwriting circumscribed rectangle image generated in step S6465. In the present embodiment, a reduction process is performed until a height of a reduced circumscribed rectangle becomes ⅔ or less of an unreduced circumscribed rectangle.

Next, in step S6468, the CPU 231 combines the handwriting pixel expansion image generated in step S6466 and the circumscribed rectangle reduction image generated in step S6467, performs an update with the result as ground truth data for handwritten area estimation, and ends the process. As described above, ground truth data for handwritten area estimation is information on an area corresponding to a handwritten area in an original sample image. After this process, the process returns to the ground truth data generation process illustrated in FIGS. 6C1-6C2, and the process transitions to step S647.

The description returns to that of the flowchart of FIGS. 6C1-6C2. In step S647, the CPU 231 determines whether or not an instruction for saving ground truth data has been received. When the user performs a predetermined operation for saving ground truth data (instruction of the save button 527) via the input device 236, it is determined that a save instruction has been received, and the process transitions to step S648. Otherwise, the process transitions to step S650.

In step S648, the CPU 231 generates a handwriting extraction ground truth image and stores it as ground truth data for handwriting extraction. Here, the CPU 231 generates a handwriting extraction ground truth image as follows. The CPU 231 generates an image of the same size as the original sample image read in step S642 as a handwriting extraction ground truth image. Furthermore, the CPU 231 makes all pixels of the image a value indicating that it is not handwriting. Next, in step S645, the CPU 231 refers to position information temporarily stored in the RAM 234 and changes values of pixels at corresponding locations on the handwriting extraction ground truth image to a value indicating that it is handwriting. A handwriting extraction ground truth image thus generated is stored in a predetermined area of the storage 235 in association with the original sample image read in step S642.

Next, in step S649, the CPU 231 generates a handwritten area estimation ground truth image and stores it as ground truth data for handwritten area estimation. Here, the CPU 231 generates a handwritten area estimation ground truth image as follows. The CPU 231 generates an image of the same size as the original sample image read in step S642 as a handwritten area estimation ground truth image. The CPU 231 makes all pixels of the image a value indicating that it is not a handwritten area. Next, in step S646, the CPU 231 refers to area information temporarily stored in the RAM 234 and changes values of pixels in a corresponding area on the handwritten area estimation ground truth image to a value indicating that it is a handwritten area. The CPU 231 stores the handwritten area estimation ground truth image thus generated in a predetermined area of the storage 235 in association with the original sample image read in step S642 and the handwriting extraction ground truth image created in step S648 and returns the process to step S641.

Meanwhile, when it is determined that a save instruction has not been accepted in step S647, in step S650, the CPU 231 determines whether or not to end the process. When the user performs a predetermined operation for ending the ground truth data generation process, the process ends. Otherwise, the process is not ended and the process is returned to step S641.

<Learning Data Generation Process>

Figure 7A:
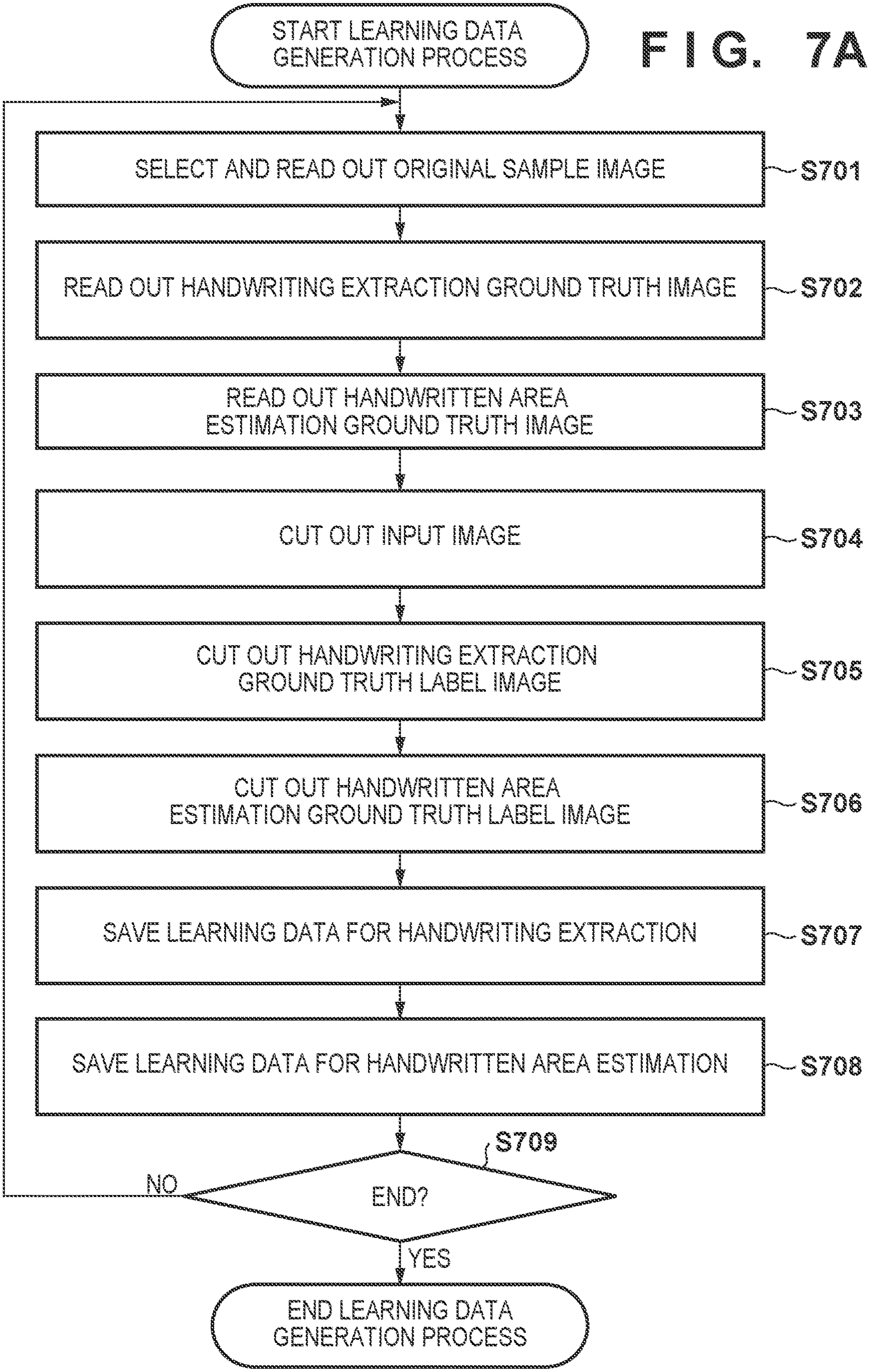
FIG. 7A is a flowchart of a learning data generation process according to an embodiment.

Next, a procedure for generation of learning data by the learning apparatus 102 according to the present embodiment will be described with reference to FIG. 7A. The processing to be described below is realized by the learning data generation unit 112 of the learning apparatus 102. This flowchart is started by the user performing a predetermined operation via the input device 209 of the image processing apparatus 101.

First, in step S701, the CPU 231 selects and reads an original sample image stored in the storage 235. Since a plurality of original sample images are stored in the storage 235 by the process of step S622 of the flowchart of FIG. 6B, the CPU 231 randomly selects from among them. Next, in step S702, the CPU 231 reads a handwriting extraction ground truth image stored in the storage 235. Since a handwriting extraction ground truth image associated with the original sample image read in step S701 is stored in the storage 235 by a process of step S648, the CPU 231 reads it out. Furthermore, in step S703, the CPU 231 reads a handwritten area estimation ground truth image stored in the storage 235. Since a handwritten area estimation ground truth image associated with the original sample image read in step S701 is stored in the storage 235 by a process of step S649, the CPU 231 reads it out.

In step S704, the CPU 231 cuts out a portion (e.g., a size of height×width=256×256) of the original sample image read in step S701 and generates an input image to be used for learning data. A cutout position may be determined randomly. Next, in step S705, the CPU 231 cuts out a portion of the handwriting extraction ground truth image read out in step S702 and generates a ground truth label image (teacher data, ground truth image data) to be used for learning data for handwriting extraction. Hereinafter, this ground truth label image is referred to as a "handwriting extraction ground truth label image." A cutout position and a size are made to be the same as the position and size at which an input image is cut out from the original sample image in step S704. Furthermore, in step S706, the CPU 231 cuts out a portion of the handwritten area estimation ground truth image read out in step S703 and generates a ground truth label image to be used for learning data for handwritten area estimation. Hereinafter, this ground truth label image is referred to as a "handwritten area estimation ground truth label image." A cutout position and a size are made to be the same as the position and size at which an input image is cut out from the original sample image in step S704.

Figure 8A:
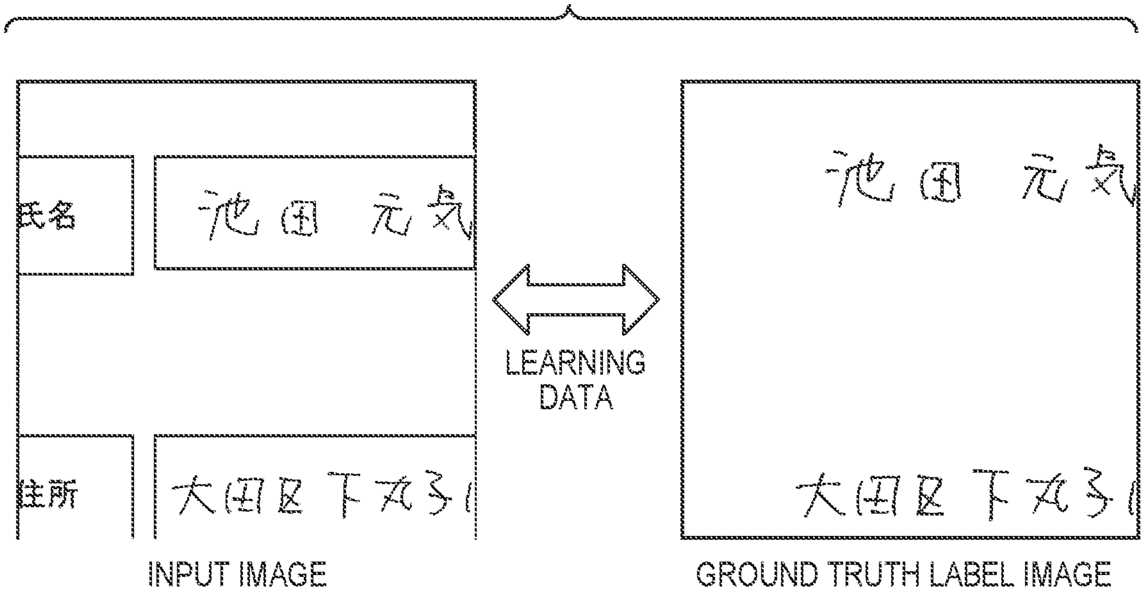
FIG. 8A is a diagram illustrating an example of a configuration of learning data for handwriting extraction according to an embodiment.
Figure 8B:
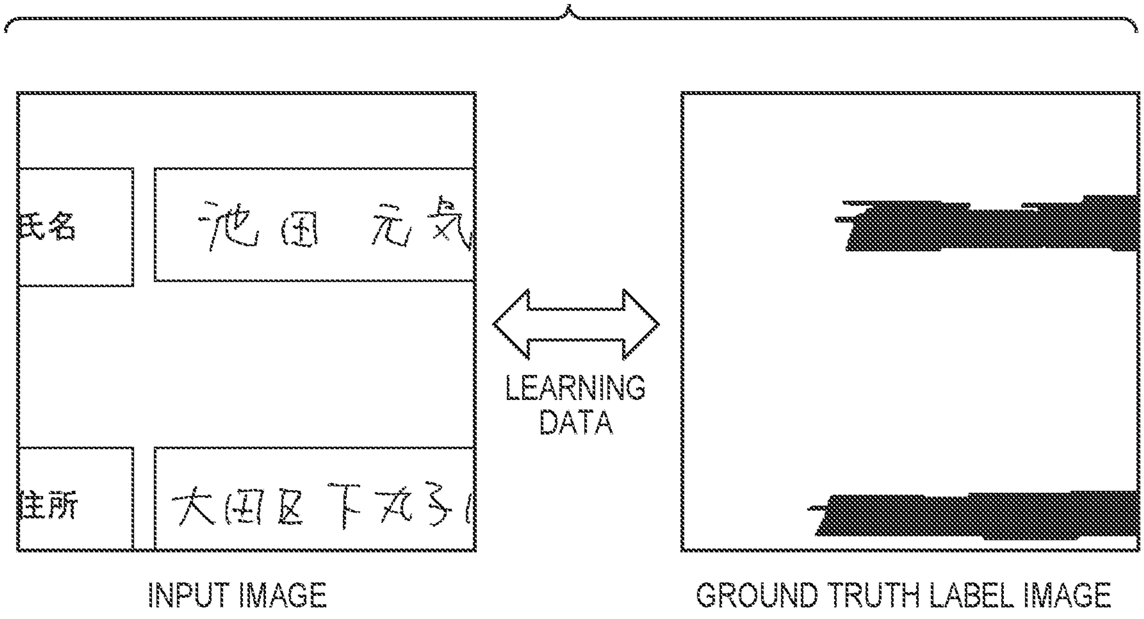
FIG. 8B is a diagram illustrating an example of a configuration of learning data for handwritten area estimation according to an embodiment.

Next, in step S707, the CPU 231 associates the input image generated in step S704 with the handwriting extraction ground truth label image generated in step S706 and stores the result in a predetermined area of the storage 235 as learning data for handwriting extraction. In the present embodiment, learning data such as that in FIG. 8A is stored. Next, in step S708, the CPU 231 associates the input image generated in step S704 with the handwritten area estimation ground truth label image generated in step S706 and stores the result in a predetermined area of the storage 235 as learning data for handwritten area estimation. In the present embodiment, learning data such as that in FIG. 8B is stored. A handwritten area estimation ground truth label image is made to be associated with the handwriting extraction ground truth label image generated in step S706 by being associated with the input image generated in step S704.

Next, in step S709, the CPU 231 determines whether or not to end the learning data generation process. If the number of learning data determined in advance has been generated, the CPU 231 determines that the generation process has been completed and ends the process. Otherwise, it is determined that the generation process has not been completed, and the process returns to step S701. Here, the number of learning data determined in advance may be determined, for example, at the start of this flowchart by user specification via the input device 236 of the learning apparatus 102.

By the above, learning data of the neural network 1100 is generated. In order to enhance the versatility of a neural network, learning data may be processed. For example, an input image may be scaled at a scaling ratio that is determined by being randomly selected from a predetermined range (e.g., between 50% and 150%). In this case, handwritten area estimation and handwriting extraction ground truth label images are similarly scaled. Alternatively, an input image may be rotated at a rotation angle that is determined by being randomly selected from a predetermined range (e.g., between −10 degrees and 10 degrees). In this case, handwritten area estimation and handwriting extraction ground truth label images are similarly rotated. Taking scaling and rotation into account, a slightly larger size (for example, a size of height×width=512×512) is used for when an input image and handwritten area estimation and handwriting extraction ground truth label images are cut out in steps S704, S705, and S706. Then, after scaling and rotation, cutting-out from a center portion is performed so as to achieve a size (for example, height×width=256×256) of a final input image and handwritten area estimation and handwriting extraction ground truth label images. Alternatively, processing may be performed by changing the brightness of each pixel of an input image. That is, the brightness of an input image is changed using gamma correction. A gamma value is determined by random selection from a predetermined range (e.g., between 0.1 and 10.0).

<Learning Process>

Figure 7B:
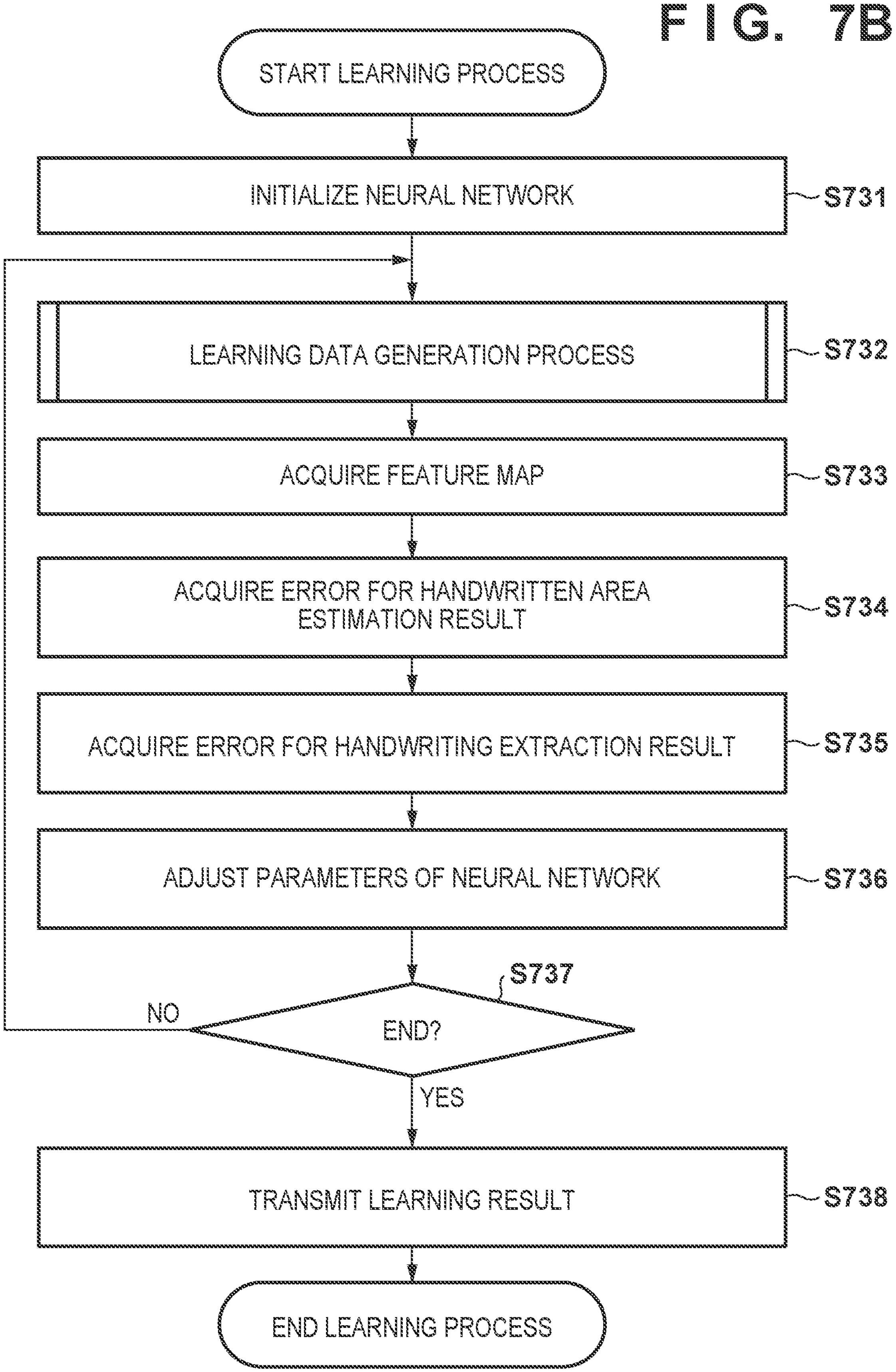
FIG. 7B is a flowchart of a learning process according to an embodiment.

Next, a processing procedure for a learning process by the learning apparatus 102 will be described with reference to FIG. 7B. The processing to be described below is realized by the learning unit 113 of the learning apparatus 102. This flowchart is started by the user performing a predetermined operation via the input device 236 of the learning apparatus 102. In the present embodiment, it is assumed that a mini-batch method is used for learning the neural network 1100.

First, in step S731, the CPU 231 initializes the neural network 1100. That is, the CPU 231 constructs the neural network 1100 and initializes the values of parameters included in the neural network 1100 by random determination. Next, in step S732, the CPU 231 acquires learning data. Here, the CPU 231 acquires a predetermined number (mini-batch size, for example, 10) of learning data by executing the learning data generation process illustrated in the flowchart of FIG. 7A.

Next, in step S733, the CPU 231 acquires output of the encoder unit 1101 of the neural network 1100 illustrated in FIG. 11. That is, the CPU 231 acquires a feature map outputted from the encoder unit 1112 by inputting an input image included in learning data for handwritten area estimation and handwriting extraction, respectively, to the neural network 1100. Next, in step S734, the CPU 231 calculates an error for a result of handwritten area estimation by the neural network 1100. That is, the CPU 231 acquires output of the area estimation decoder unit 1122 by inputting the feature map acquired in step S733 to the area estimation decoder unit 1122. The output is the same image size as the input image, and a prediction result is an image in which a pixel determined to be a handwritten area has a value that indicates that the pixel is a handwritten area, and a pixel determined otherwise has a value that indicates that the pixel is not a handwritten area. Then, the CPU 231 evaluates a difference between the output and the handwritten area estimation ground truth label image included in the learning data and obtains an error. Cross entropy can be used as an index for the evaluation.

In step S735, the CPU 231 calculates an error for a result of handwriting extraction by the neural network 1100. That is, the CPU 231 acquires output of the pixel extraction decoder unit 1112 by inputting the feature map acquired in step S733 to the pixel extraction decoder unit 1112. The output is an image that is the same image size as the input image and in which, as a prediction result, a pixel determined to be handwriting has a value that indicates that the pixel is handwriting and a pixel determined otherwise has a value that indicates that the pixel is not handwriting. Then, the CPU 231 obtains an error by evaluating a difference between the output and the handwriting extraction ground truth label image included in the learning data. Similarly to handwritten area estimation, cross entropy can be used as an index for the evaluation.

In step S736, the CPU 231 adjusts parameters of the neural network 1100. That is, the CPU 231 changes parameter values of the neural network 1100 by a back propagation method based on the errors calculated in steps S734 and S735.

Then, in step S737, the CPU 231 determines whether or not to end learning. Here, for example, the CPU 231 determines whether or not the process from step S732 to step S736 has been performed a predetermined number of times (e.g., 60000 times). The predetermined number of times can be determined, for example, at the start of the flowchart by the user performing operation input. When learning has been performed a predetermined number of times, the CPU 231 determines that learning has been completed and causes the process to transition to step S738. Otherwise, the CPU 231 returns the process to step S732 and continues learning the neural network 1100. In step S738, the CPU 231 transmits as a learning result the parameters of the neural network 1100 adjusted in step S736 to the image processing server 103 and ends the process.

<Estimation Phase>

An estimation phase of the system according to the present embodiment will be described below.

<Form Textualization Request Process>

Figure 9A:
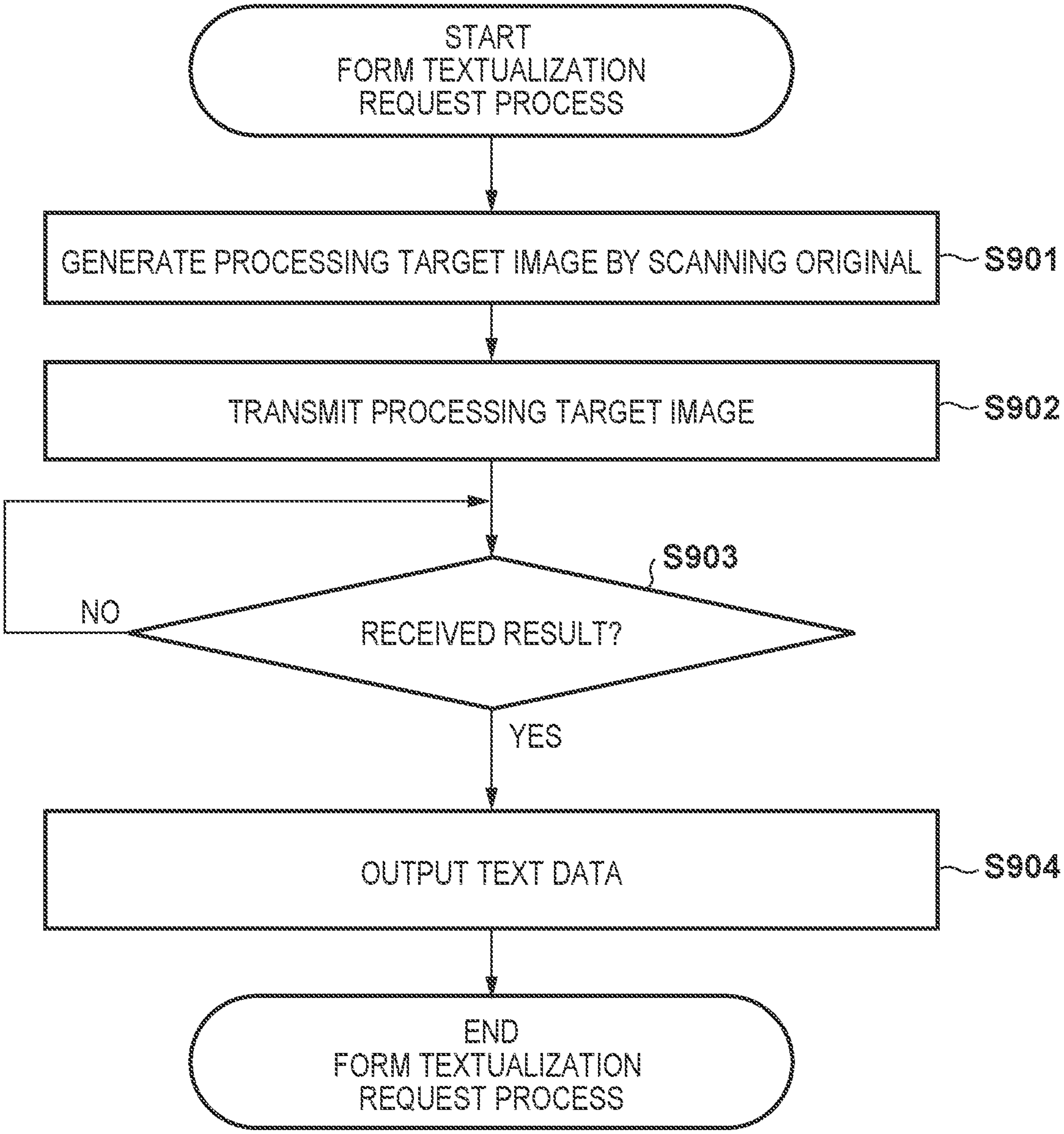
FIG. 9A is a flowchart of a form textualization request process according to an embodiment.

Next, a processing procedure for a form textualization request process by the image processing apparatus 101 according to the present embodiment will be described with reference to FIG. 9A. The image processing apparatus 101 generates a processing target image by scanning a form in which an entry is handwritten. Then, a request for form textualization is made by transmitting processing target image data to the image processing server 103. The process to be described below is realized, for example, by the CPU 201 of the image processing apparatus 101 reading the control program stored in the storage 208 and deploying and executing it in the RAM 204. This flowchart is started by the user performing a predetermined operation via the input device 209 of the image processing apparatus 101.

First, in step S901, the CPU 201 generates a processing target image by scanning an original by controlling the scanner device 206 and the original conveyance device 207. The processing target image is generated as gray scale image data. Next, in step S902, the CPU 201 transmits the processing target image generated in step S901 to the image processing server 103 via the external interface 211. Then, in step S903, the CPU 201 determines whether or not a processing result has been received from the image processing server 103. When a processing result is received from the image processing server 103 via the external interface 211, the process transitions to step S904, and otherwise, the process of step S903 is repeated.

In step S904, the CPU 201 outputs the processing result received from the image processing server 103, that is, form text data generated by recognizing handwritten characters and printed characters included in the processing target image generated in step S901. The CPU 201 may, for example, transmit the form text data via the external interface 211 to a transmission destination set by the user operating the input device 209.

<Form Textualization Process>

Figure 10A:
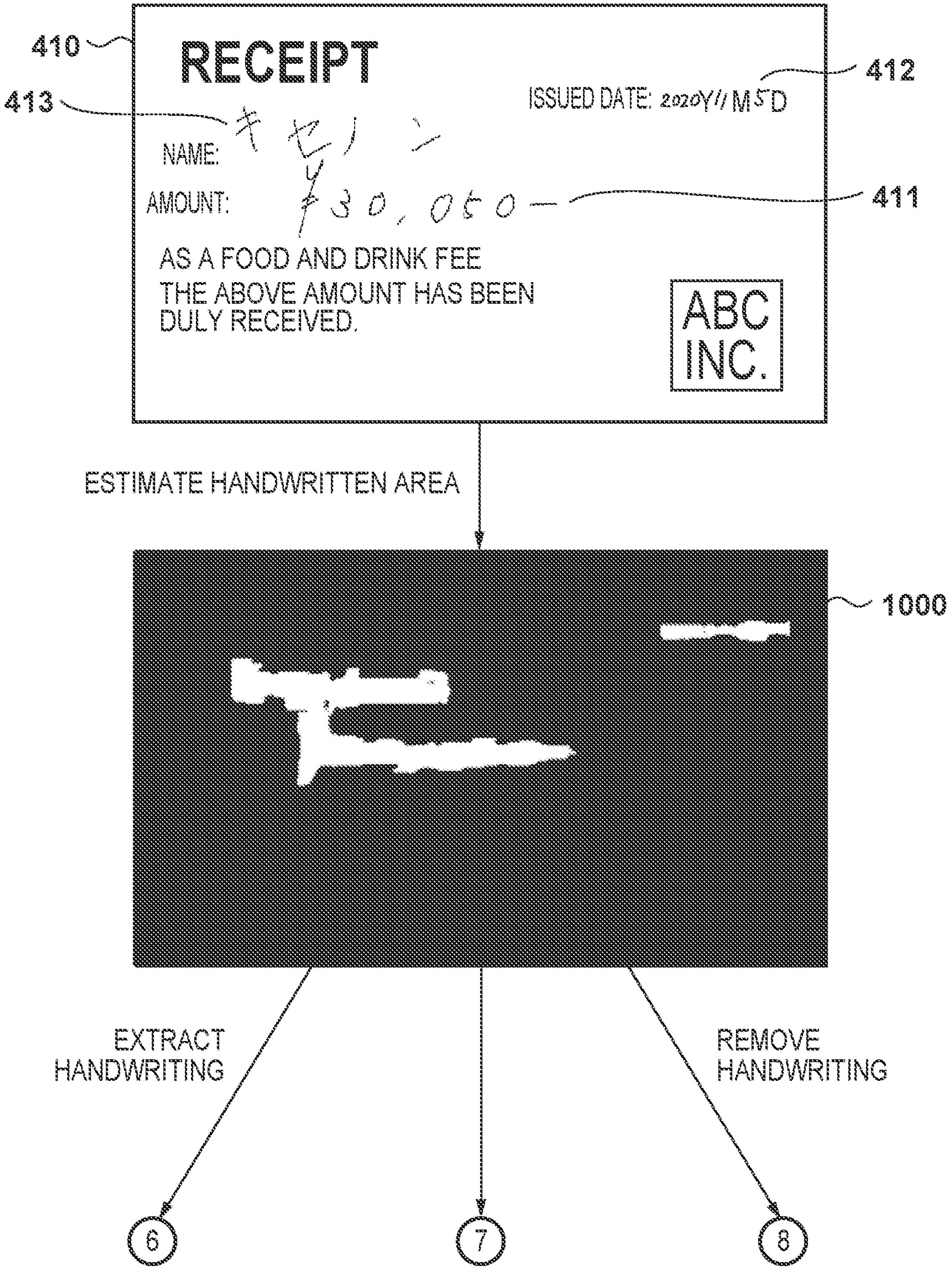
FIGS. 10A to 10C are a diagram illustrating an overview of the data generation process in the form textualization process according to an embodiment.
Figure 10B:
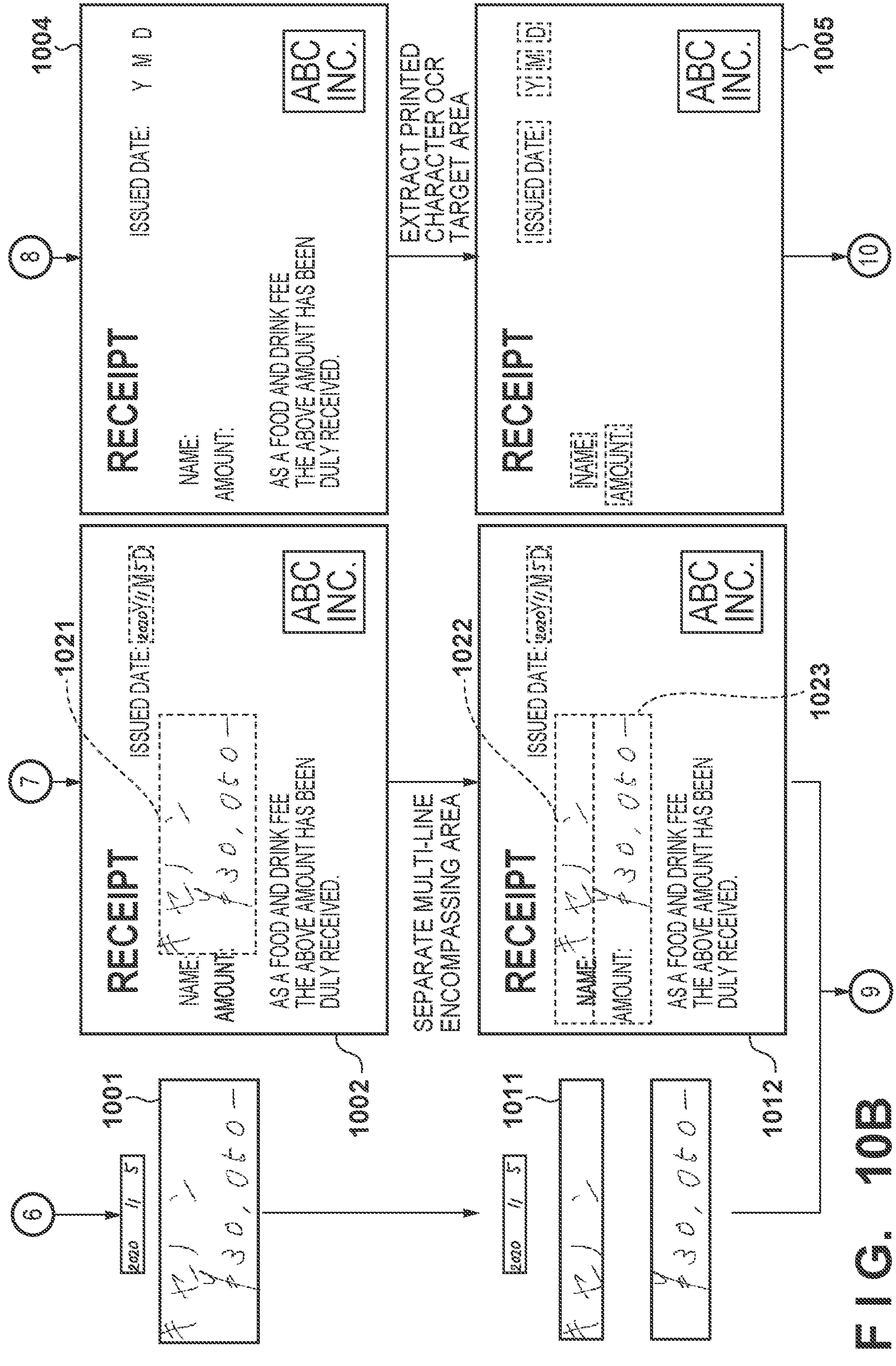
Figure 10C:
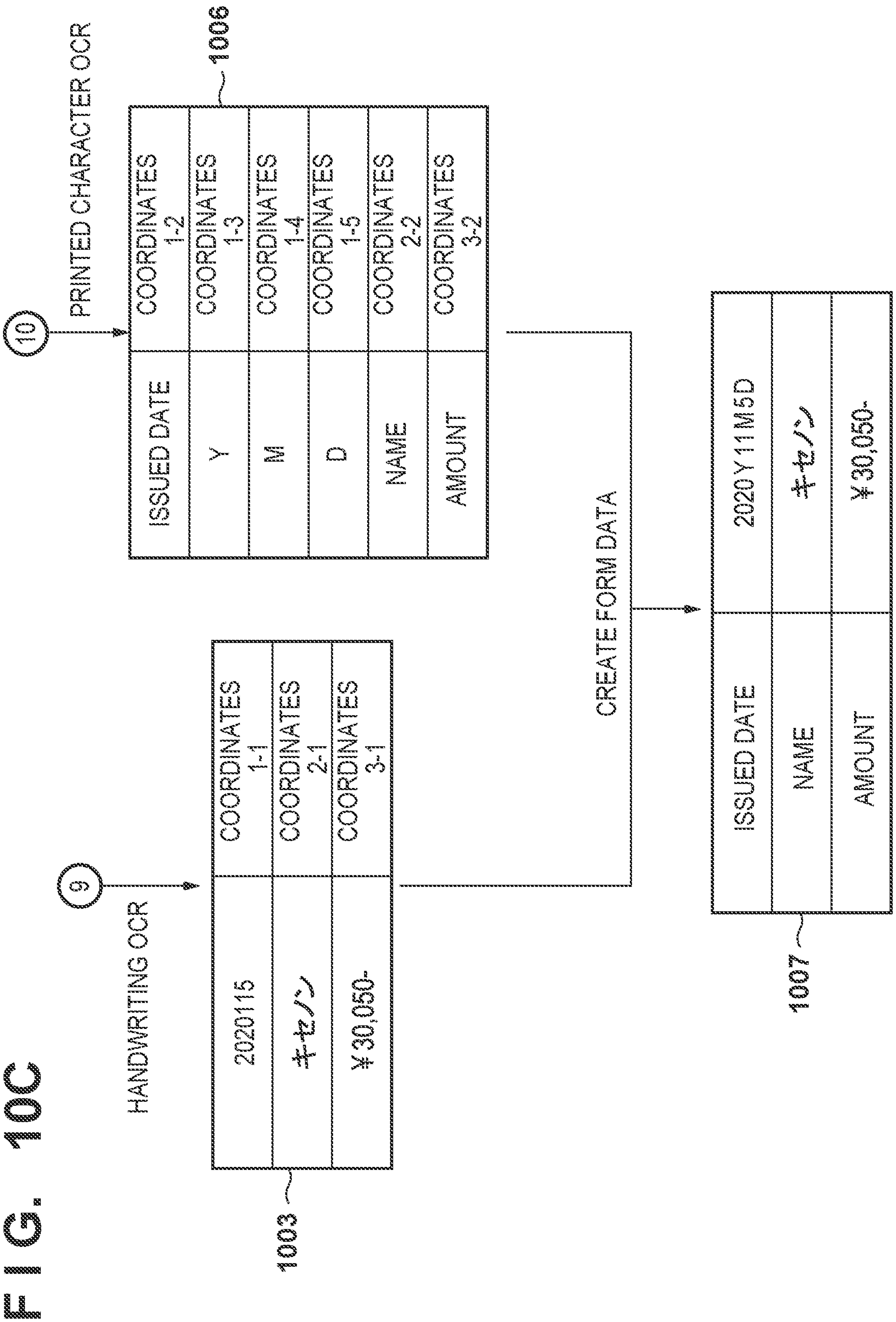

Next, a processing procedure for a form textualization process by the image processing server 103 according to the present embodiment will be described with reference to FIGS. 9B1-9B2. FIGS. 10A-10C illustrates an overview of a data generation process in the form textualization process. The image processing server 103, which functions as the image conversion unit 114, receives a processing target image from the image processing apparatus 101 and acquires text data by performing OCR on printed characters and handwritten characters included in scanned image data. OCR for printed characters is performed by the printed character OCR unit 117. OCR for handwritten characters is performed by the handwriting OCR unit 116. The form textualization process is realized, for example, by the CPU 261 reading the image processing server program stored in the storage 265 and deploying and executing it in the RAM 264. This flowchart starts when the user turns on the power of the image processing server 103.

First, in step S951, the CPU 261 loads the neural network 1100 illustrated in FIG. 11 that performs handwritten area estimation and handwriting extraction. The CPU 261 constructs the same neural network 1100 as in step S731 of the flowchart of FIG. 7B. Further, the CPU 261 reflects in the constructed neural network 1100 the learning result (parameters of the neural network 1100) transmitted from the learning apparatus 102 in step S738.

Next, in step S952, the CPU 261 determines whether or not a processing target image has been received from the image processing apparatus 101. If a processing target image has been received via the external interface 268, the process transitions to step S953. Otherwise, the process transitions to step S965. For example, here, it is assumed that a processing target image of the form 410 of FIG. 10A (the form 410 illustrated in FIG. 4B) is received. In the form 410, entries (handwritten portions) "¥30,050-" of the receipt amount 411 and "キセノン" of the addressee 413, are in proximity. Specifically, "セ" of the addressee 413 and "¥" of the receipt amount 411 are in proximity.

After step S952, in steps S953 to S956, the CPU 261 performs handwritten area estimation and handwriting extraction by inputting the processing target image received from the image processing apparatus 101 to the neural network 1100. First, in step S953, the CPU 261 inputs the processing target image received from the image processing apparatus 101 to the neural network 1100 constructed in step S951 and acquires a feature map outputted from the encoder unit 1112.

Next, in step S954, the CPU 261 estimates a handwritten area from the processing target image received from the image processing apparatus 101. That is, the CPU 261 estimates a handwritten area by inputting the feature map acquired in step S953 to the area estimation decoder unit 1122. As output of the neural network 1100, the following image data is obtained: image data that is the same image size as the processing target image and in which, as a prediction result, a value indicating that it is a handwritten area is stored in a pixel determined to be a handwritten area and a value indicating that it is not a handwritten area is stored in a pixel determined not to be a handwritten area. Then, the CPU 261 generates a handwritten area image in which a value indicating that it is a handwritten area in that image data is made to be 255 and a value indicating that it is not a handwritten area in that image data is made to be 0. Thus, a handwritten area image 1000 of FIG. 10A is obtained.

In step S305, the user prepared ground truth data for handwritten area estimation for each entry item of a form in consideration of entry fields (entry items). Since the area estimation decoder unit 1122 of the neural network 1100 learns this in advance, it is possible to output pixels indicating that it is a handwritten area for each entry field (entry item). The output of the neural network 1100 is a prediction result for each pixel and is a prediction result that captures an approximate shape of a character. Since a predicted area is not necessarily an accurate rectangle and is difficult to handle, a circumscribed rectangle that encompasses the area is set. Setting of a circumscribed rectangle can be realized by applying a known arbitrary technique. Each circumscribed rectangle can be expressed as area coordinate information comprising an upper left end point and a width and a height on a processing target image. A group of rectangular information obtained in this way is defined as a handwritten area. In a reference numeral 1002 of FIG. 10B, a handwritten area estimated in a processing target image (form 410) is exemplified by being illustrated in a dotted line frame.

Next, in step S955, the CPU 261 acquires an area corresponding to all handwritten areas on the feature map acquired in step S953 based on all handwritten areas estimated in step S954. Hereinafter, an area corresponding to a handwritten area on a feature map outputted by each convolutional layer is referred to as a "handwritten area feature map". Next, in step S956, the CPU 261 inputs the handwritten area feature map acquired in step S955 to the pixel extraction decoder unit 1112. Then, handwriting pixels are estimated within a range of all handwritten areas on the feature map. As output of the neural network 1100, the following image data is obtained: image data that is the same image size as a handwritten area and in which, as a prediction result, a value indicating that it is handwriting is stored in a pixel determined to be handwriting and a value indicating that it is not handwriting is stored in a pixel determined not to be handwriting. Then, the CPU 261 generates a handwriting extraction image by extracting from the processing target image a pixel at the same position as a pixel of a value indicating that it is handwriting in that image data. Thus, a handwriting extraction image 1001 of FIG. 10B is obtained. As illustrated, it is an image containing only handwriting of a handwritten area. The number of outputted handwriting extraction images is as many as the number of inputted handwritten area feature maps.

By the above processing, handwritten area estimation and handwriting extraction are carried out. Here, if upper and lower entry items are in proximity or are overlapping (i.e., there is not enough space between the upper and lower lines), a handwritten area estimated for each entry field (entry item) in step S954 is a multi-line encompassing area in which handwritten areas between items are combined. In the form 410, entries of the receipt amount 411 and the addressee 413 are in proximity, and in a handwritten area exemplified in the reference numeral 1002 of FIG. 10B, they are the multi-line encompassing area 1021 in which items are combined.

Therefore, in step S957, the CPU 261 executes for the handwritten area estimated in step S954 a multi-line encompassing area separation process in which a multi-line encompassing area is separated into individual areas. Details of the separation process will be described later. The separation process separates a multi-line encompassing area into single-line handwritten areas as illustrated in a dotted line area of a reference numeral 1022 in FIG. 10B.

Next, in step S958, the CPU 261 transmits all the handwriting extraction images generated in steps S956 and S957 to the handwriting OCR unit 116 via the external interface 268. Then, the OCR server 104 executes handwriting OCR for all the handwriting extraction images. Handwriting OCR can be realized by applying a known arbitrary technique.

Next, in step S959, the CPU 261 determines whether or not all the recognition results of handwriting OCR have been received from the handwriting OCR unit 116. A recognition result of handwriting OCR is text data obtained by recognizing handwritten characters included in a handwritten area by the handwriting OCR unit 116. The CPU 261, if the recognition results of the handwriting OCR are received from the handwriting OCR unit 116 via the external interface 268, transitions the process to step S960 and, otherwise, repeats the process of step S959. By the above processing, the CPU 261 can acquire text data obtained by recognizing a handwritten area (coordinate information) and handwritten characters contained therein. The CPU 261 stores this data in the RAM 264 as a handwriting information table 1003.

In step S960, the CPU 261 generates a printed character image by removing handwriting from the processing target image based on the coordinate information on the handwritten area generated in steps S954 and S955 and all the handwriting extraction images generated in steps S956 and S957. For example, the CPU 261 changes a pixel that is a pixel of the processing target image and is at the same position as a pixel whose pixel value is a value indicating handwriting in all the handwriting extraction images generated in steps S956 and S957 to white (RGB=(255,255,255)). By this, a printed character image 1004 of FIG. 10B in which a handwritten portion is removed is obtained.

In step S961, the CPU 261 extracts a printed character area from the printed character image generated in step S960. The CPU 261 extracts, as a printed character area, a partial area on the printed character image containing printed characters. Here, the partial area is a collection (an object) of print content, for example, an object such as a character line configured by a plurality of characters, a sentence configured by a plurality of character lines, a figure, a photograph, a table, or a graph.

As a method for extracting this partial area, for example, the following method can be taken. First, a binary image is generated by binarizing a printed character image into black and white. In this binary image, a portion where black pixels are connected (connected black pixels) is extracted, and a rectangle circumscribing this is created. By evaluating the shape and size of the rectangle, it is possible to obtain a group of rectangles that are a character or are a portion of a character. For this group of rectangles, by evaluating the distance between the rectangles and performing integration of rectangles whose distance is equal to or less than a predetermined threshold, it is possible to obtain a group of rectangles that are a character. When rectangles that are a character of a similar size are arranged in proximity, they can be combined to obtain a group of rectangles that are a character line. When rectangles that are a character line whose shorter side lengths are similar are arranged evenly spaced apart, they can be combined to obtain a group of rectangles of sentences. It is also possible to obtain a rectangle containing an object other than a character, a line, or a sentence, such as a figure, a photograph, a table, or a graph. Rectangles that are a single character or a portion of a character is excluded from rectangles extracted as described above. Remaining rectangles are defined as a partial area. In a reference numeral 1005 of FIG. 10B, a printed character area extracted from a printed character image is exemplified by a dotted line frame. In this step of the process, a plurality of background partial areas may be extracted from a background sample image.

Next, in step S962, the CPU 261 transmits the printed character image generated in step S960 and the printed character area acquired in step S961 to the printed character OCR unit 117 via the external interface 268 and executes printed character OCR. Printed character OCR can be realized by applying a known arbitrary technique. Next, in step S963, the CPU 261 determines whether or not a recognition result of printed character OCR has been received from the printed character OCR unit 117. The recognition result of printed character OCR is text data obtained by recognizing printed characters included in a printed character area by the printed character OCR unit 117. If the recognition result of printed character OCR is received from the printed character OCR unit 117 via the external interface 268, the process transitions to step S964, and, otherwise, the process of step S963 is repeated. By the above processing, it is possible to acquire text data obtained by recognizing a printed character area (coordinate information) and printed characters contained therein. The CPU 261 stores this data in the RAM 264 as a printed character information table 1006.

Next, in step S964, the CPU 261 combines a recognition result of the handwriting OCR and a recognition result of the printed character OCR received from the handwriting OCR unit 116 and the printed character OCR unit 117. The CPU 261 estimates relevance of the recognition result of the handwriting OCR and the recognition result of the printed character OCR by performing evaluation based on at least one of a positional relationship between an initial handwritten area and printed character area and a semantic relationship (content) of text data that is a recognition result of handwriting OCR and a recognition result of printed character OCR. This estimation is performed based on the handwriting information table 1003 and the printed character information table 1006.

In step S965, the CPU 261 transmits the generated form data to the image acquisition unit 111. Next, in step S966, the CPU 261 determines whether or not to end the process. When the user performs a predetermined operation such as turning off the power of the image processing server 103, it is determined that an end instruction has been accepted, and the process ends. Otherwise, the process is returned to step S952.

<Multi-Line Encompassing Area Separation Process>

Figure 12A:
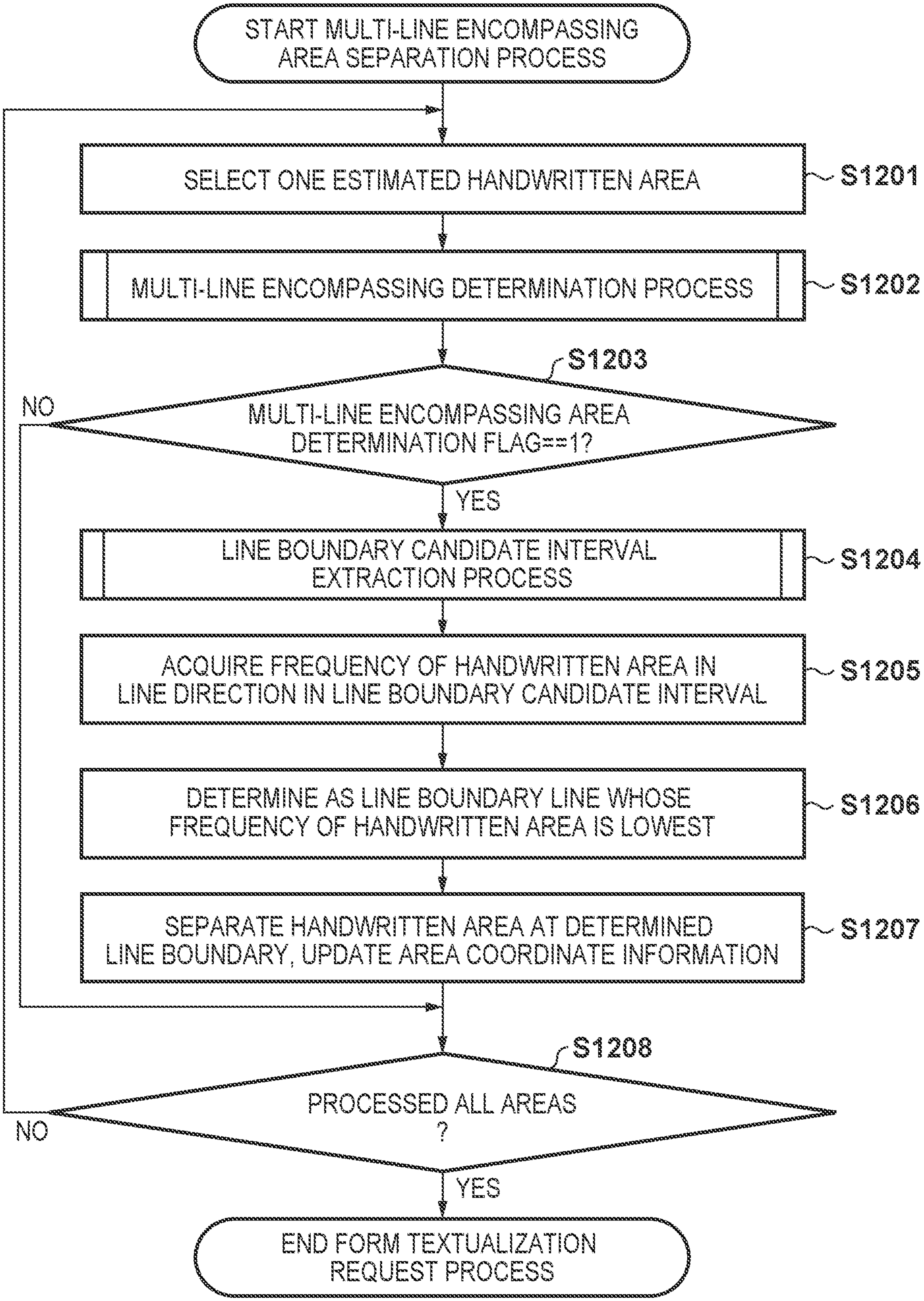
FIG. 12A is flowchart of a multi-line encompassing area separation process according to an embodiment.

Next, a processing procedure for a multi-line encompassing area separation process will be described with reference to FIGS. 12 and 13. FIG. 12A is a flowchart for explaining a processing procedure for a separation process according to the present embodiment. FIGS. 13A to 13F are diagrams illustrating an overview of a multi-line encompassing area separation process. The processing to be described below is a detailed process of the above step S957 and is realized, for example, by the CPU 261 reading out the image processing server program stored in the storage 265 and deploying and executing it in the RAM 264.

In step S1201, the CPU 261 selects one of the handwritten areas estimated in step S954. Next, in step S1202, the CPU 261 executes a multi-line encompassing determination process for determining whether or not an area is an area that includes a plurality of lines based on the handwritten area selected in step S1201 and the handwriting extraction image generated by estimating a handwriting pixel within a range of the handwritten area in step S956.

Figure 12B:
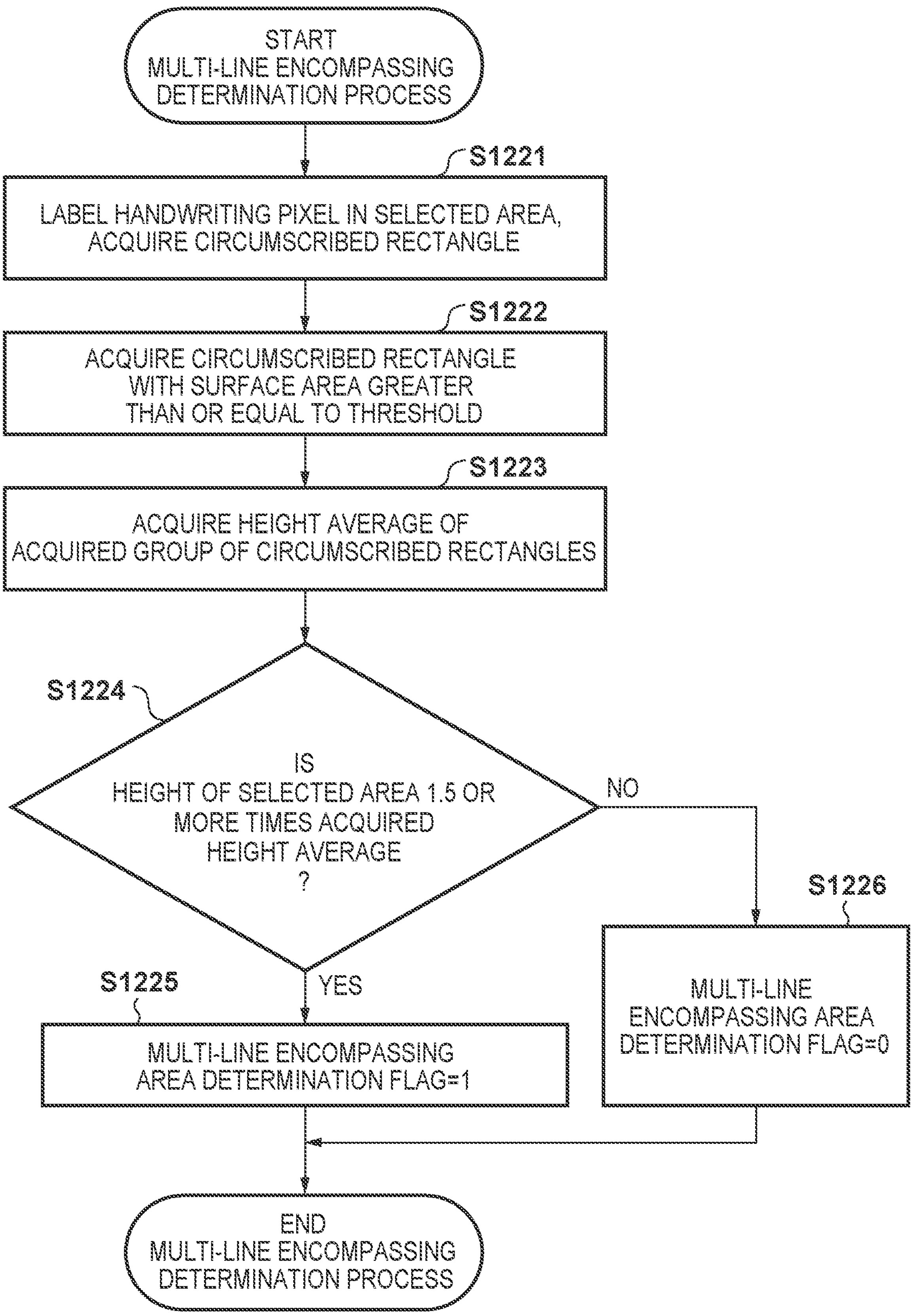
FIG. 12B is a flowchart of a multi-line encompassing determination process according to an embodiment.
Figure 13A:
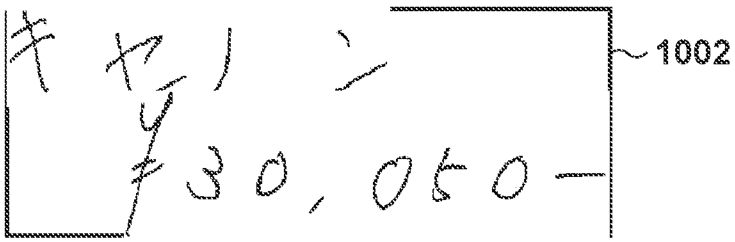
FIG. 13A is a diagram illustrating an example of a handwritten area and a corresponding handwriting extraction image according to an embodiment.
Figure 13B:
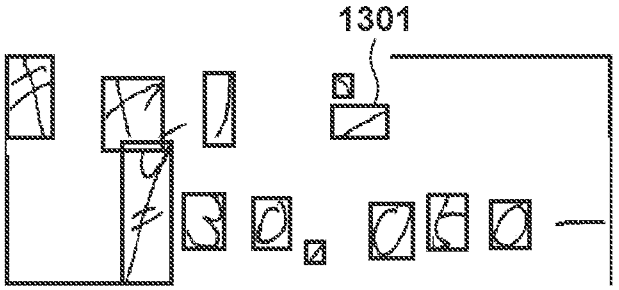
FIGS. 13B and 13C are diagrams illustrating an overview of a multi-line encompassing determination process according to an embodiment.

Now, a description will be given for a multi-line encompassing determination process with reference to FIG. 12B. In step S1221, the CPU 261 executes a labeling process on a handwriting extraction image generated by estimating handwriting pixels within a range of the handwritten area selected in step S1201 and acquires a circumscribed rectangle of each label. FIG. 13A is a handwriting extraction image generated by estimating handwriting pixels within a range of a handwritten area selected in step S1201 from a handwritten area illustrated in the reference numeral 1002 of FIG. 10B. FIG. 13B is a result of performing a labeling process on a handwriting extraction image and acquiring a circumscribed rectangle 1301 of each label.

Figure 13C:
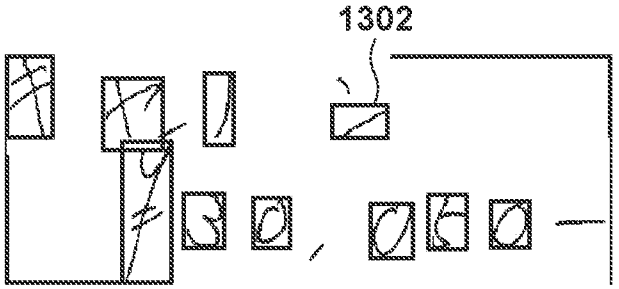

In step S1222, the CPU 261 acquires a circumscribed rectangle having an area equal to or greater than a predetermined threshold in a circumscribed rectangle of each label acquired in step S1221. Here, the predetermined threshold is 10% of an average of surface areas of circumscribed rectangles of respective labels and 1% of a surface area of a handwritten area. FIG. 13C illustrates a result of acquiring in FIG. 13B a circumscribed rectangle 1302 having a surface area above a predetermined threshold.

In step S1223, the CPU 261 acquires an average of heights of circumscribed rectangles 1302 acquired in step S1222. That is, the average of heights corresponds to heights of characters belonging within a handwritten area. Next, in step S1224, the CPU 261 determines whether or not a height of a handwritten area is equal to or greater than a predetermined threshold. Here, the predetermined threshold is 1.5 times the height average (i.e., 1.5 characters) acquired in step S1223. If it is equal to or greater than a predetermined threshold, the process transitions to step S1225; otherwise, the process transitions to step S1226.

In step S1225, the CPU 261 sets a multi-line encompassing area determination flag indicating whether or not a handwritten area is a multi-line encompassing area to 1 and ends the process. The multi-line encompassing area determination flag indicates 1 if a handwritten area is a multi-line encompassing area and indicates 0 otherwise. Meanwhile, in step S1226, the CPU 261 sets a multi-line encompassing area determination flag indicating whether or not a handwritten area is a multi-line encompassing area to 0 and ends the process. When this process is completed, the process returns to the multi-line encompassing area separation process illustrated in FIG. 12A and transitions to step S1203.

The description will return to that of FIG. 12A. In step S1203, the CPU 261 determines whether or not a multi-line encompassing area flag is set to 1 after a multi-line encompassing determination process of step S1202. When the multi-line encompassing area flag is set to 1, the process transitions to step S1204; otherwise, the process transitions to step S1208. In step S1204, the CPU 261 executes a process for extracting a candidate interval (hereinafter, referred to as a "line boundary candidate interval") as a boundary between upper and lower lines for a multi-line encompassing area for which the multi-line encompassing area flag is set to 1, that is, a multi-line encompassing area to be separated.

Figure 12C:
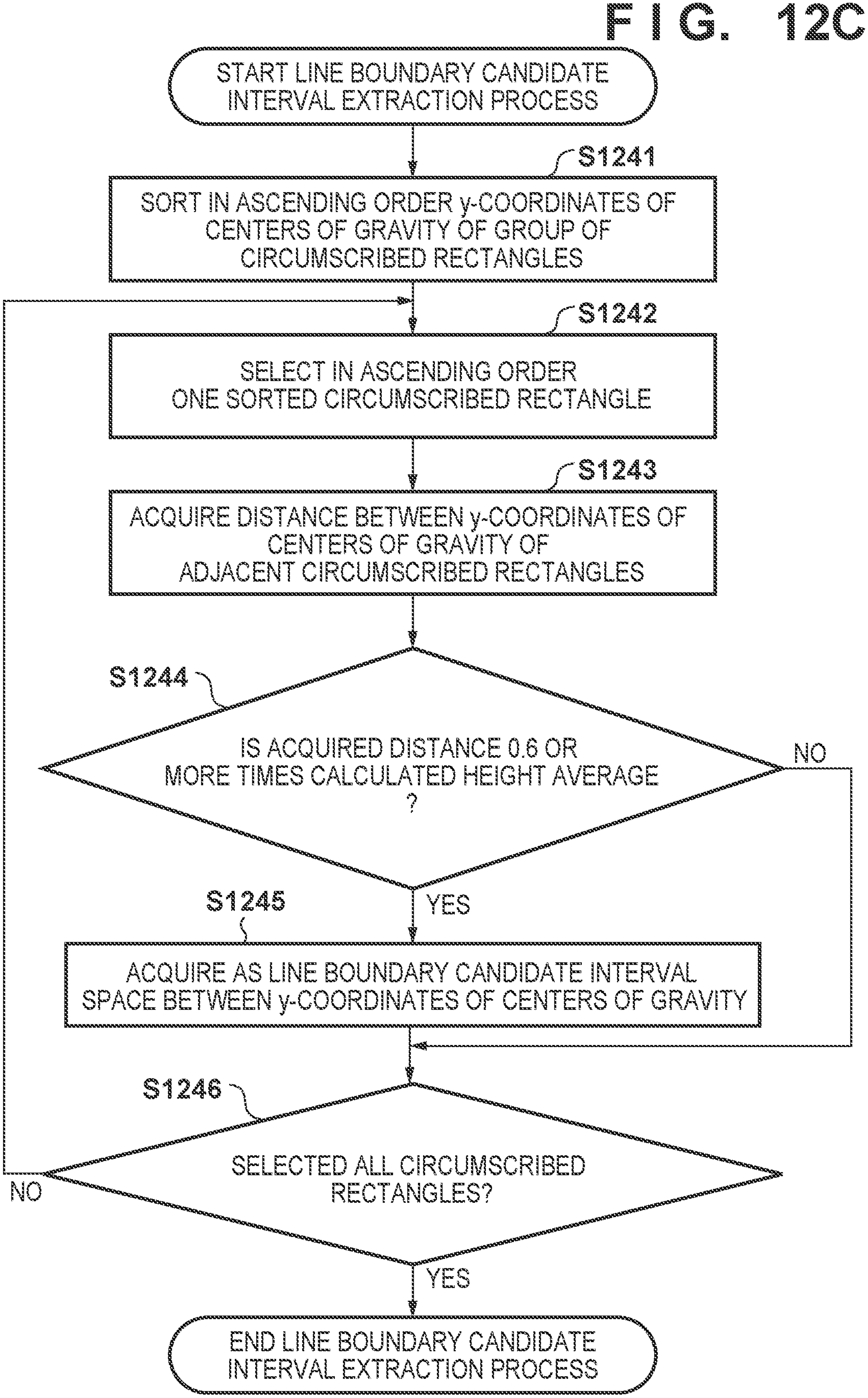
FIG. 12C is a flowchart of a line boundary candidate interval extraction process according to an embodiment.

Now, a description will be given for a line boundary candidate interval extraction process with reference to FIG. 12C. In step S1241, the CPU 261 sorts in ascending order of y-coordinate of a center of gravity the circumscribed rectangles acquired in step S1222 in a multi-line encompassing determination process illustrated in FIG. 12B. Next, in step S1242, the CPU 261 selects in sort order one circumscribed rectangle sorted in step S1241. In step S1243, the CPU 261 acquires a distance between y-coordinates of centers of gravity between the circumscribed rectangle selected in step S1242 and a circumscribed rectangle next to that circumscribed rectangle. That is, the CPU 261 acquires how far apart in a vertical direction adjacent circumscribed rectangles are. Next, in step S1244, the CPU 261 determines whether or not the distance acquired step S1243 is equal to or greater than a predetermined threshold. Here, the predetermined threshold is 0.6 times an average of heights of circumscribed rectangles (i.e., approximately half the height of a character) acquired in step S1223 in the multi-line encompassing determination process illustrated in FIG. 12B. If it is equal to or greater than a predetermined threshold, the process transitions to step S1245; otherwise, the process transitions to step S1246.

Figure 13D:
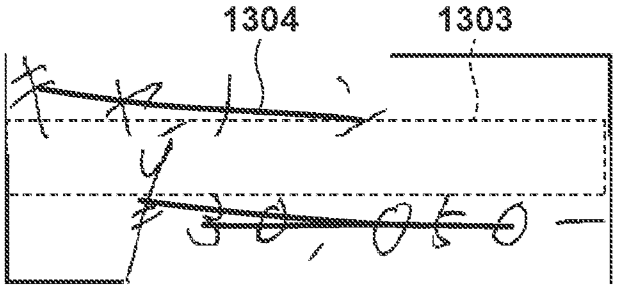
FIGS. 13D and 13E are an overview of a line boundary candidate interval extraction process according to an embodiment.

In step S1245, the CPU 261 acquires as a line boundary candidate interval a space between y-coordinates of centers of gravity between the circumscribed rectangle selected in step S1242 and a circumscribed rectangle next to that circumscribed rectangle. FIG. 13D is a result of acquiring as a line boundary candidate interval 1303 a space between y-coordinates of centers of gravity determined to be YES in step S1244. Further, FIG. 13D is a result of acquiring a line 1304 that connects characters of the same line by connecting between centers of gravity determined to be NO in step S1244. An interval in which the line 1304 is not connected and broken is the line boundary candidate interval 1303.

In step S1246, the CPU 261 determines whether or not all circumscribed rectangles sorted in step S1241 have been processed. When the process from steps S1243 to S1245 is performed for all the circumscribed rectangles sorted in step S1241, the CPU 261 ends the line boundary candidate interval extraction process. Otherwise, the process transitions to step S1241. After completing a line boundary candidate interval extraction process, the CPU 261 returns to a multi-line encompassing area separation process illustrated in FIG. 12A and causes the process to transition to step S1205.

Figure 13E:
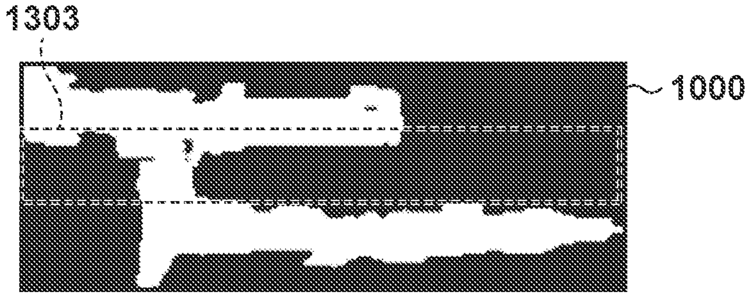

The description will return to that of FIG. 12A. In step S1205, the CPU 261 acquires a frequency of area pixels in a line direction, that is, a pixel value 255, in a handwritten area image from a start position to an end position of the line boundary candidate interval extracted in step S1204. FIG. 13E is a diagram illustrating the line boundary candidate interval 1303 in the handwritten area image 1000. In FIG. 13E, a pixel value 255 is represented by a white pixel, that is, a frequency of appearance of a white pixel is acquired for each line.

Figure 13F:
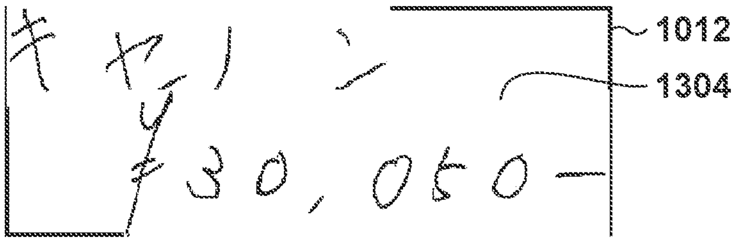
FIG. 13F is an overview of a multi-line encompassing area separation process according to an embodiment.

Next, in step S1206, the CPU 261 determines that a line with the lowest frequency of area pixels in a line direction acquired in step S1205 is a line boundary. Next, in step S1207, the CPU 261 separates a handwritten area and a handwriting extraction image of the area based on the line boundary determined in step S1206 and updates area coordinate information. FIG. 13F illustrates a result of determining a line boundary (line 1304) with respect to FIG. 13A and separating a handwritten area and a handwriting extraction image of the area. That is, in the present embodiment, instead of determining a line boundary based on a frequency in a line direction of a pixel representing handwriting, for example, a black pixel, in a handwritten area, a line boundary is determined based on a frequency in a line direction of an area pixel, here, a white pixel, in an estimated handwritten area.

Then, in step S1208, the CPU 261 determines whether or not the process from steps S1202 to S1207 has been performed for all the handwritten areas. If so, the multi-line encompassing area separation process is ended; otherwise, the process transitions to step S1201.

By the above process, a multi-line encompassing area can be separated into respective lines. For example, the multi-line encompassing area 1021 exemplified in the handwritten area 1002 of FIG. 10B is separated into the handwritten areas 1022 and 1023 by the above process, and the handwriting extraction image 1011 and the handwritten area 1012 of FIG. 10B are obtained. As described above, according to the present embodiment, a correction process for separating into individual areas a multi-line encompassing area in which upper and lower lines are combined is performed for a handwritten area acquired by estimation by a handwritten area estimation neural network. At this time, a frequency of an area pixel in a line direction is acquired and a line boundary is set for a handwritten area image obtained by making into an image a result of estimation of a handwritten area. A handwritten area image is an image representing an approximate shape of handwritten characters. By using a handwritten area image, it is possible to acquire a handwritten area pixel frequency that is robust to shapes and ways of writing characters, and it is possible to separate character strings in a handwritten area into appropriate lines.

In step S1205 of a multi-line encompassing area separation process illustrated in FIG. 12A in the present embodiment, a line boundary candidate interval and a handwritten area image may be used after reduction (for example, ¼ times). Then, in step S1207, a line boundary position may be used after enlargement (e.g., 4 times). In this case, it is possible to acquire a handwritten area pixel frequency that further reduces the influence of shapes and ways of writing characters.

As described above, the image processing system according to the present embodiment acquires a processing target image read from an original that is handwritten and specifies one or more handwritten areas included in the acquired processing target image. In addition, for each specified handwritten area, the image processing system extracts from the processing target image a handwritten character image and a handwritten area image indicating an approximate shape of a handwritten character. Furthermore, for a handwritten area in which a plurality of lines of handwriting is included among specified one or more of the handwritten areas, a line boundary of handwritten characters is determined from a frequency of pixels indicating a handwritten area in a line direction of the handwritten area image, and a corresponding handwritten area is separated for each line. In addition, the image processing system generates a learning model using a handwritten character image extracted from an original sample image and learning data associated with a handwritten area image and extracts a handwritten character image and a handwritten area image using the learning model. Further, the image processing system can set a handwritten character image and a handwritten area from an original sample image in accordance with user input. In such a case, for each character in a set handwritten character image, ground truth data for a handwritten area image is generated by overlapping an expansion image subjected to an expansion process in a horizontal direction and a reduction image in which a circumscribed rectangle encompassing a character of the handwritten character image is reduced in a vertical direction, and a learning model is generated.

By virtue of the present invention, in a handwritten character area such as that in which an approximate shape of a handwritten character is represented, a line boundary is set by acquiring a frequency of an area pixel in a line direction. Accordingly, it is possible to acquire a pixel frequency that is robust to shapes and ways of writing characters, and it is possible to separate character strings in a handwritten character area into appropriate lines. Therefore, in handwriting OCR, by appropriately specifying a space between lines of handwritten characters, it is possible to suppress a decrease in a character recognition rate.

Second Embodiment

Hereinafter, a second embodiment of the present invention will be described. In the present embodiment, a case in which a method different from the above-described first embodiment is adopted as another method of handwriting extraction, handwritten area estimation, and handwritten area image generation will be described. In the present embodiment, handwriting extraction and handwritten area estimation are realized by rule-based algorithm design rather than by neural network. A handwritten area image is generated based on a handwriting extraction image. A configuration of an image processing system of the present embodiment is the same as the configuration of the above first embodiment except for feature portions. Therefore, the same configuration is denoted by the same reference numerals, and a detailed description thereof will be omitted.

<Image Processing System>

An image processing system according to the present embodiment will be described. The image processing system is configured by the image processing apparatus 101, the image processing server 103, and the OCR server 104 illustrated in FIG. 1.

<Use Sequence>

Figure 14:
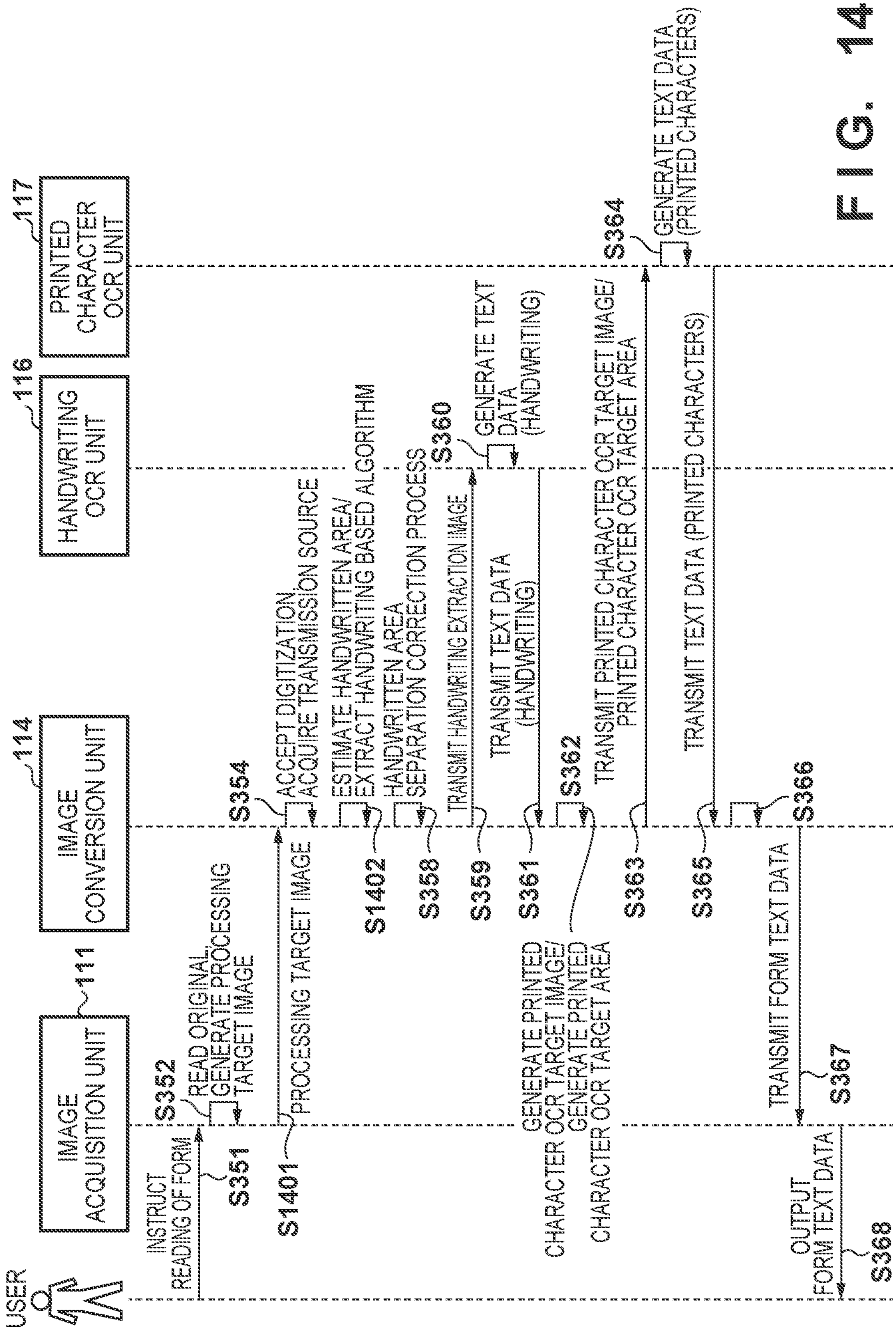
FIG. 14 is a diagram illustrating a sequence for using the image processing system according to an embodiment.

A use sequence according to the present embodiment will be described with reference to FIG. 14. The same reference numerals will be given for the same process as the sequence of FIG. 3B, and a description thereof will be omitted.

In step S1401, the image acquisition unit 111 transmits to the image conversion unit 114 the processing target image generated by reading a form original in step S352. After step S354, in step S1402, the image conversion unit 114 performs handwritten area estimation and handwriting extraction on the processing target image based on algorithm design. For the subsequent process, the same process as the process described in FIG. 3B is performed.

<Form Textualization Process>

Figure 15A:
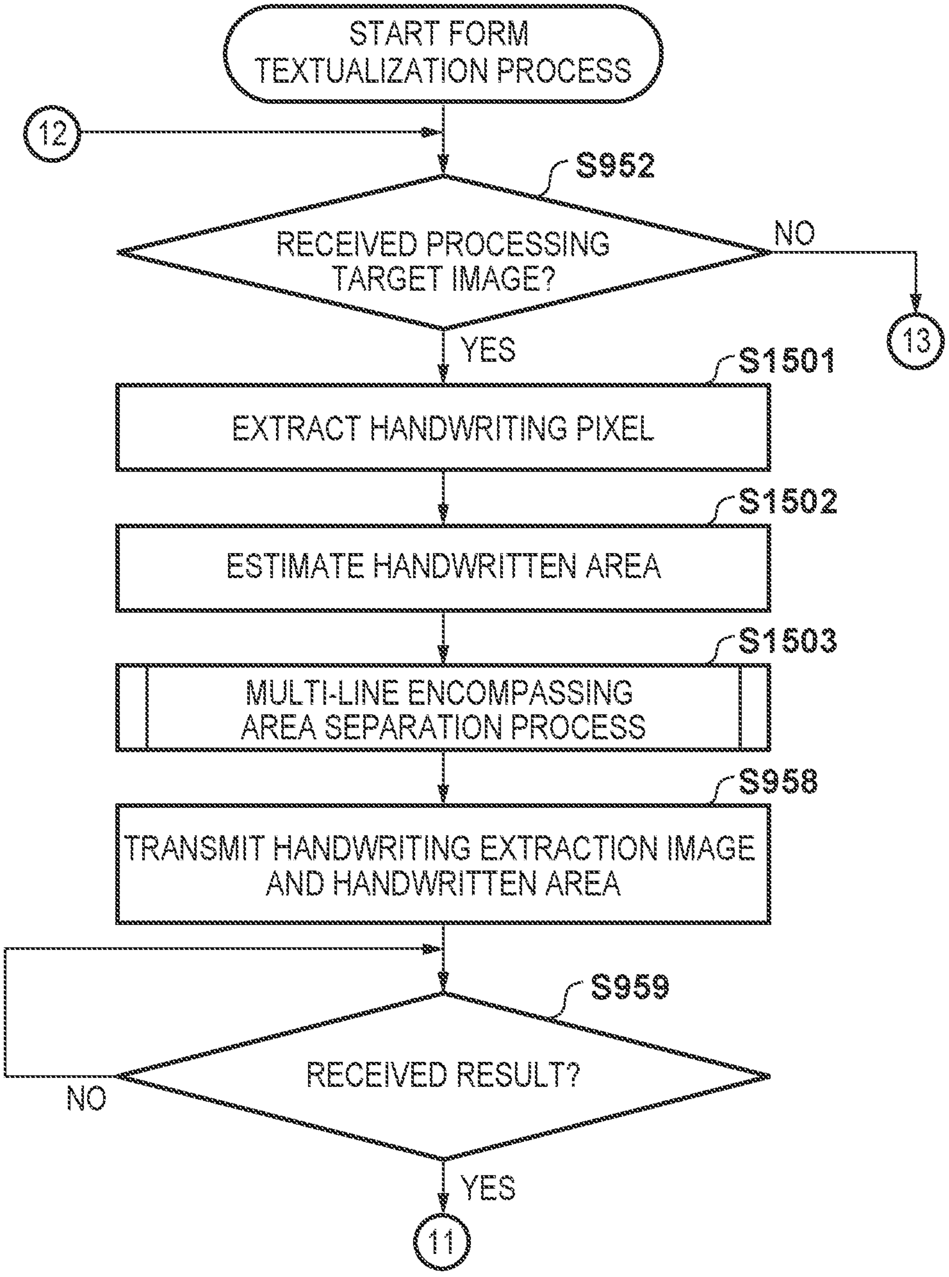
FIGS. 15A-15B are a flowchart of the form textualization process according to an embodiment.
Figure 15B:
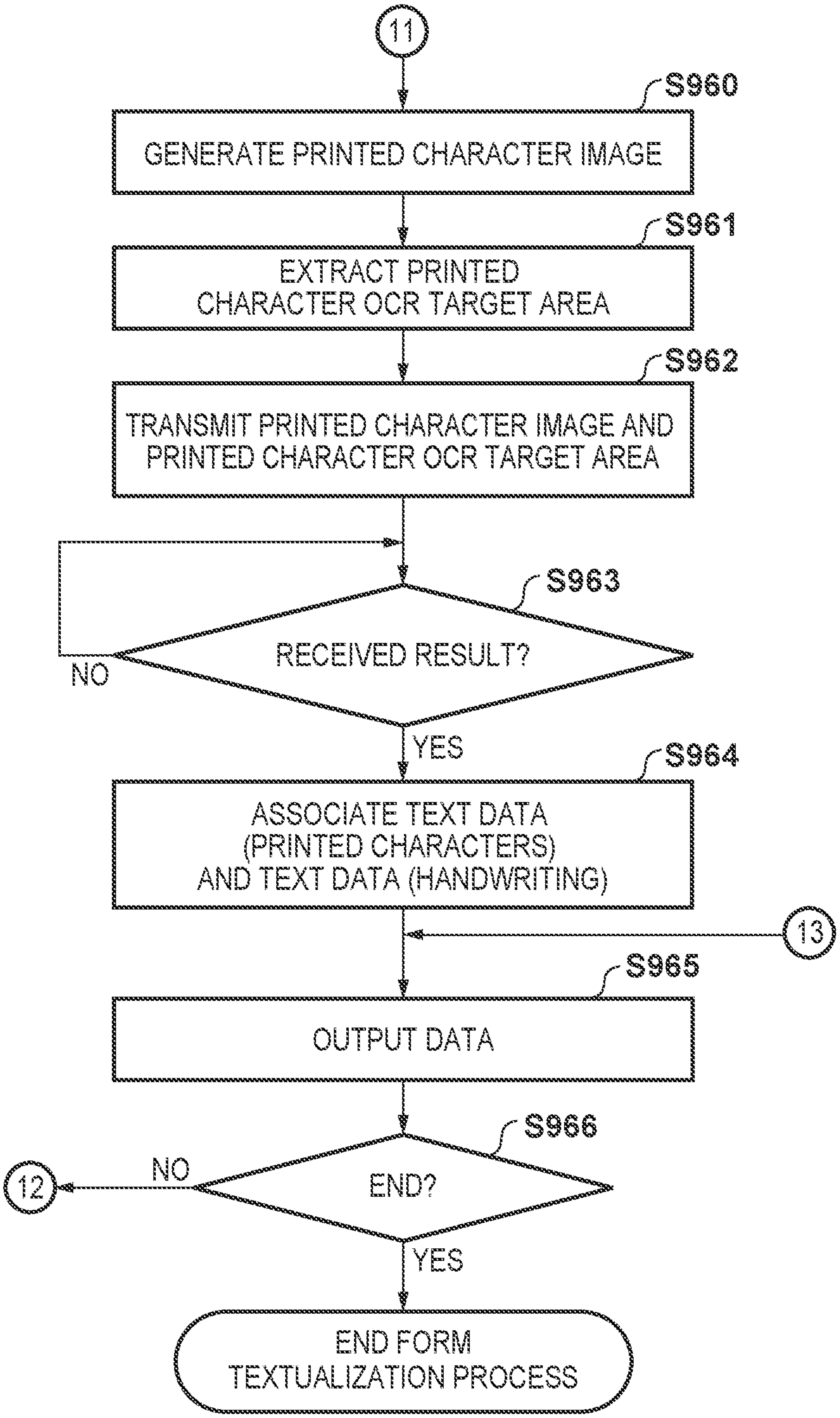

Next, a processing procedure of a form textualization process by the image processing server 103 according to the present embodiment will be described with reference to FIGS. 15A-15B. The process to be described below is realized, for example, by the CPU 261 reading the image processing server program stored in the storage 265 and deploying and executing it in the RAM 264. This starts when the user turns on the power of the image processing server 103. The same reference numerals will be given for the same process as FIGS. 9B1-9B2, and a description thereof will be omitted.

When it is determined that a processing target image is received in step S952, the CPU 261 executes a handwriting extraction process in step S1501 and generates a handwriting extraction image in which handwriting pixels are extracted from the processing target image received from the image processing apparatus 101. This handwriting extraction process can be realized by applying, for example, any known technique, such as a method of determining whether or not pixels in an image are handwriting in accordance with a luminance feature of pixels in the image and extracting handwritten characters in pixel units (a method disclosed in Japanese Patent Laid-Open No. 2010-218106).

Figure 17A:
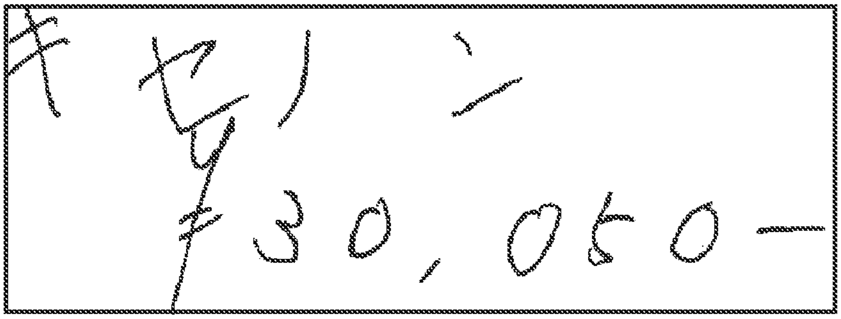
FIG. 17A is a diagram illustrating an example of a handwritten area and a corresponding handwriting extraction image according to an embodiment.

Next, in step S1502, the CPU 261 estimates a handwritten area from the processing target image received from the image processing apparatus 101 by executing a handwritten area estimation process. This handwritten area estimation process can be realized by applying, for example, any known technique, such as a method in which a set of black pixels is detected and a rectangular range including a set of detected black pixels is set as a character string area (a method disclosed in Patent Document 1). FIG. 17A illustrates a handwriting extraction image that is generated by handwriting extraction in step S1501 from the form 410 of FIG. 10A. FIG. 7B illustrates an example of an image belonging to a handwritten area estimated in step S1502.

In some handwritten areas acquired by estimation in step S1502, there may be areas that are multi-line encompassing areas in which the upper and lower entry items are in proximity or intertwined (i.e., insufficient space between upper and lower lines), for example. Therefore, a correction process in which a multi-line encompassing area is separated into individual separated areas is performed.

Figure 16:
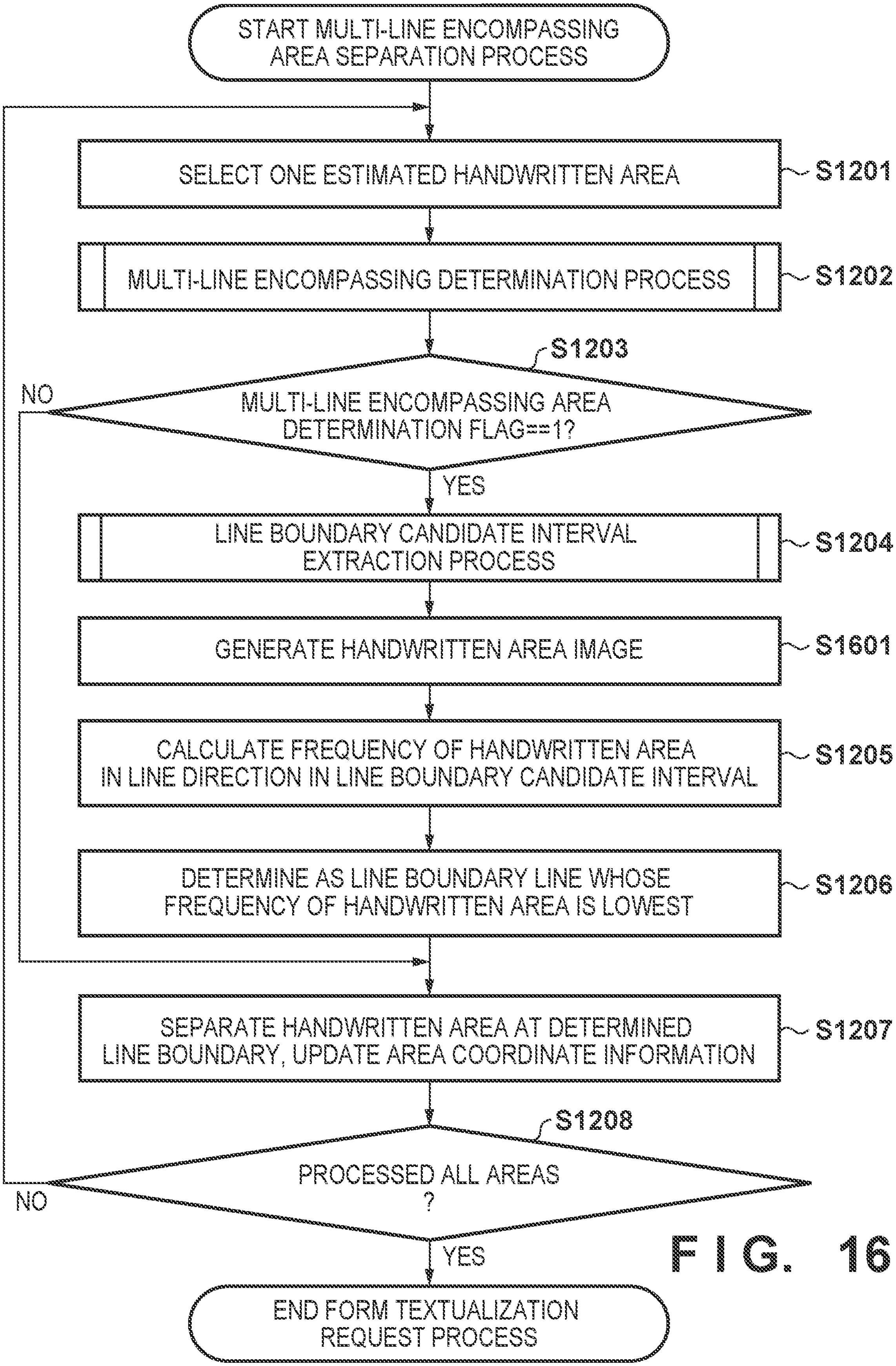
FIG. 16 is a flowchart of the multi-line encompassing area separation process according to an embodiment.

In step S1503, the CPU 261 executes for the handwritten area estimated in step S1502 a multi-line encompassing area separation process in which a multi-line encompassing area is separated into individual areas. The multi-line encompassing area separation process will be described with reference to FIG. 16. FIG. 16 is a diagram illustrating a flow of a multi-line encompassing area separation process according to a second embodiment.

Figure 17B:
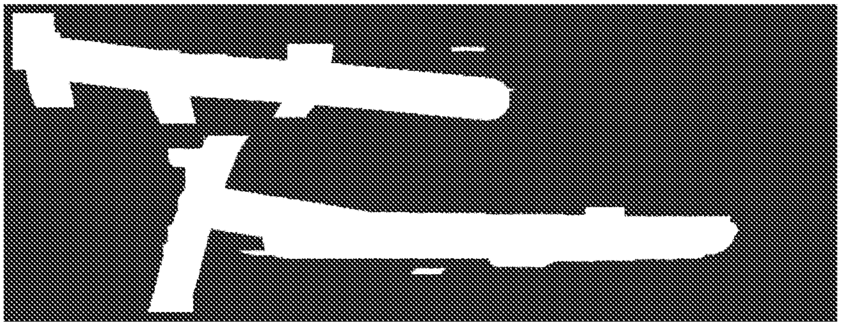
FIG. 17B is a diagram illustrating an example of a handwritten area image according to another embodiment.

The processes from steps S1201 to S1204 are process steps similar to the process steps of the same reference numerals in the flowchart of FIG. 12A. In step S1601, the CPU 261 generates a handwritten area image to be used in step S1205. Specifically, the CPU 261 generates a handwriting approximate shape image by performing a predetermined number of times (e.g., 20 times) of expansion processes in a horizontal direction for the handwriting extraction image generated in step S1501 and performing a predetermined number of times (e.g., 10 times) of reduction process in a vertical direction. Next, the CPU 261 connects between the centers of gravity determined to be NO in step S1244 of a line boundary candidate interval extraction process in step S1204 and superimposes on the handwriting approximate shape image a result in which a line connecting the characters of the same line is acquired. Here, the thickness of the line is ½ times the height average calculated in step S1223 of the multi-line encompassing determination process in step S1202. The image generated by the above process is made a handwritten area image. FIG. 17B is a handwritten area image generated by performing the process of this step on a handwriting extraction image of FIG. 17A.

As described above, the image processing system according to the present embodiment generates an image for which an expansion process is performed in a horizontal direction and a reduction process is performed in a vertical direction with respect to a circumscribed rectangle encompassing a character of an extracted handwritten character image. Furthermore, this image processing system superimposes the generated image and a line connecting the centers of gravity of circumscribed rectangles that are adjacent circumscribed rectangles and extracts it as a handwritten area image. As described above, by virtue of the present embodiment, handwriting extraction and handwritten area estimation can be realized by rule-based algorithm design rather than by neural network. It is also possible to generate a handwritten area image based on a handwriting extraction image. Generally, the amount of processing calculation tends to be larger in a method using a neural network; therefore, relatively expensive processing processors (CPUs and GPUs) are used. When such a calculation resource cannot be prepared for reasons such as cost, the method illustrated in the present embodiment is effective.

Third Embodiment

Figure 18:
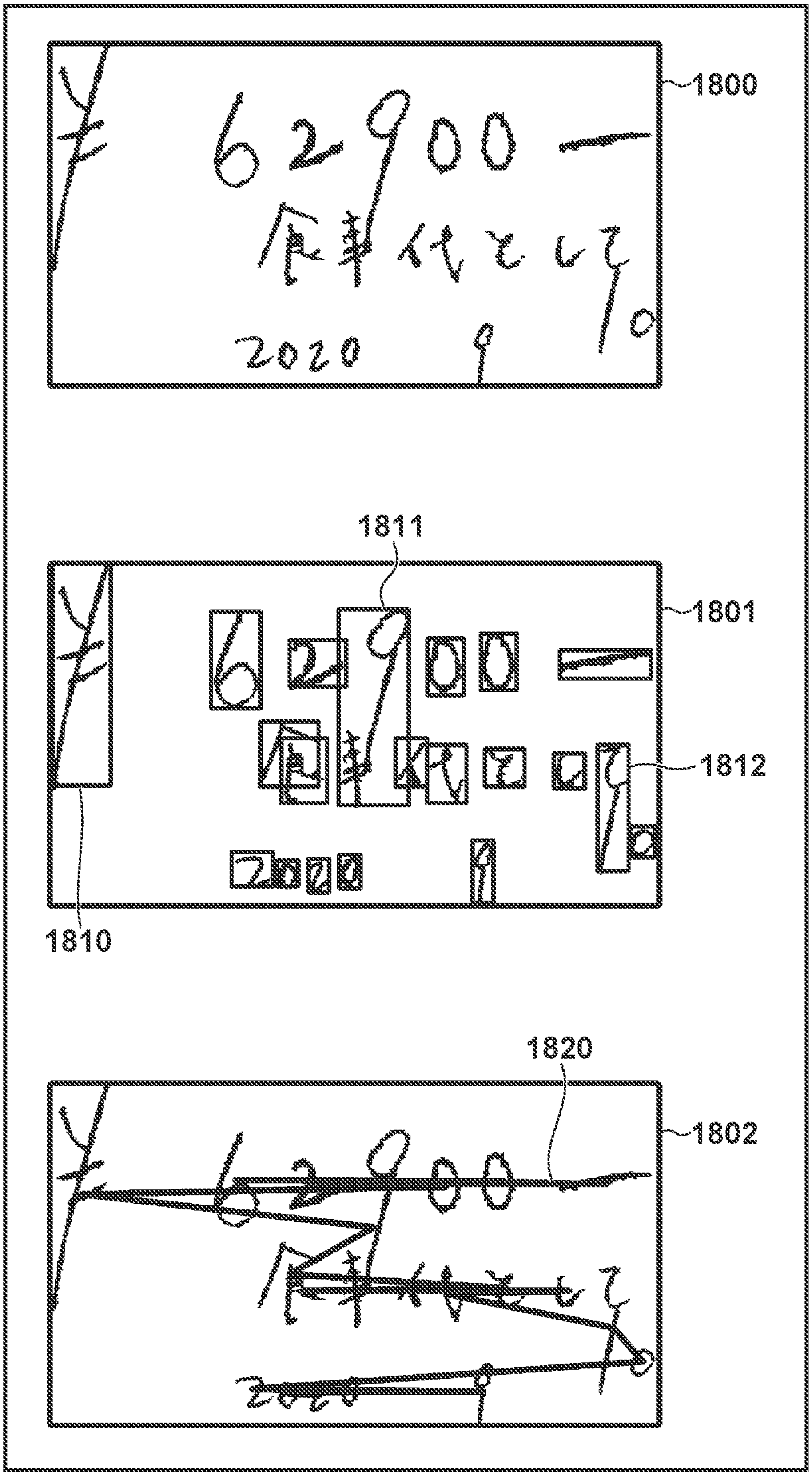
FIG. 18 is a diagram illustrating examples of a handwritten area and a corresponding handwriting extraction image according to an embodiment.

Hereinafter, a third embodiment of the present invention will be described. In the present embodiment, an example in which a process for excluding from a multi-line encompassing area factors that hinder a process is added to a multi-line encompassing area separation process in a form textualization process described in the above first and second embodiments is illustrated. FIG. 18 is a diagram illustrating a multi-line encompassing area including a factor that hinders a multi-line encompassing area separation process according to the present embodiment and an overview of that process.

A reference numeral 1800 illustrates a multi-line encompassing area. In the multi-line encompassing area 1800, "v" of the first line is written such that it protrudes into the second line. In addition, "9" on the first line and "事" on the second line, and "て" on the second line and "1" on the third line are written in a connected manner. When the multi-line encompassing area 1800 is subjected to a multi-line encompassing area separation process illustrated in FIGS. 12 and 16, results illustrated in reference numerals 1801 and 1802 are acquired during the process.

The reference numeral 1801 indicates circumscribed rectangles acquired in step S1222 of a multi-line encompassing determination process step S1202 for the multi-line encompassing area 1800. Here, circumscribed rectangles include at least a rectangle 1810 generated by pixels of "£" protruding from its line, a rectangle 1811 generated by pixels of "9" and "事" connected across lines, and a rectangle 1812 generated by pixels of "て" and "1" connected across lines. These circumscribed rectangles are rectangles straddling between upper and lower lines.

The reference numeral 1802 is a result of acquiring a line 1820 connecting characters of the same line in step S1244 in a line boundary candidate interval extraction process step S1204. Here, the line 1820 connects each circumscribed rectangle without interruption since the rectangles 1810, 1811, 1812 straddles upper and lower lines. This is because a line boundary candidate interval cannot be found due to there being the rectangles 1810, 1811, and 1812 that straddles upper and lower lines, which makes a longitudinal distance between each rectangle close.

As described above, a character forming a rectangle straddling upper and lower lines when a circumscribed rectangle is obtained (hereinafter referred to as an "outlier") hinders a multi-line encompassing area separation process; therefore, it is desired to exclude them from the process.

As a technique for excluding such outliers, there is a technique in which, after acquiring circumscribed rectangles of characters, a character that is too large according to a reference value characterizing a rectangle, such as a size and a position of a rectangle, is selected, and the selected character is excluded from subsequent processes. However, since a size and a position of a handwritten character are not fixed values, it is difficult to clearly define a case in which a handwritten character is deemed an outlier, and so, exclusion omission and erroneous exclusion may occur.

Therefore, in the present embodiment, attention is paid to the characteristics of a character string forming a single line. The height of each character configuring a character string forming a single line is the same. That is, when a character string forms a single line, if a single line is generated based on the height of a certain character that forms that character string, it can be said that, in that single line, there are many characters of the same height as the height of that single line. Meanwhile, when a single line is generated based on the height of an outlier, the height of that single line becomes the height of a plurality of lines. Therefore, it can be said that, in that single line, there are many characters of a height that is less than the height of that single line.

Therefore, in the present embodiment, using the characteristics of a character string forming a single line described above, a single line is generated at a height of a certain circumscribed rectangle after acquiring circumscribed rectangles of characters, and an outlier is specified by finding a majority between circumscribed rectangles that do not reach the height of the single line and circumscribed rectangles that reach the height of the single line. Further, these processes are added before a multi-line encompassing area separation process described in the above first and second embodiments to exclude from a multi-line encompassing area outliers that hinder a process. The image processing system according to the present embodiment is the same as the configuration of the above first and second embodiments except for the above feature portions. Therefore, the same configuration is denoted by the same reference numerals, and a detailed description thereof will be omitted.

<Multi-Line Encompassing Area Separation Process>

Figure 19A:
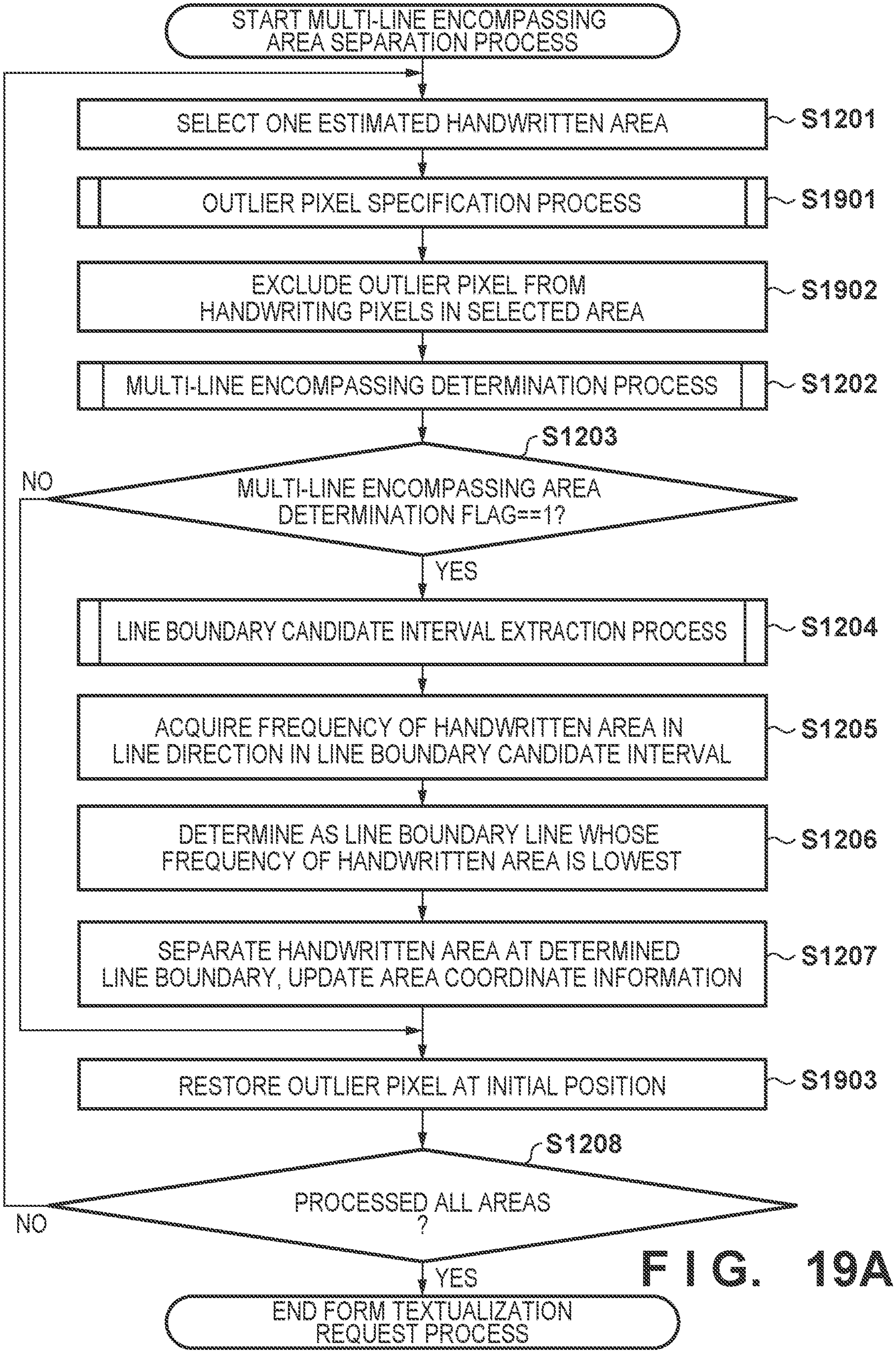
FIG. 19A is a flowchart of the multi-line encompassing area separation process according to an embodiment.
Figure 19B:
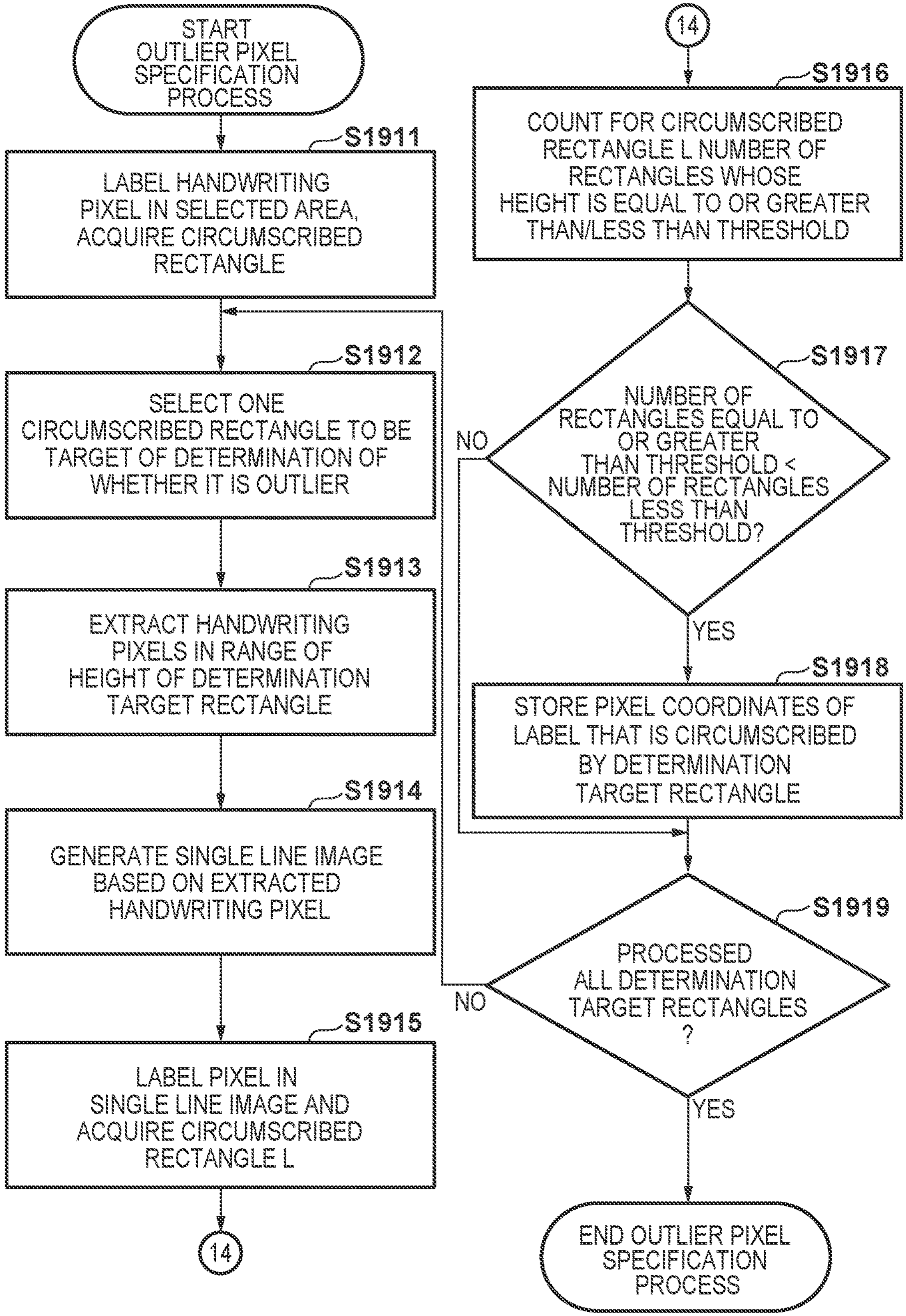
FIG. 19B is a flowchart of an outlier pixel specification process according to an embodiment.

Next, a processing procedure for a multi-line encompassing area separation process according to the present embodiment will be described with reference to FIG. 19. FIG. 19A is a flowchart for explaining a processing procedure for a separation process according to the present embodiment. FIG. 19B is a flowchart for explaining an outlier pixel specification process. FIGS. 20A to 20E are diagrams illustrating an overview of the multi-line encompassing area separation process according to the embodiment. The processing to be described below is a detailed process of the above step S957 and is realized, for example, by the CPU 261 reading out the image processing server program stored in the storage 265 and deploying and executing it in the RAM 264. The same step numerals will be given for the same process as the flowchart of FIG. 12A, and a description thereof will be omitted.

In FIG. 19A, when one handwritten area is selected in step S1201, the process proceeds to step S1901. In step S1901, the CPU 261 executes an outlier pixel specification process for specifying an outlier from a handwriting pixel belonging in an area based on the handwritten area selected in step S1201 and the handwriting extraction image generated by estimating a handwriting pixel within a range of the handwritten area in step S956.

Figure 20A:
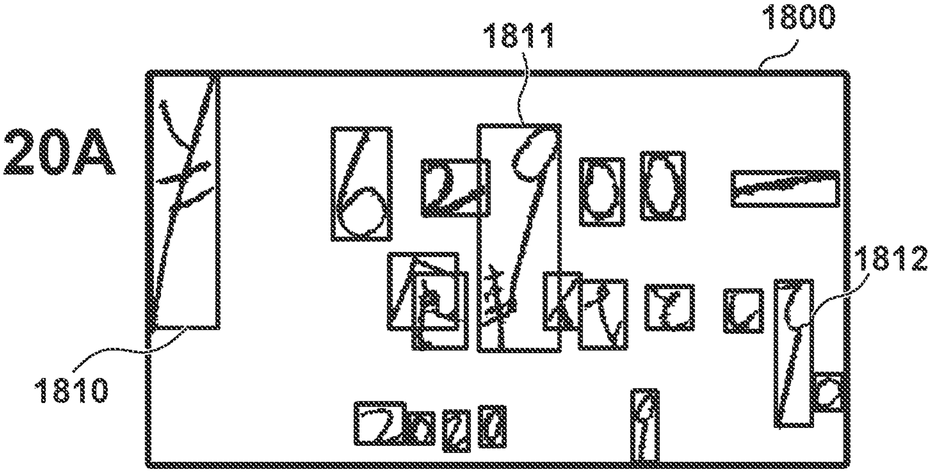
FIGS. 20A to 20E are diagrams illustrating an overview of the multi-line encompassing area separation process according to an embodiment.

In step S1911 of FIG. 19B, the CPU 261 executes a labeling process on a handwriting extraction image generated by estimating handwriting pixels within a range of the handwritten area selected in step S1201 and acquires a circumscribed rectangle of each label. FIG. 20A illustrates a result of performing a labeling process on the handwriting extraction image exemplified in the multi-line encompassing area 1800 of FIG. 18 and acquiring a circumscribed rectangle (including 1810, 1811, 1812) of each label.

Next, in step S1912, the CPU 261 selects one of the circumscribed rectangles acquired in step S1911 and makes it a target of determining whether or not it is an outlier (hereinafter referred to as a "determination target rectangle").

Next, in step S1913, the CPU 261 extracts from the handwriting extraction image generated by estimating handwriting pixels within the range of the handwritten area selected in step S1201 pixels belonging to a range of the height of the determination target rectangle selected in step S1912. Furthermore, in step S1914, the CPU 261 generates an image configured by pixels extracted in step S1913 (hereinafter referred to as a "single line image").

Figure 20B:
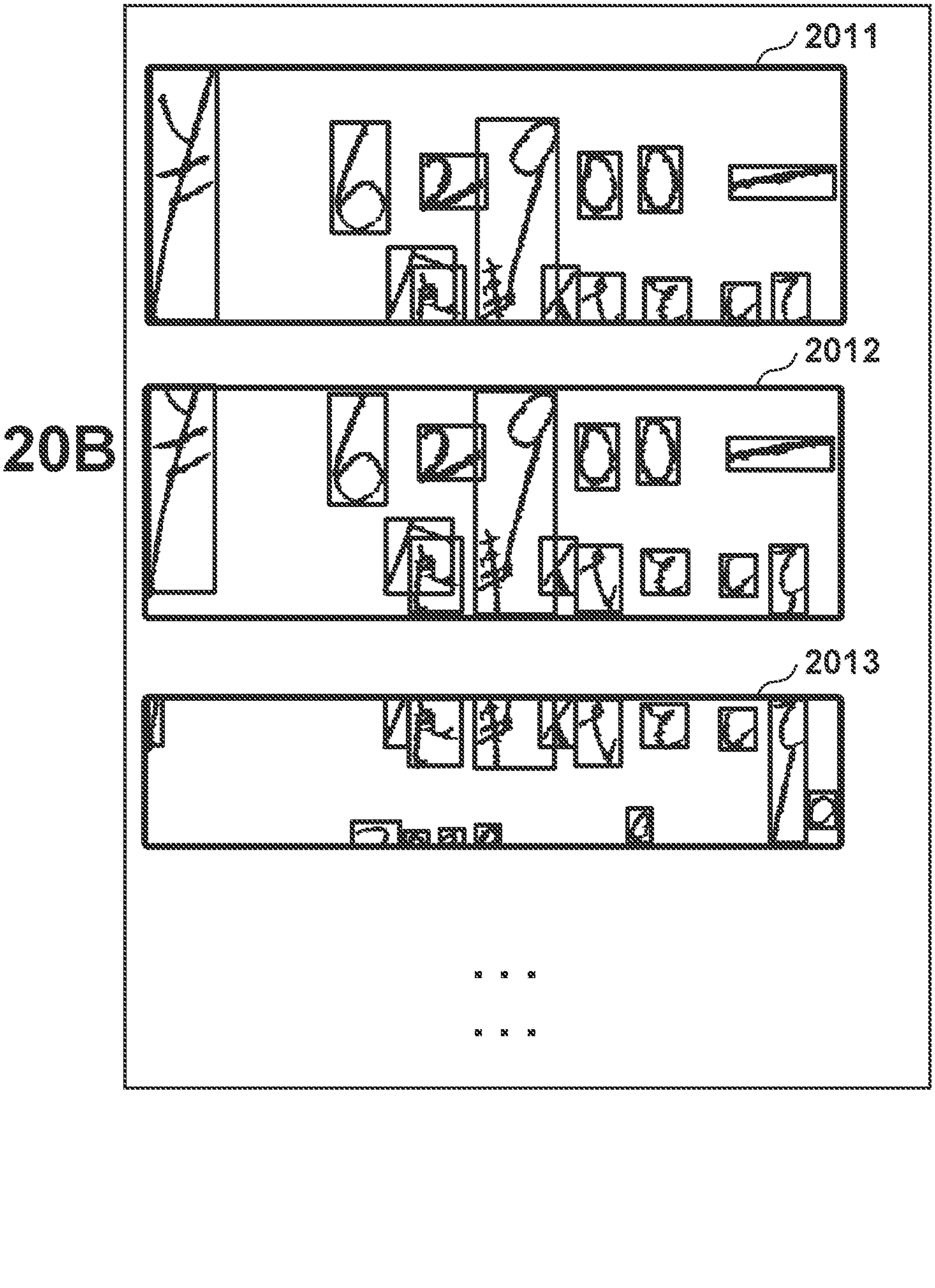

Next, in step S1915, the CPU 261 performs a labeling process on the single line image generated in step S1914 and acquires a circumscribed rectangle of each label. FIG. 20B illustrates a result of performing a labeling process on a single line image configured by pixels belonging to the ranges of the heights of the determination target rectangles 1810, 1811, and 1812 generated in step S1914 and acquiring the circumscribed rectangles of the respective labels. A reference numeral 2011 illustrates a result for when the determination target rectangle 1810 is a target. A reference numeral 2012 illustrates a result for when the determination target rectangle 1811 is a target. A reference numeral 2013 illustrates a result for when the determination target rectangle 1812 is a target. Next, in step S1916, for the circumscribed rectangle 2001 calculated in step S1915, the CPU 261 determines whether the height of each rectangle is less than a threshold or greater than or equal to the threshold corresponding to the height of a single line image and counts the number of rectangles whose height is equal to or more than the threshold and the number of rectangles whose height is less than the threshold, respectively. Here, the threshold is 0.6 times the height of a single line image (i.e., substantially half of the height of a determination target rectangle). There is no intention to limit the threshold to 0.6 times in the present invention, and a value of approximately 0.5 times (substantially a half value)—for example, in a range of approximately 0.4 times to 0.6 times—is applicable.

Next, in step S1917, for the result of counting in step S1916, the CPU 261 determines whether or not there is a larger number of rectangles that are less than the threshold than the number of rectangles that are greater than or equal to the threshold. Here, if the determination target rectangle is an outlier, the rectangle has a height straddling upper and lower lines, that is, a height of at least two lines. In step S1916, with the height of approximately half of the determination target rectangle, that is, the height not exceeding a single line, as a threshold, the number of rectangles whose height is equal to or higher than the threshold and the number of rectangles whose height is less than the threshold is counted. If the number of rectangles whose height is less than the threshold is greater, the other characters are lower than the determination target and have a height that does not exceed a single line. That means that the determination target rectangle has a height of at least two lines. Therefore, if the number of rectangles less than the threshold is larger than the number of rectangles greater than or equal to the threshold, the determination target rectangle is an outlier. Meanwhile, if not, it is assumed that the determination target rectangle is also a character of a single line and is not an outlier. As described above, if it is larger, YES is determined and the process transitions to step S1918; otherwise, it is determined NO and the process transitions to step S1919.

In step S1918, the CPU 261 temporarily stores in the RAM 234 the coordinate information of the handwriting pixel having the label circumscribed by the determination target rectangle selected in step S1912 as a result of labeling performed in step S1911 and then advances to step S1919. In step S1919, the CPU 261 determines whether or not the process from step S1912 to step S1918 has been performed on all circumscribed rectangles acquired in step S1911. If it has been performed, an outlier pixel specification process is ended. Then, the process returns to the multi-line encompassing area separation process illustrated in FIG. 19A and transitions to step S1902. Otherwise, the process is returned to step S1912.

Figure 20C:
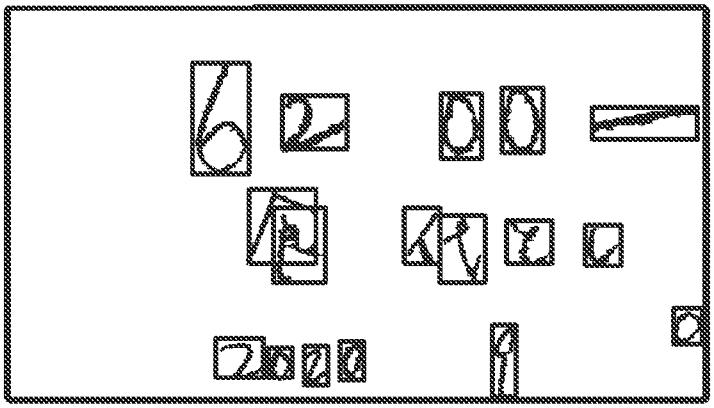
Figure 20D:
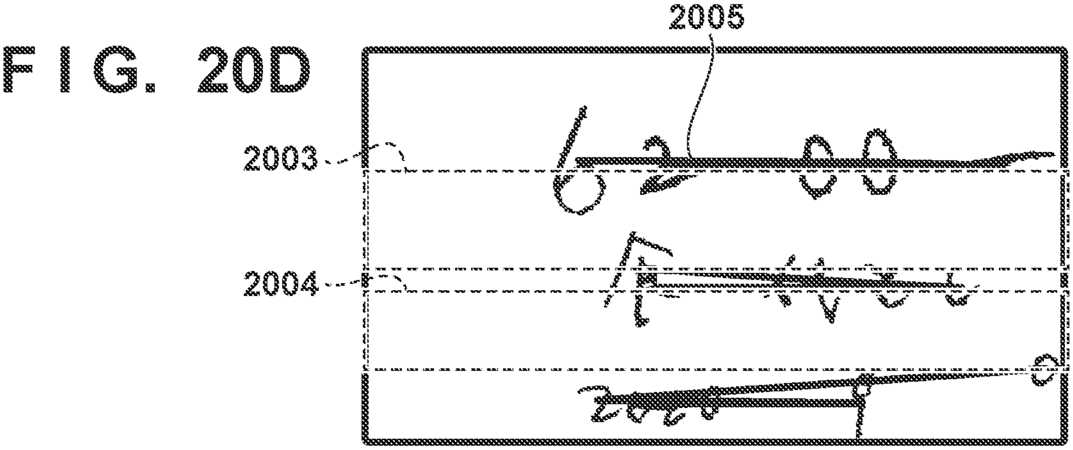

The description will return to that of FIG. 19A. In step S1902, the CPU 261 removes pixels from the handwriting extraction image based on the pixel coordinates stored in step S1918 of the outlier pixel specification process in step S1901. Then, the CPU 261 performs the process from step S1202 to step S1207 using the handwriting extraction image from which the outliers have been removed in step S1902. Here, in step S1203, when the multi-line encompassing area flag is set to 1, YES is determined, and the process transitions to step S1204. Meanwhile, when NO is determined, the process transitions to step S1903. FIG. 20C illustrates a result of acquiring circumscribed rectangles by performing the process of step S1221 and step S1222 on the handwriting extraction image from which the outliers have been removed in step S1902. It can be seen that the handwriting extraction image included the circumscribed rectangles 1810, 1811, and 1812 illustrated in FIG. 20A in has been removed. FIG. 20D illustrates a result of acquiring the y-coordinates of the centers of gravity determined to be YES in step S1244 as line boundary candidate intervals 2003 and 2004 (broken lines) and a result of acquiring a line 2005 (solid line) connecting the characters of the same line by connecting between the centers of gravity determined to be NO in step S1244.

Figure 20E:
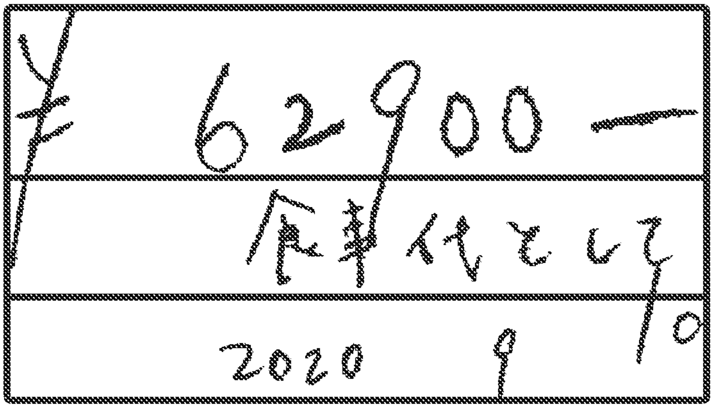

In step S1903, the CPU 261 restores the pixels excluded from the handwriting pixels in step S1902 based on the pixel coordinates stored in step S1918 in the outlier pixel specification process of step S1901. FIG. 20E illustrates a result of performing the process from step S1201 to step S1903 on the multi-line encompassing area 1800 of FIG. 18 and separating the handwritten area and the handwriting extraction image of the area. Then, the process of step S1208 is executed, and the flowchart is ended.

As described above, in the image processing system according to the present embodiment, in addition to the configuration of the above-described embodiments, among a plurality of extracted handwritten characters, the height of the circumscribed rectangle of each handwritten character is compared with the height of the circumscribed rectangle of another handwritten character to specify a handwritten character that is an outlier. Further, the image processing system excludes from the extracted handwritten character image and the handwritten area image a handwritten character image and a handwritten area image corresponding to a handwritten character having the specified outlier. This makes it possible to specify and exclude, using the characteristics of a character string forming a single line, outliers that hinder a multi-line encompassing area separation process.

Other Embodiments

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

The present invention may be applied to a system comprising a plurality of devices or may be applied to an apparatus consisting of one device. For example, in the above-described embodiments, the learning data generation unit 112 and the learning unit 113 have been described as being realized in the learning apparatus 102; however, they may each be realized in a separate apparatus. In such a case, an apparatus that realizes the learning data generation unit 112 transmits learning data generated by the learning data generation unit 112 to an apparatus that realizes the learning unit 113. Then, the learning unit 113 train a neural network based on the received learning data.

Also, the image processing apparatus 101 and the image processing server 103 have been described as separate apparatuses; however, the image processing apparatus 101 may include functions of the image processing server 103. Furthermore, the image processing server 103 and the OCR server 104 have been described as separate apparatuses; however, the image processing server 103 may include functions of the OCR server 104.

As described above, the present invention is not limited to the above embodiments; various modifications (including an organic combination of respective examples) can be made based on the spirit of the present invention; and they are not excluded from the scope of the present invention. That is, all of the configurations obtained by combining the above-described examples and modifications thereof are included in the present invention.

In the above embodiments, as indicated in step S961, a method for determining extraction of a printed character area based on connectivity of pixels has been described; however, estimation may be executed using a neural network in the same manner as handwritten area estimation. The user may select a printed character area in the same way as a ground truth image for handwritten area estimation is created, create ground truth data based on the selected printed character area, newly construct a neural network that performs printed character OCR area estimation, and perform learning with reference to corresponding ground truth data.

In the above-described embodiments, learning data is generated by a learning data generation process during a learning process. However, a configuration may be taken such that a large amount of learning data is generated in advance by a learning data generation process and a mini batch size is sampled from there as necessary during a learning process. In the above-described embodiments, an input image is generated as a gray scale image; however, it may be generated as another format such as a full color image.

The definitions of abbreviations appearing in respective embodiments are as follows. MFP refers to Multi Function Peripheral. ASIC refers to Application Specific Integrated Circuit. CPU refers to Central Processing Unit. RAM refers to Random-Access Memory. ROM refers to Read Only Memory. HDD refers to Hard Disk Drive. SSD refers to Solid State Drive. LAN refers to Local Area Network. PDL refers to Page Description Language. OS refers to Operating System. PC refers to Personal Computer. OCR refers to Optical Character Recognition/Reader. CCD refers to Charge-Coupled Device. LCD refers to Liquid Crystal Display. ADF refers to Auto Document Feeder. CRT refers to Cathode Ray Tube. GPU refers to Graphics Processing Unit. GPU is Graphics Processing Unit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-119005, filed Jul. 19, 2021, and No. 2021-198704, filed Dec. 7, 2021 which are hereby incorporated by reference herein in their entirety.

What is claimed is:

1. An image processing system comprising:

one or more processors, connected to one or more memories, the one or more processors being configured to operate as:

an acquisition unit configured to acquire a target image by scanning a document that includes handwritten characters;

an extraction unit configured to extract, from the target image, a handwritten area image indicating an approximate shape of the handwritten characters;

a specification unit configured to specify, from among the handwritten characters, a handwritten character whose circumscribed rectangle has a height that is higher than a value determined based on circumscribed rectangles of other handwritten characters;

an exclusion unit configured to exclude, from the handwritten area image, an image corresponding to the specified handwritten character;

a determination unit configured to determine a line boundary of handwritten characters using the handwritten area image from which the specified handwritten character is excluded; and a separation unit configured to separate, based on the determined line boundary, a handwritten area corresponding to the handwritten area image into a plurality of lines, wherein the specification unit includes:

a unit configured to, iteratively select each circumscribed rectangle of a plurality of the handwritten character extracted by the extraction unit to be a determination target, generate a single line image in which a height of a circumscribed rectangle that is the selected determination target is made to be a standard;

a unit configured to compare a height of a circumscribed rectangle of a handwritten character included in the generated single line image and a threshold based on the height of the circumscribed rectangle that is the determination target and counts the number of circumscribed rectangles that is greater than or equal to the threshold and the number of circumscribed rectangles that is less than the threshold;

and a unit configured to specify the handwritten character that is the determination target for which the number of circumscribed rectangles greater than or equal to the threshold is larger than the number of circumscribed rectangle that is less than the threshold.

2. The image processing system according to claim 1, wherein the extraction unit further extracts a handwritten character image from the target image, the one or more processors being configured to operate as:

a learning unit configured to generate a learning model using learning data associating a handwritten character image and a handwritten area image that are extracted from an original sample image, wherein the extraction unit extracts the handwritten character image and the handwritten area image using the learning model generated by the learning unit.

3. The image processing system according to claim 2, the one or more processors being configured to operate as:

a setting unit configured to set from the original sample image a handwritten character image and a handwritten area in accordance with a user input, wherein the learning unit generates, for each character in the handwritten character image set by the setting unit, ground truth data for a handwritten area image by overlapping an expansion image subjected to an expansion process in a horizontal direction and a reduction image in which a circumscribed rectangle encompassing a character of the handwritten character image has been reduced in a vertical direction, and generates a learning model using the generated ground truth data.

4. The image processing system according to claim 1, wherein the extraction unit overlaps an image for which an expansion process in a horizontal direction and a reduction process in a vertical direction have been performed on a circumscribed rectangle encompassing a character of the extracted handwritten character image and a line connecting a center of gravity of the circumscribed rectangle between adjacent circumscribed rectangles, and extracts a result as the handwritten area image.

5. The image processing system according to claim 3, wherein the determination unit specifies a line connecting the center of gravity of the circumscribed rectangle of each character between adjacent circumscribed rectangles, specifies a space between two specified lines as a candidate interval in which there is a line boundary, and determines as a boundary in the candidate interval a line whose frequency of a pixel indicating a handwritten area is the lowest.

6. The image processing system according to claim 1, wherein in a case where a height of the handwritten area that is a processing target is higher than a predetermined threshold based on an average of a height of a circumscribed rectangle corresponding to each of a plurality of characters included in the handwritten area, the determination unit determines that handwriting of a plurality of lines is included in the handwritten area.

7. The image processing system according to claim 1, the one or more processors being configured to operate as: a character recognition unit configured to, for each handwritten area separated by the separation unit, perform an OCR process on a corresponding handwritten character image and output text data that corresponds to a handwritten character.

8. The image processing system according to claim 7, wherein the extraction unit further extracts a printed character image included in the target image and a printed character area encompassing a printed character, and the character recognition unit further performs an OCR process on the printed character image included in the printed character area and outputs text data corresponding to a printed character.

9. The image processing system according to claim 8, further comprising: an estimation unit configured to estimate relevance between a result of recognition of a handwritten character and a result of recognition of a printed character by the character recognition unit using at least one of content of text data according to the recognition results and positions of the handwritten character and the printed character in the target image.

10. The image processing system according to claim 1, wherein the threshold is set to a value that is approximately half the height of the circumscribed rectangle that is the determination target.

11. An image processing method performed by one or more processors connected to one or more memories, the method comprising:

acquiring, by the one or more processors, a target image by scanning a document that includes handwritten characters;

extracting, by the one or more processors, from the target image, a handwritten area image indicating an approximate shape of the handwritten characters;

specifying, by the one or more processors, from among the handwritten characters, a handwritten character whose circumscribed rectangle has a height that is higher than a value determined based on circumscribed rectangles of other handwritten characters;

excluding, by the one or more processors, from the handwritten area image, an image corresponding to the specified handwritten character;

determining by the one or more processors, a line boundary of handwritten characters using the handwritten area image from which the specified handwritten character is excluded; and separating, by the one or more processors, based on the determined line boundary, a handwritten area corresponding to the handwritten area image into a plurality of lines, wherein the specifying includes:

iteratively select each circumscribed rectangle of a plurality of the extracted handwritten character to be a determination target, generating a single line image in which a height of a circumscribed rectangle that is the selected determination target is made to be a standard; comparing a height of a circumscribed rectangle of a handwritten character included in the generated single line image and a threshold based on the height of the circumscribed rectangle that is the determination target and counting the number of circumscribed rectangles that is greater than or equal to the threshold and the number of circumscribed rectangles that is less than the threshold; and specifying the handwritten character that is the determination target for which the number of circumscribed rectangles greater than or equal to the threshold is larger than the number of circumscribed rectangle that is less than the threshold.

* * * * *